United States Patent
Al-Dahhan et al.

(10) Patent No.: US 11,648,512 B2
(45) Date of Patent: May 16, 2023

(54) ENHANCED EMULSION LIQUID MEMBRANES FOR EXTRACTION OF POLLUTANTS FROM WATER

(71) Applicant: The Curators of the University of Missouri, Columbia, MO (US)

(72) Inventors: Muthanna Al-Dahhan, Rolla, MO (US); Qusay Al-Obaidi, Rolla, MO (US)

(73) Assignee: The Curators of the University of Missouri, Columbia, MO (US)

( * ) Notice: Subject to any disclaimer, the term of this patent is extended or adjusted under 35 U.S.C. 154(b) by 278 days.

(21) Appl. No.: 17/083,699

(22) Filed: Oct. 29, 2020

(65) Prior Publication Data

US 2021/0121825 A1 Apr. 29, 2021

Related U.S. Application Data

(60) Provisional application No. 62/927,458, filed on Oct. 29, 2019.

(51) Int. Cl.
| | | |
|---|---|---|
| *B01D 61/40* | (2006.01) | |
| *C02F 1/48* | (2023.01) | |
| *C02F 1/26* | (2023.01) | |
| *C02F 101/34* | (2006.01) | |
| *C02F 101/38* | (2006.01) | |
| *C02F 101/20* | (2006.01) | |

(52) U.S. Cl.
CPC ............... *B01D 61/40* (2013.01); *C02F 1/26* (2013.01); *C02F 1/488* (2013.01); *C02F 2101/20* (2013.01); *C02F 2101/345* (2013.01); *C02F 2101/38* (2013.01); *C02F 2305/08* (2013.01)

(58) Field of Classification Search
CPC ......... B01D 61/40; B01D 69/148; C02F 1/26; C02F 1/488
See application file for complete search history.

(56) References Cited

U.S. PATENT DOCUMENTS

| | | | | |
|---|---|---|---|---|
| 6,458,289 | B1 * | 10/2002 | Merchant ............ | H01L 21/3212 438/692 |
| 8,383,003 | B2 * | 2/2013 | Misra ...................... | B24B 37/26 438/692 |
| 2009/0318063 | A1 * | 12/2009 | Misra ...................... | B24B 37/14 451/28 |
| 2021/0121825 | A1 * | 4/2021 | Al-Dahhan ............. | C02F 1/488 |

OTHER PUBLICATIONS

Ahmed et al., Modified double emulsion process as a new route to prepare submicron biodegradable magnetic/polycaprolactone particles for in vivo theranostics, Soft Matter, 2012, 8, 2554, DOI: 10.1039/c2sm06872a (Year: 2012).*

(Continued)

*Primary Examiner* — Chester T Barry
(74) *Attorney, Agent, or Firm* — Armstrong Teasdale LLP

(57) ABSTRACT

Described herein are novel emulsion liquid membranes useful for extracting pollutants from industrial wastewater and water. The emulsion liquid membranes include, in various phases, at least one of nanoparticles, an ionic liquid, and combinations of nanoparticles and ionic liquids. Use of the present emulsion liquid membranes enhances the separation and the stability of the ELM method for pollutant extraction and recovery from wastewater and water.

20 Claims, 34 Drawing Sheets

(56) References Cited

OTHER PUBLICATIONS

Avinash B. Lende et al., Emulsion ionic liquid membranes (EILMs) for removal of Pb(II) from aqueous solutions, RSC Advances, 2014, 4, 53216-52323, DOI: 10.1039/c4ra06485b (Year: 2014).*

T. Hirai et al., et al., Biomimetic Synthesis of Calcium Carbonate Particles in a Pseudovesicular Double Emulsion, Langmuir 1997, 13, 6650-6653 (Year: 1997).*

Q. Al-Obaidi et al., Assessing the Removal of Heavy Metals using Emerging and Intensifying Technology of Emulsion Liquid Membrane with Ionic Liquid (May 15, 2020). SYMPHOS 2019—5th Int. Symp. on Innov. & Tech, in the Phosphate Industry, : https://ssrn.com/abstract=3601713 (Year: 2020).*

Unpublished U.S. Appl. No. 62/927,458, filed Oct. 29, 2019 (Year: 2019).*

* cited by examiner

ENHANCED EMULSION LIQUID MEMBRANES FOR EXTRACTION OF POLLUTANTS FROM WATER

CROSS-REFERENCE TO RELATED APPLICATIONS

This application claims priority to U.S. Provisional Application Ser. No. 62/927,458, filed on Oct. 29, 2019, the content of which is hereby incorporated by reference in its entirety.

FIELD OF THE DISCLOSURE

Described herein are novel emulsion liquid membranes useful for extracting pollutants from industrial wastewater and water. The emulsion liquid membranes include, in various phases, at least one of nanoparticles, an ionic liquid, and combinations of nanoparticles and ionic liquids. Use of the present emulsion liquid membranes enhances the separation and the stability of the emulsion liquid membrane method for pollutant extraction and recovery from wastewater and water.

BACKGROUND OF THE DISCLOSURE

Hydrocarbons, including phenolic compounds such as 4-Nitrophenol, benzoic acid, and other derivatives, are often found in tap water and in many industrial processes for producing dyes, pesticides, and petrochemicals. The United States Environmental Protection Agency (EPA) has classified hydrocarbons as dangerous aqueous chemicals, due to their ability to destroy important tissues in human and animal bodies. Such tissues include the kidneys, central nervous system, liver, and blood cells. Therefore, the removal of hydrocarbons from industrial effluents is a serious, practical issue.

Similarly, heavy metal compounds, such as Pb(II) and V(V), and others are contaminants produced by various industries, including mining, mineral processing, petroleum, chemicals, petrochemicals, nuclear, water treatment, and other industries. When these heavy metals are released into the environment, they accumulate in the food chain and persist in nature. They may cause severe health hazards. For instance, lead is extremely toxic to humans and can damage the nervous system, kidneys, organs, and reproductive system when the concentration of lead exceeds the limit of 0.01 ppm that has been set by the World Health Organization (WHO) and EPA. In addition, vanadium is a hazardous metal belonging to the same class as lead, arsenic, mercury, and the rest of the heavy metals including actinides. For example, in the United States, the maximum recommended exposure level of vanadium is 35 mg/m$^3$ according to the National Institute for Occupational Safety and Health.

Many methods have been reported to extract/recover heavy metals and hydrocarbons from water and industrial wastewater. These methods include coagulation-flocculation, chemical precipitation, ion exchange, electro-oxidation, flotation, adsorption, and advanced oxidation. Membrane processes have also been presented as an emerging technology in this area. Porous and nonporous membranes, made of a variety of materials such as polymers and ceramics, and optionally functionalized to enhance treatment, have been reported. Further, beyond solid membranes, liquid membranes have also recently been used. Liquid membranes can be present in a variety of forms, including bulk liquid membrane (BLM), supported liquid membrane (SLM), and emulsion liquid membrane (ELM).

An emulsion liquid membrane (ELM) may be used to extract pollutants, such as hydrocarbons and/or heavy metals, from industrial wastewater and water. ELMs are double emulsion systems which have a Water-Oil-Water (W-O-W) or Oil-Water-Oil (O-W-O) structure. A W-O-W ELM comprises an organic membrane phase (O) that contains tiny drops of the stripping aqueous phase (W1), also known as the internal phase, dispersed in the water (W2), also known as the external phase, wherein the pollutants transfer through phase (O) from phase (W2) to phase (W1) to react with the stripping agent. A similar mechanism occurs in an O-W-O emulsion system.

ELMs can be used in a single process of extraction and stripping with high capacity of separation and high selectivity at low cost. Such systems can concentrate the contaminant up to 10-100 times more than other methods.

However, although ELMs are effective in extracting and stripping processes, they can swell and break in emulsion systems. Furthermore, lack of emulsion stability decreases extraction efficiency.

Described herein, ionic liquids such as [BMIM][NTf2], and ([OMIM]PF6) are added to the membrane phase as a stabilizer to improve the stability of W1/O emulsions. Methods of using ELMs comprising an ionic liquid in combination with a surfactant increase the improvements in stability and pollutant removal efficiency.

Furthermore, stabilization of ELMs with nanoparticles enhances the strength between emulsion droplets and prevents collision or coalescence of the droplets. This stabilization is needed on industrial scales. In addition, collecting the nanoparticles after extracting and stripping enhances the step of demulsifying. Using nanoparticles such as magnesium oxide nanoparticles, aluminum oxide nanoparticles, silicon carbide nanoparticles, and copper (II) oxide (and others) nanoparticles enhances the quality of the removal and/or extraction of the heavy metals. ELMs stabilized by magnetic $Fe_2O_3$ nanoparticles demonstrate how magnetic $Fe_2O_3$ nanoparticles can demulsify by attracting particles from the droplet interface in the presence of an external magnetic field. Effects of the $Fe_2O_3$ nanoparticles on emulsion stability show that magnetic $Fe_2O_3$ nanoparticles have a strong impact on the percentage of emulsion leakage (emulsion stability).

The present disclosure is the first use of the combination of nanoparticles (in W1 or O) and ionic liquids to enhance the separation and the stability of the ELM for the hydrocarbon extraction and recovery from wastewater and water. Enhancing the separation of hydrocarbons by combining magnetic nanoparticles and ionic liquid for emulsion liquid membrane has wide commercial applications.

The present disclosure is the first use of nanoparticles in W1 to enhance the separation and the stability of the ELM for heavy metals extraction and recovery from wastewater and water. Enhancing the separation of heavy metals by also combining magnetic nanoparticles alone or with ionic liquid with emulsion liquid membrane has wide commercial applications.

BRIEF DESCRIPTION OF THE DISCLOSURE

In one embodiment, the present disclosure is directed to an emulsion liquid membrane (ELM). The ELM comprises an emulsion phase comprising a stripping aqueous phase dispersed in an organic membrane phase, wherein the stripping aqueous phase comprises nanoparticles and the organic phase optionally comprises an ionic liquid.

In another embodiment, the present disclosure is directed to an emulsion liquid membrane (ELM). The ELM comprises an emulsion phase comprising a stripping aqueous phase dispersed in an organic membrane phase, wherein the organic membrane phase comprises an ionic liquid and the stripping aqueous phase optionally comprises nanoparticles.

In yet another embodiment, the present disclosure is directed to a method for removing and/or extracting at least one metal. The method comprises dispersing an emulsion phase of an emulsion liquid membrane in an external aqueous phase (W2), wherein the emulsion phase of the emulsion liquid membrane comprises a stripping aqueous phase (W1) dispersed in an organic membrane phase, wherein the stripping aqueous phase comprises nanoparticles and a stripping agent and the organic phase optionally comprises an ionic liquid and wherein the external aqueous phase (W2) comprises at least one metal; and, removing and/or extracting the at least one metal, wherein the at least one metal is transferred from the external aqueous phase (W2) through the organic membrane phase to the stripping aqueous phase (W1) and the at least one metal reacts with the stripping agent in the stripping aqueous phase (W1) and is removed from the external aqueous phase (W2).

In another embodiment, the present disclosure is directed to a method for removing and/or extracting at least one hydrocarbon. The method comprises dispersing an emulsion phase of an emulsion liquid membrane in an external aqueous phase (W2), wherein the emulsion phase of the emulsion liquid membrane comprises a stripping aqueous phase (W1) dispersed in an organic membrane phase, wherein the organic membrane phase comprises an ionic liquid and the stripping aqueous phase comprises nanoparticles and a stripping agent and wherein the external aqueous phase (W2) comprises at least one hydrocarbon; and, removing and/or extracting the at least one hydrocarbon, wherein the at least one hydrocarbon is transferred from the external aqueous phase (W2) through the organic membrane phase to the stripping aqueous phase (W1) and the at least one hydrocarbon reacts with the stripping agent in the stripping aqueous phase (W1) and is removed from the external aqueous phase (W2).

DETAILED DESCRIPTION OF THE DRAWINGS

The figures of the present disclosure are examples and are not to be construed as limiting.

Figure 1:
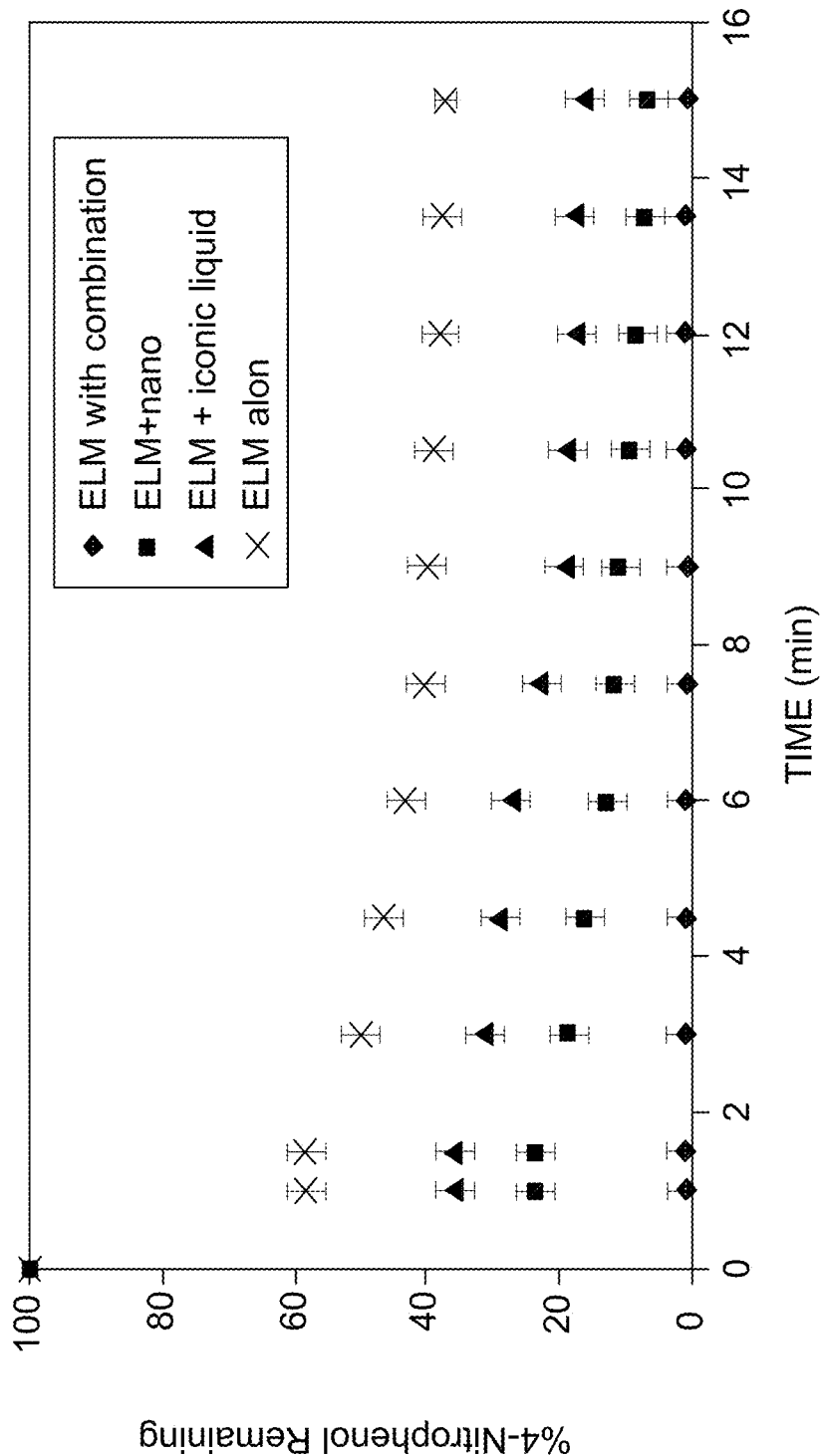
FIG. 1 is a graphical depiction of an exemplary embodiment of the removal efficiency for hydrocarbon 4-nitrophenol removal in accordance with the present disclosure.

The exemplary embodiment of FIG. 1 was obtained with the following conditions: a ratio of W1/O of about 1:3, a span 80 concentration of about 2% W/V, an emulsification speed of about 8000 rpm, a volume treatment ratio of O phase to W2 phase of about 1/1 V/V, a mixing speed of about 300 rpm, a pH of about 1.5, a $Fe_2O_3$ nanoparticle concentration of about 0.1% W/W, an ionic liquid concentration of about 0.05% V/V, and a combination of about 0.05% (V/V) ionic liquid and about 0.05% (W/W) $Fe_2O_3$ nanoparticles.

Figure 2:
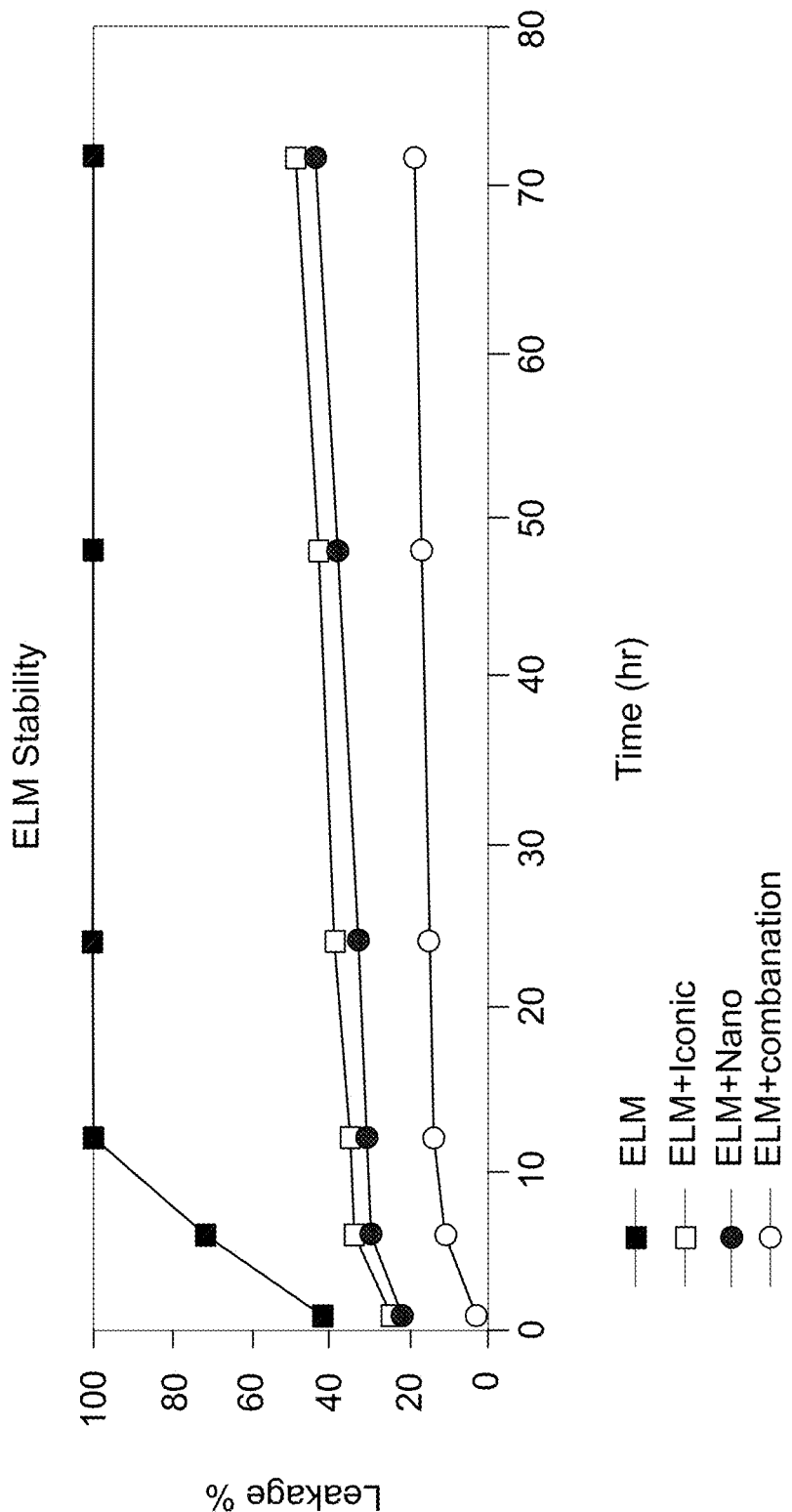
FIG. 2 is a graphical depiction of an exemplary embodiment of the stability of ELM for hydrocarbon 4-nitrophenol removal in accordance with the present disclosure.

The exemplary embodiment of FIG. 2 demonstrates that combining both magnetic $Fe_2O_3$ nanoparticles and ionic liquid [BMIM]$^+$[NTf2]$^-$ yields the lowest leakage and higher stability time after 1 hour and these properties are continuous for the rest of the testing time. This combination improves the stability of ELMs.

Figure 3:
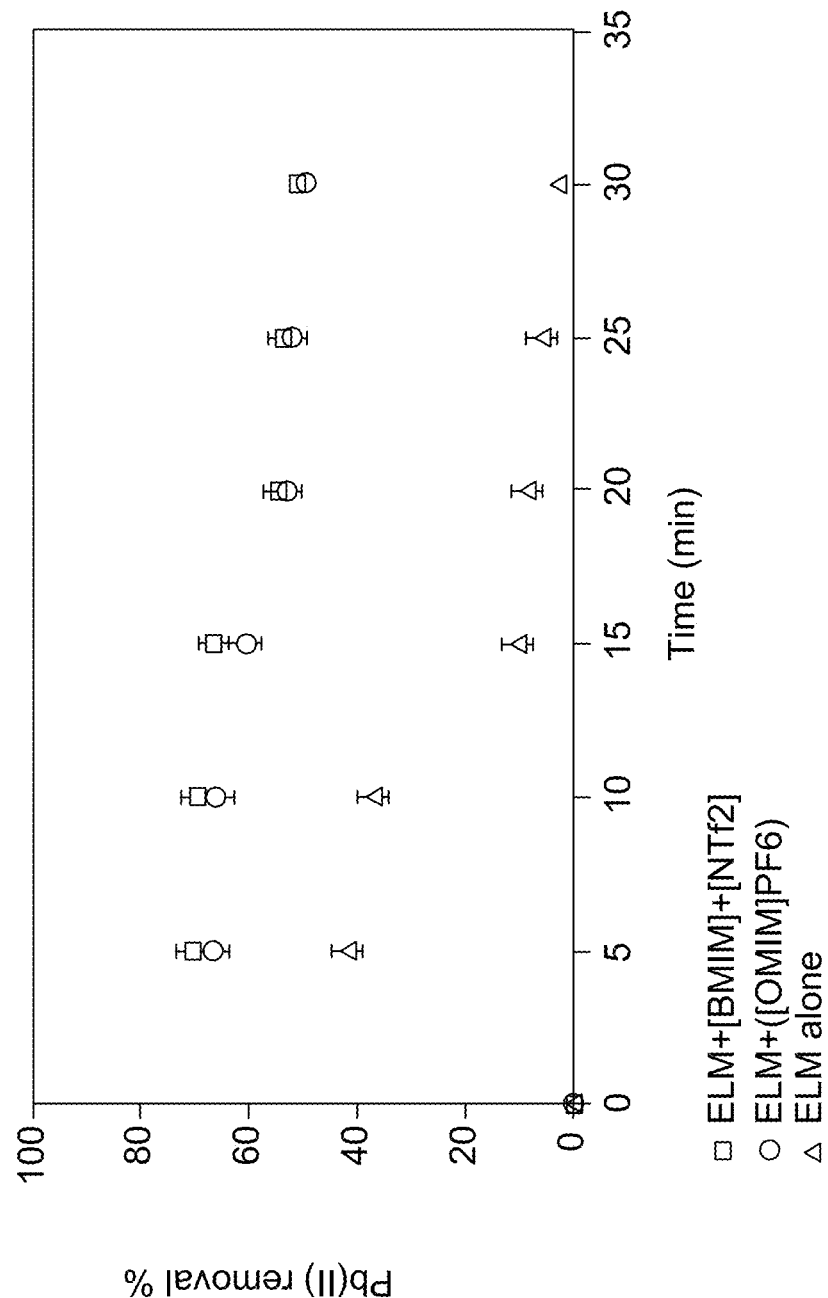
FIG. 3 is a graphical depiction of an exemplary embodiment of ELM alone vs. ELM with ionic liquids in heavy metals Pb(II) removal in accordance with the present disclosure.

The exemplary embodiment of FIG. 3 was obtained with the following conditions: a ratio of W1/O of about 1:1, a span 80 concentration of about 3% W/V, a carrier concentration of about 2% V/V, an emulsification speed of about 6000 rpm, a volume treatment ratio of O phase to W2 phase of about 1/10 V/V, a mixing speed of about 300 rpm, a pH of about 1.5, and ionic liquids [OMIM][PF6], and [BMIM]$^+$[NTf2]$^-$ concentrations of about 5% V/V.

Figure 4:
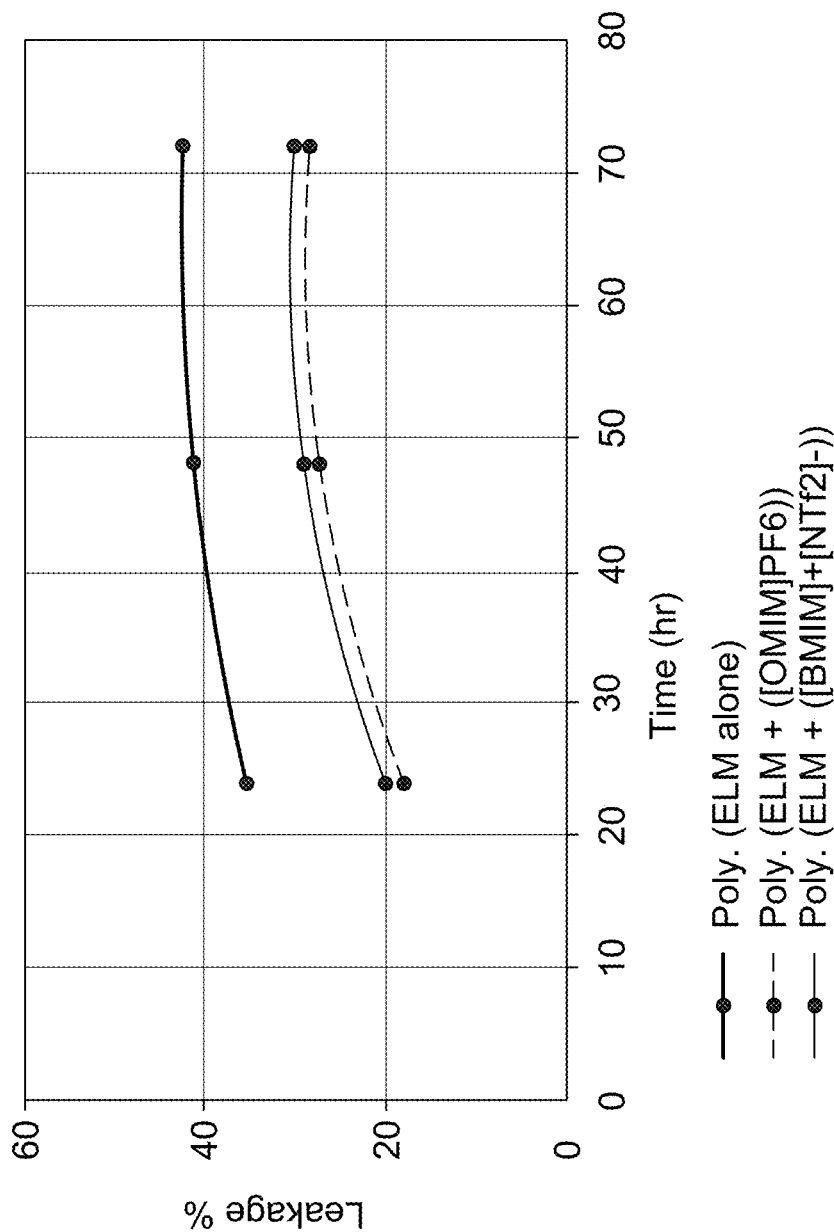
FIG. 4 is a graphical depiction of an exemplary embodiment of ELM stability in heavy metals Pb(II) removal in accordance with the present disclosure.

The exemplary embodiment of FIG. 4 demonstrates that the ionic liquid [OMIM][PF6] yields the lowest leakage and highest stability time after 24 hours and these properties are continuous for the rest of the testing time. The ionic liquid improves the stability of the ELM.

Figure 5:
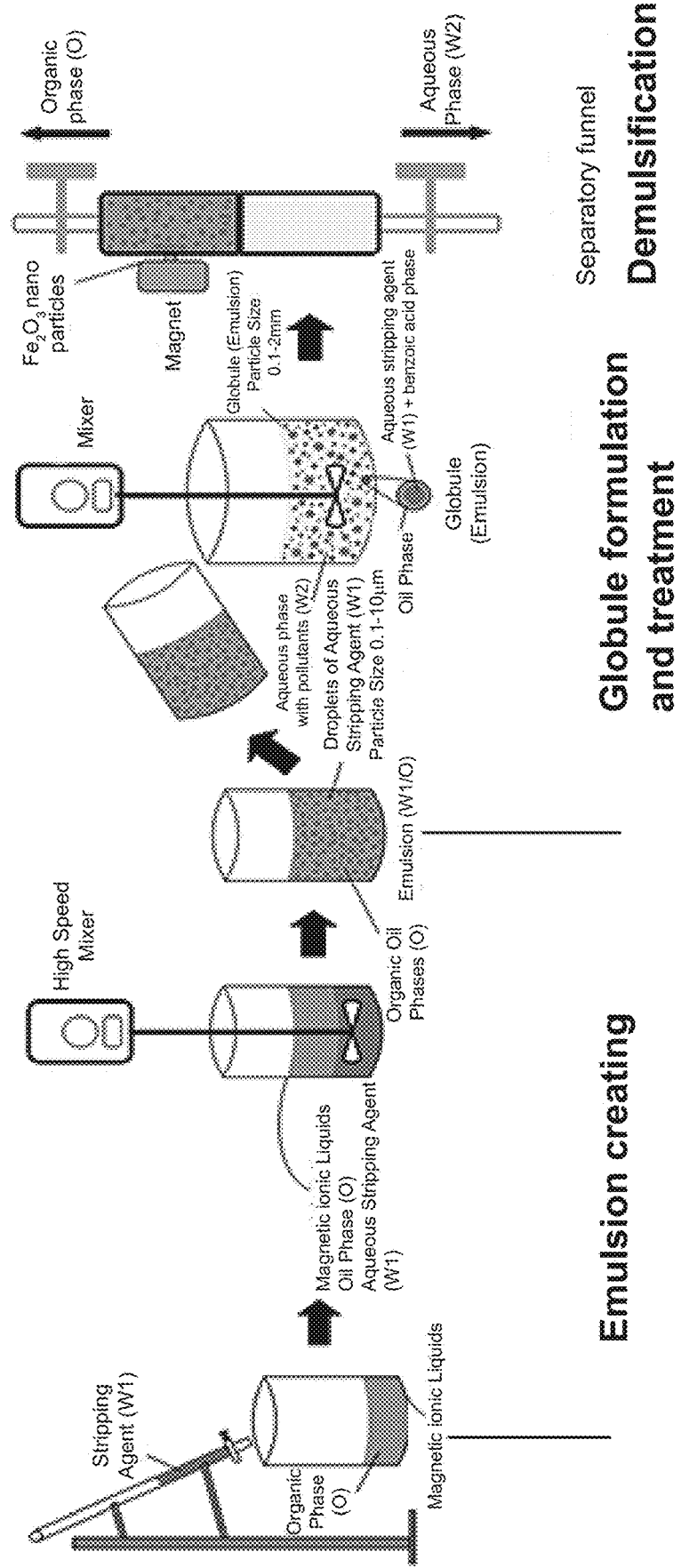
FIG. 5 is a graphical depiction of an exemplary embodiment of a process for forming an ELM in accordance with the present disclosure.

The exemplary embodiment of FIG. 5 is representative of a typical process for forming an ELM in accordance with the present disclosure.

Figure 6:
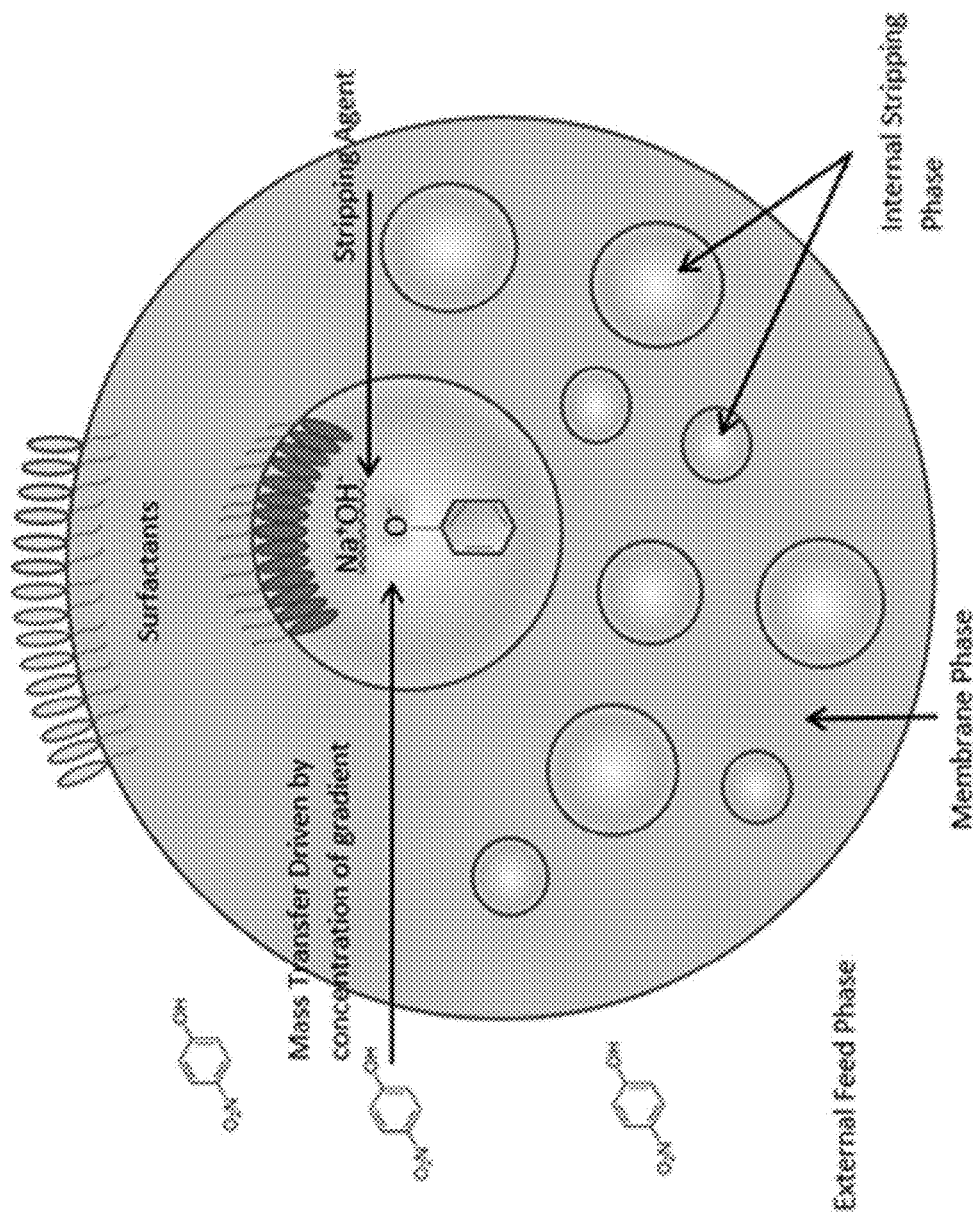
FIG. 6 is a graphical depiction of an exemplary embodiment of a schematic of an ELM in accordance with the present disclosure.

The exemplary embodiment of FIG. 6 is representative of a typical ELM in accordance with the present disclosure. The representative stripping agent in sodium hydroxide and the representative pollutant is nitrophenol.

Figure 7:
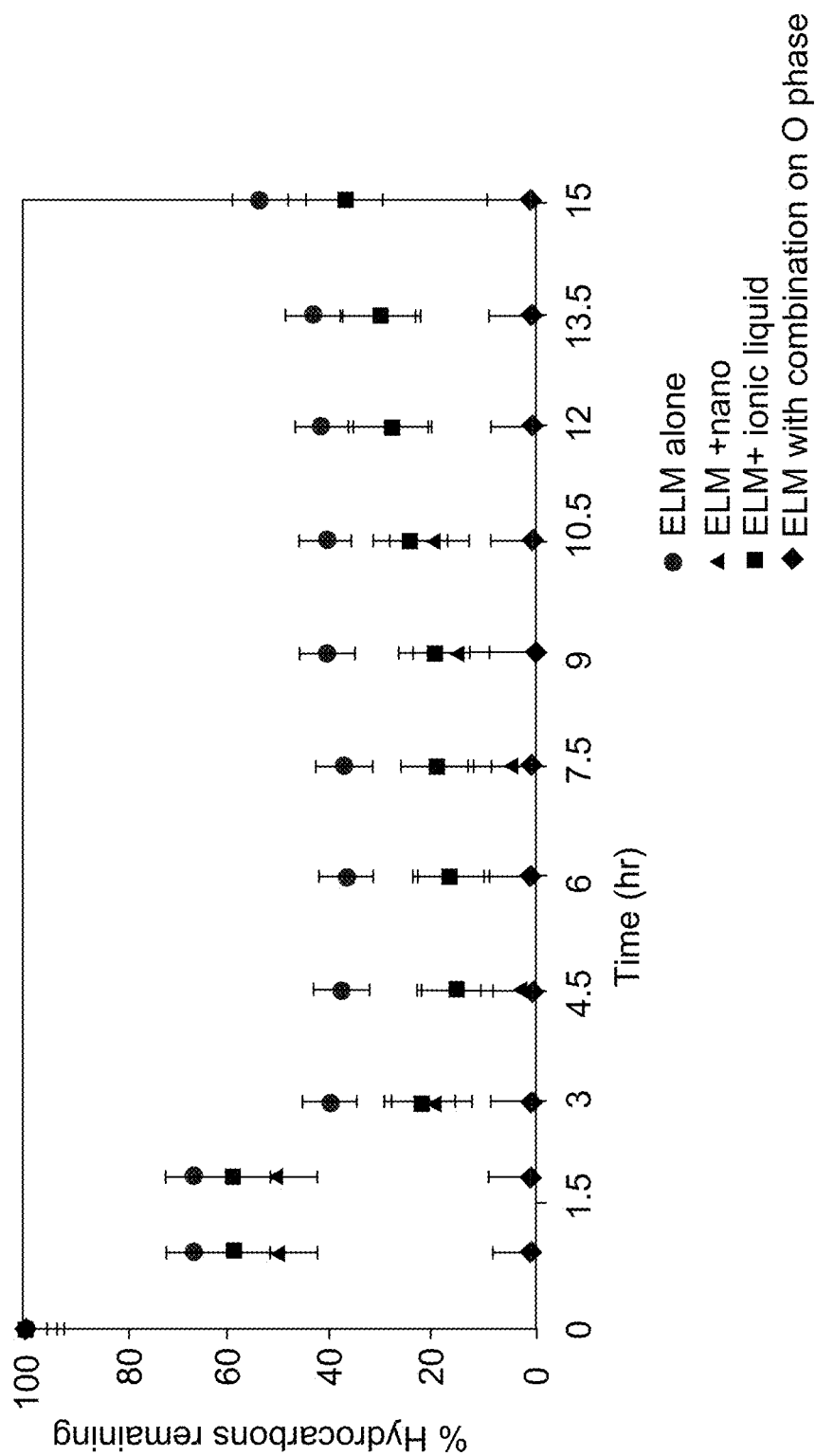
FIG. 7 is a graphical depiction of an exemplary embodiment of ELM performance in accordance with the present disclosure.

The exemplary embodiment of FIG. 7 demonstrates the effect of % (V/V) ionic liquid [BMIM]$^+$[NTf2]$^-$ and % (W/W) magnetic $Fe_2O_3$ nanoparticles in organic phase on the ELM removal for 4-Nitrophenol under the following conditions: W1:O volume ratio of 1/3 (V/V), surfactant concentration of 2% (W/V), emulsification speed of 8000 rpm, ELM (W1/O)/W2 volume ratio of 1/2 (V/V), treatment agitation mixing speed of W2 of 300 rpm, and pH of W2 of 1.5.

Figure 8:
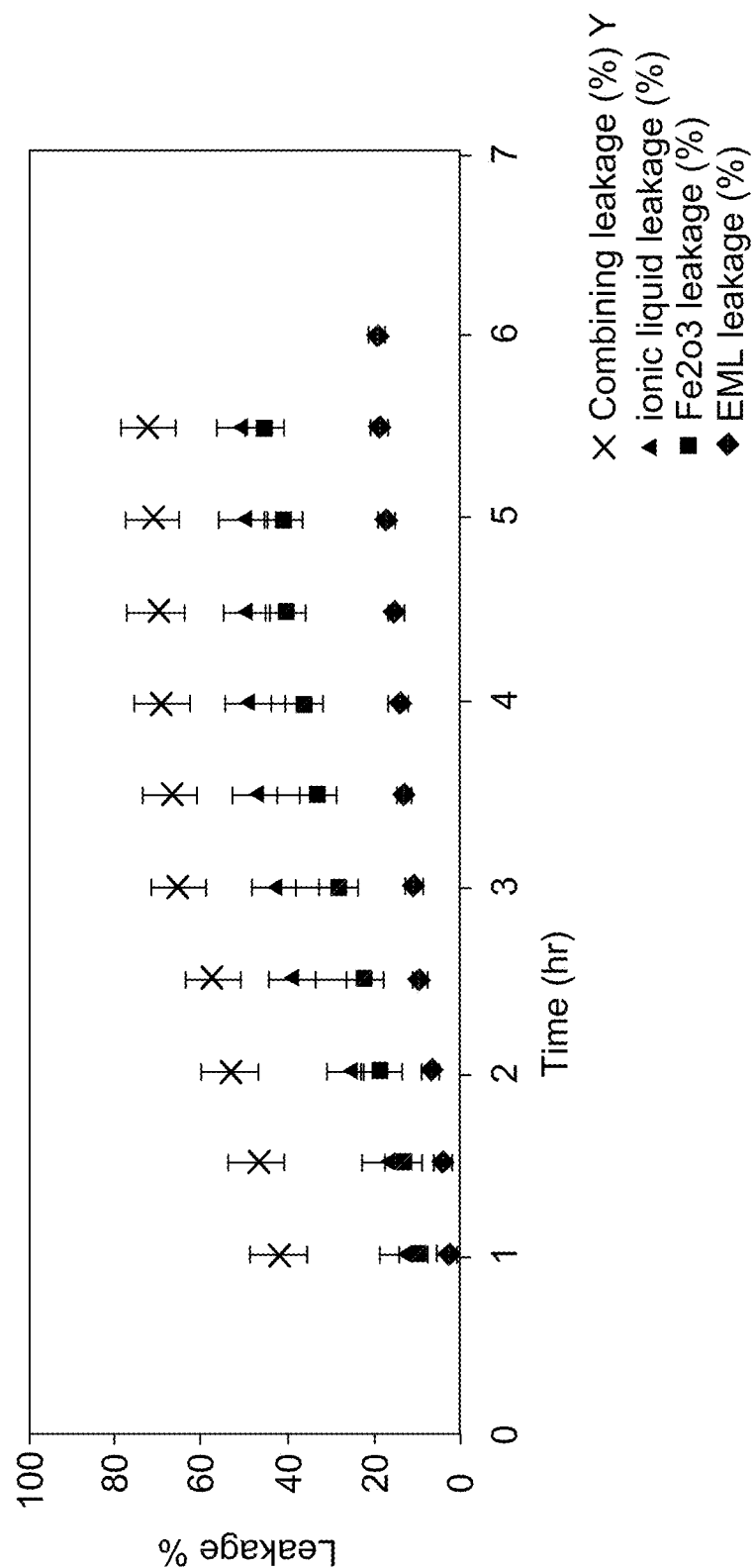
FIG. 8 is a graphical depiction of an exemplary embodiment of ELM performance in accordance with the present disclosure.

The exemplary embodiment of FIG. 8 demonstrates the effect of the % (V/V) ionic liquid [BMIM]$^+$[NTf2]$^-$ and % (W/W) magnetic $Fe_2O_3$ nanoparticles on the ELM emulsion stability under the following conditions: W1:O volume ratio of 1/3 (V/V), surfactant concentration of 2% (W/V), emulsification speed of 8000 rpm, ELM (W1/O)/W2 volume ratio of 1/2 (V/V), treatment agitation mixing speed of W2 of 300 rpm, and pH of W2 of 1.5.

The exemplary embodiments of FIGS. 9A-9F demonstrate the effect of ELM removal for 4-Nitrophenol under the following conditions: Span 80 concentration of 2%, agitation to create emulsion of 8000 rpm, ELM/W2 volume ratio of 1/2, agitation mixing of 300 rpm, and pH of 1.5.

Figure 10:
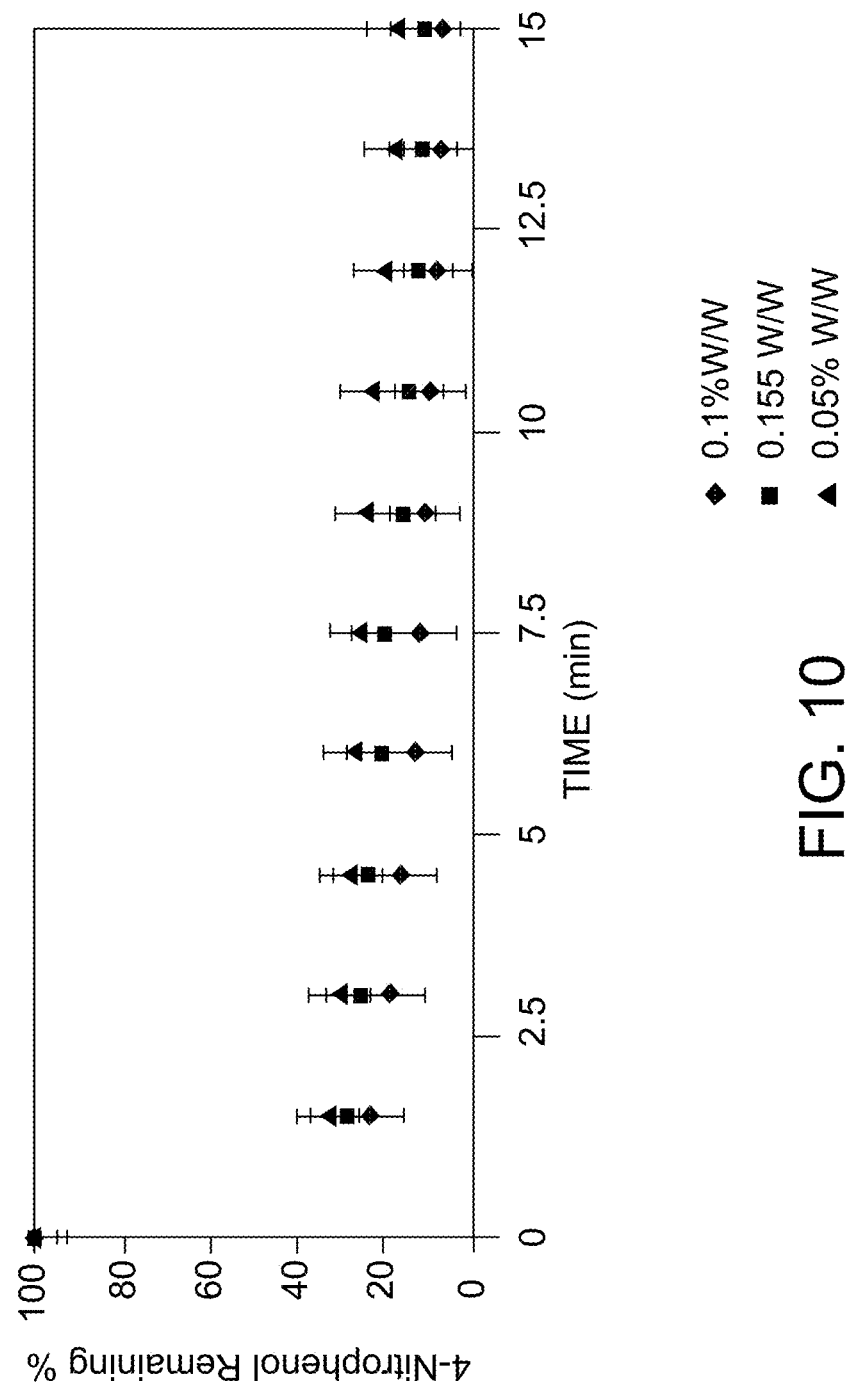
FIG. 10 is a graphical depiction of an exemplary embodiment of ELM performance in accordance with the present disclosure.

The exemplary embodiment of FIG. 10 demonstrates the effect of magnetic $Fe_2O_3$ nanoparticles in organic phase (O) on the ELM removal for 4-Nitrophenol removal under the following conditions: W1:O volume ratio is 1/3 (V/V), surfactant concentration is 2%, emulsification speed is 8000 rpm, ELM/W2 volume ratio is 1:2 (V/V), mixing speed is 300 rpm, and pH is 1.5.

Figure 11:
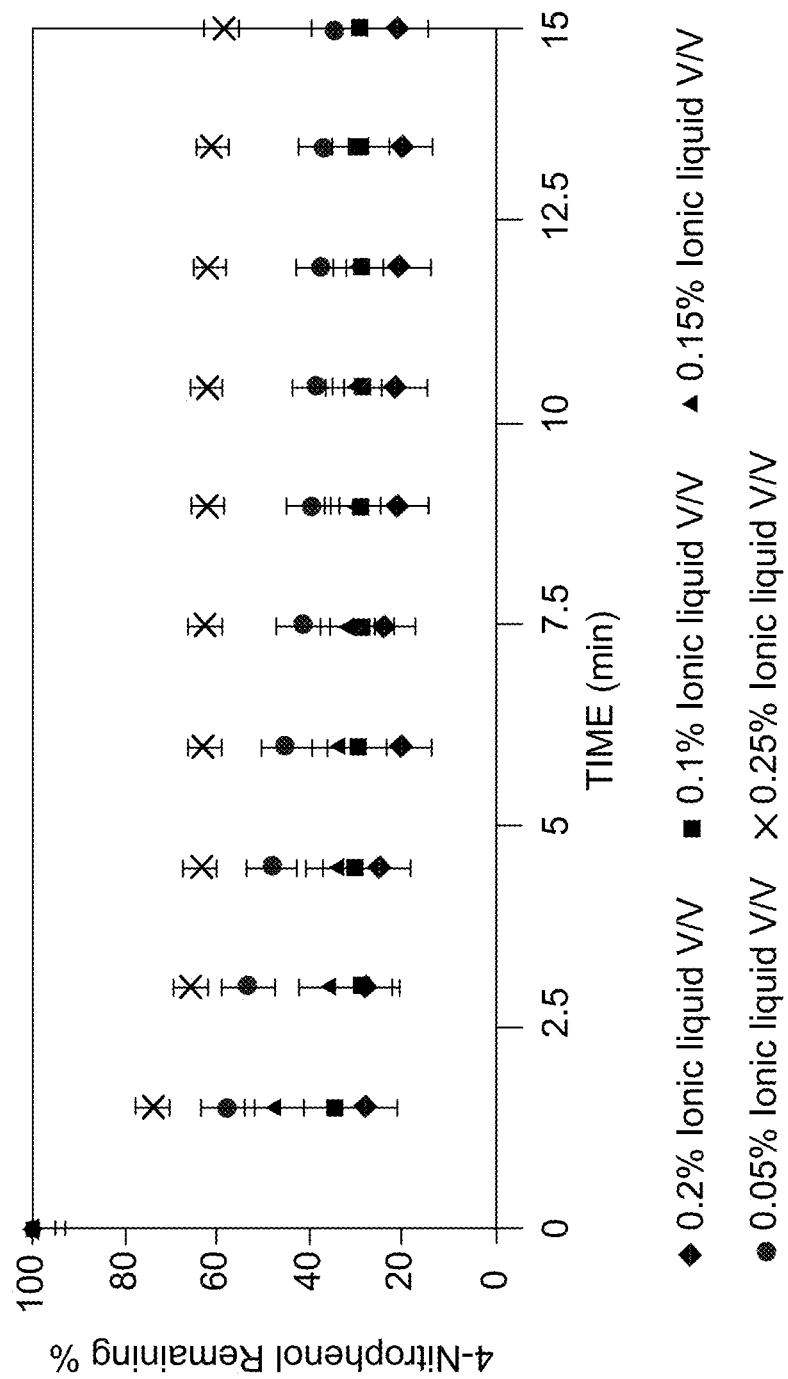
FIG. 11 is a graphical depiction of an exemplary embodiment of ELM performance in accordance with the present disclosure.

The exemplary embodiment of FIG. 11 demonstrates the effect of ionic liquid [BMIM]$^+$[NTf2]$^-$ in organic phase on the ELM removal for 4-Nitrophenol removal under the following conditions: W1:O volume ratio is 1/3 (V/V), surfactant concentration is 2%, emulsification speed is 8000 rpm, ELM/W2 volume ratio is 1:2 (V/V), mixing speed is 300 rpm, and pH is 1.5.

Figure 12:
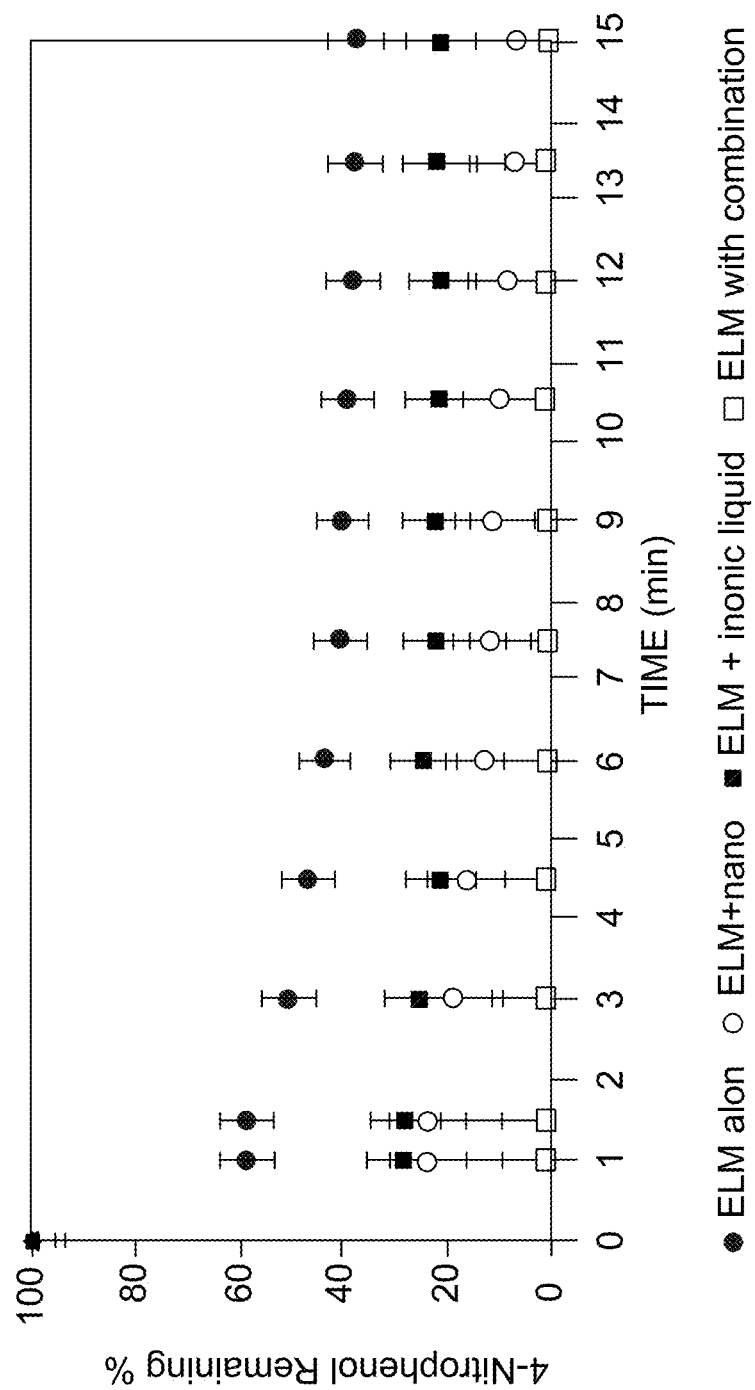
FIG. 12 is a graphical depiction of an exemplary embodiment of ELM performance in accordance with the present disclosure.

The exemplary embodiment of FIG. 12 demonstrates the effect of the combination 0.05% (W/W) ionic liquid [BMIM]$^+$[NTf2]$^-$ and 0.05% (V/V) magnetic $Fe_2O_3$ nanoparticles in organic phase on the ELM removal for 4-Nitrophenol under the following conditions: W1:O volume ratio is 1/3 (V/V), surfactant concentration is 2%, emulsification speed is 8000 rpm, ELM/W2 volume ratio is 1:2 (V/V), mixing speed is 300 rpm, and pH is 1.5.

Figure 13:
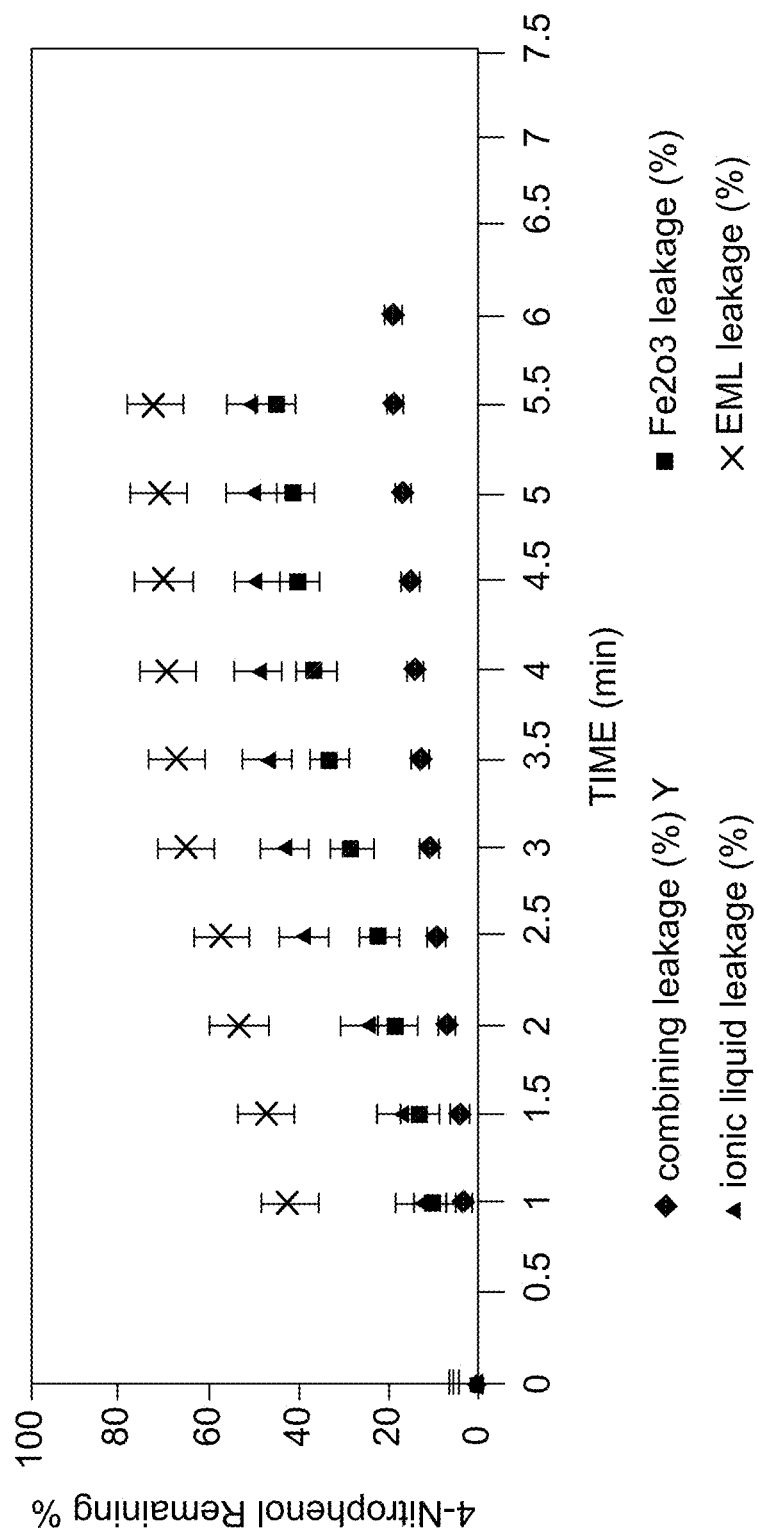
FIG. 13 is a graphical depiction of an exemplary embodiment of ELM performance in accordance with the present disclosure.

The exemplary embodiment of FIG. 13 demonstrates the effect of the combination of ionic liquid [BMIM]$^+$[NTf2]$^-$ and magnetic $Fe_2O_3$ nanoparticles in organic phase on the ELM emulsion stability under the following conditions: W1:O volume ratio is 1/3 (V/V), surfactant concentration is 2%, emulsification speed is 8000 rpm, ELM/W2 volume ratio is 1:2 (V/V), mixing speed is 300 rpm, and pH is 1.5.

Figure 14:
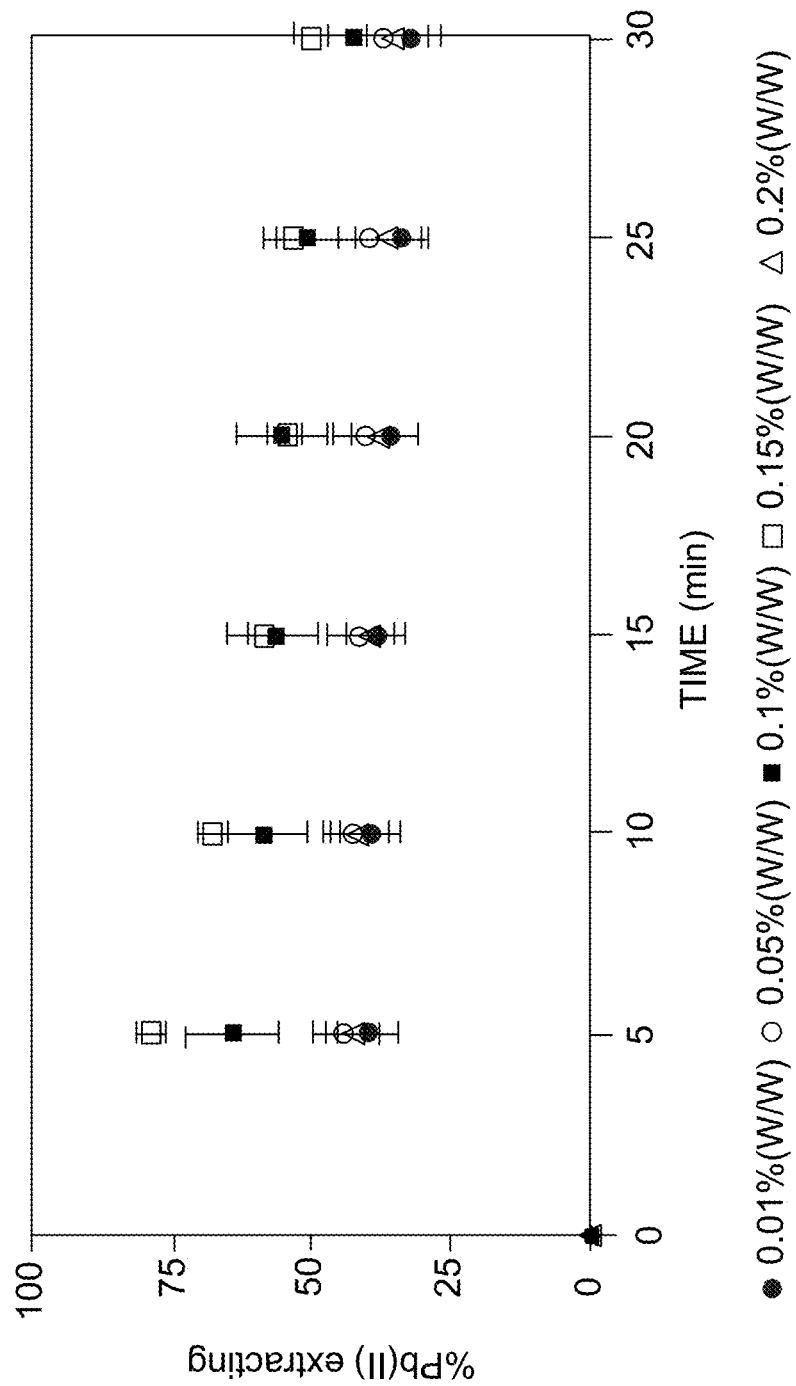
FIG. 14 is a graphical depiction of an exemplary embodiment of ELM performance in accordance with the present disclosure.

The exemplary embodiment of FIG. 14 demonstrates the effect of magnetic $Fe_2O_3$ nanoparticles alone in W1 phase on the ELM extraction/recovery for Pb(II) under the following conditions: Span 80 concentration of 3% (W/V), D2EHPA carrier concentration of 2% (V/V), W1/O volume ratio of 1/1 (V/V), emulsification agitation speed to create emulsion of 6000 rpm, ELM (W1/O)/W2 volume ratio of 1/10, treatment agitation mixing speed of W2 of 300 rpm, and pH of W2 of 5.

Figure 15:
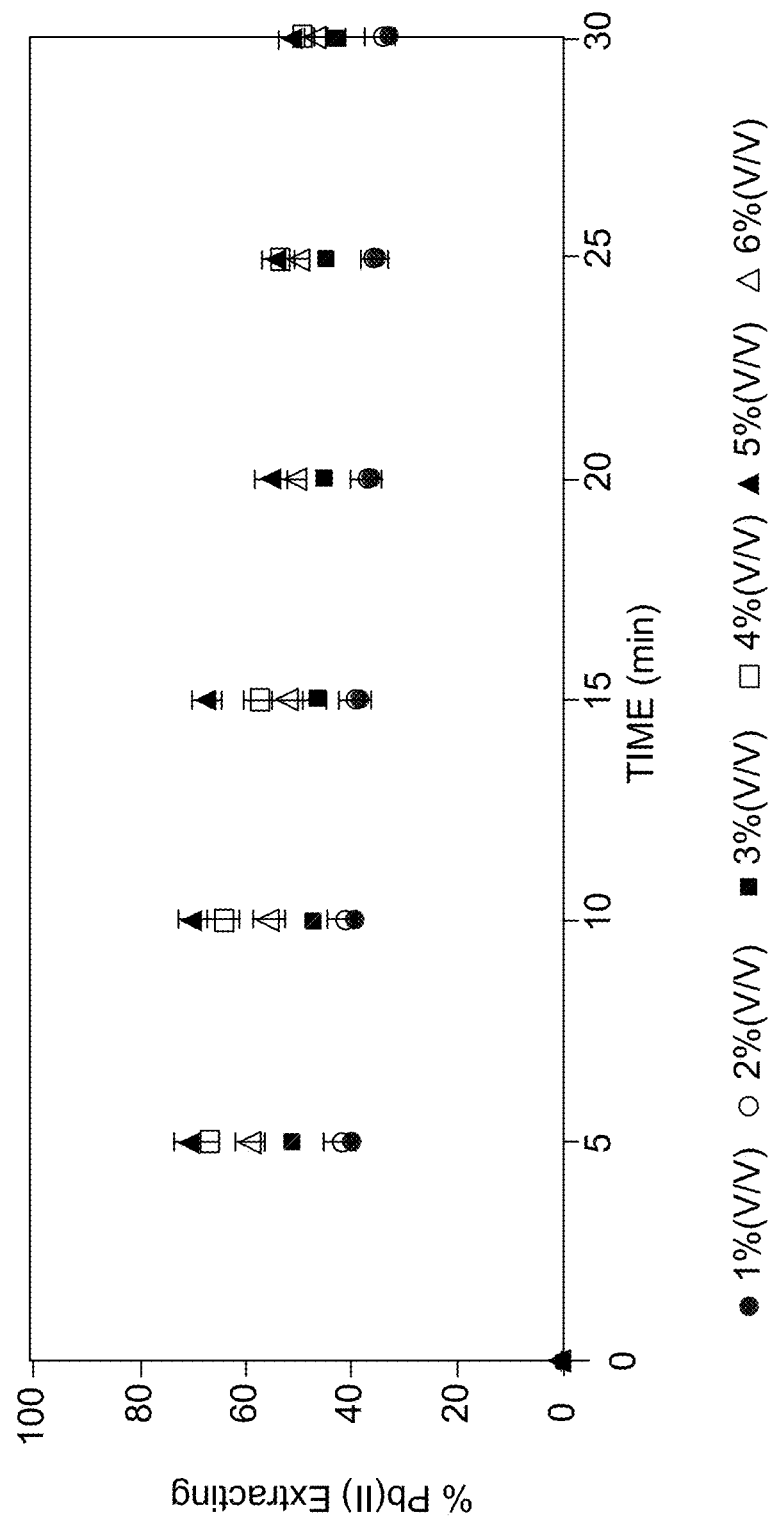
FIG. 15 is a graphical depiction of an exemplary embodiment of ELM performance in accordance with the present disclosure.

The exemplary embodiment of FIG. 15 demonstrates the effect of ionic liquid ([OMIM]PF6) in organic phase on the ELM extraction/recovery of Pb(II) under the following conditions: Span 80 concentration of 3% (W/V), D2EHPA carrier concentration of 2% (V/V), W1/O volume ratio of 1/1 (V/V), emulsification agitation speed to create emulsion of 6000 rpm, ELM (W1/O)/W2 volume ratio of 1/10, treatment agitation mixing speed of W2 of 300 rpm, and pH of W2 of 5.

Figure 16:
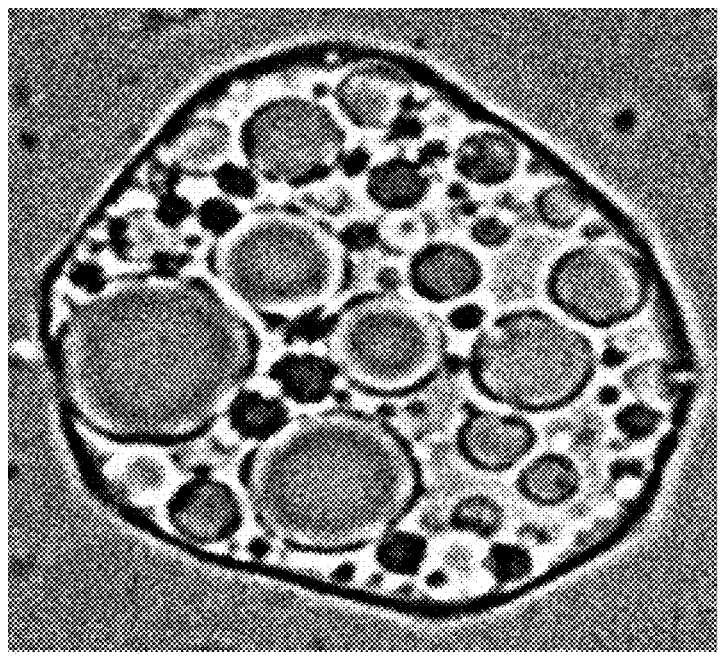
FIG. 16 is a graphical depiction of an exemplary embodiment of an ELM droplet in accordance with the present disclosure.

The exemplary embodiment of FIG. 16 depicts a microscope image of an emulsion droplet stabilized at the best conditions of the ELM process for Pb(II) removal: Span 80 concentration is 3% (W/V), D2HAPA concentration is 2% (V/V), W1/O volume ratio is 1/1 (V/V), emulsification speed is 6000 rpm, ELM:W2 volume ratio is 1:10 (V/V), mixing speed is 300 rpm, and pH is 1.5.

Figure 17:
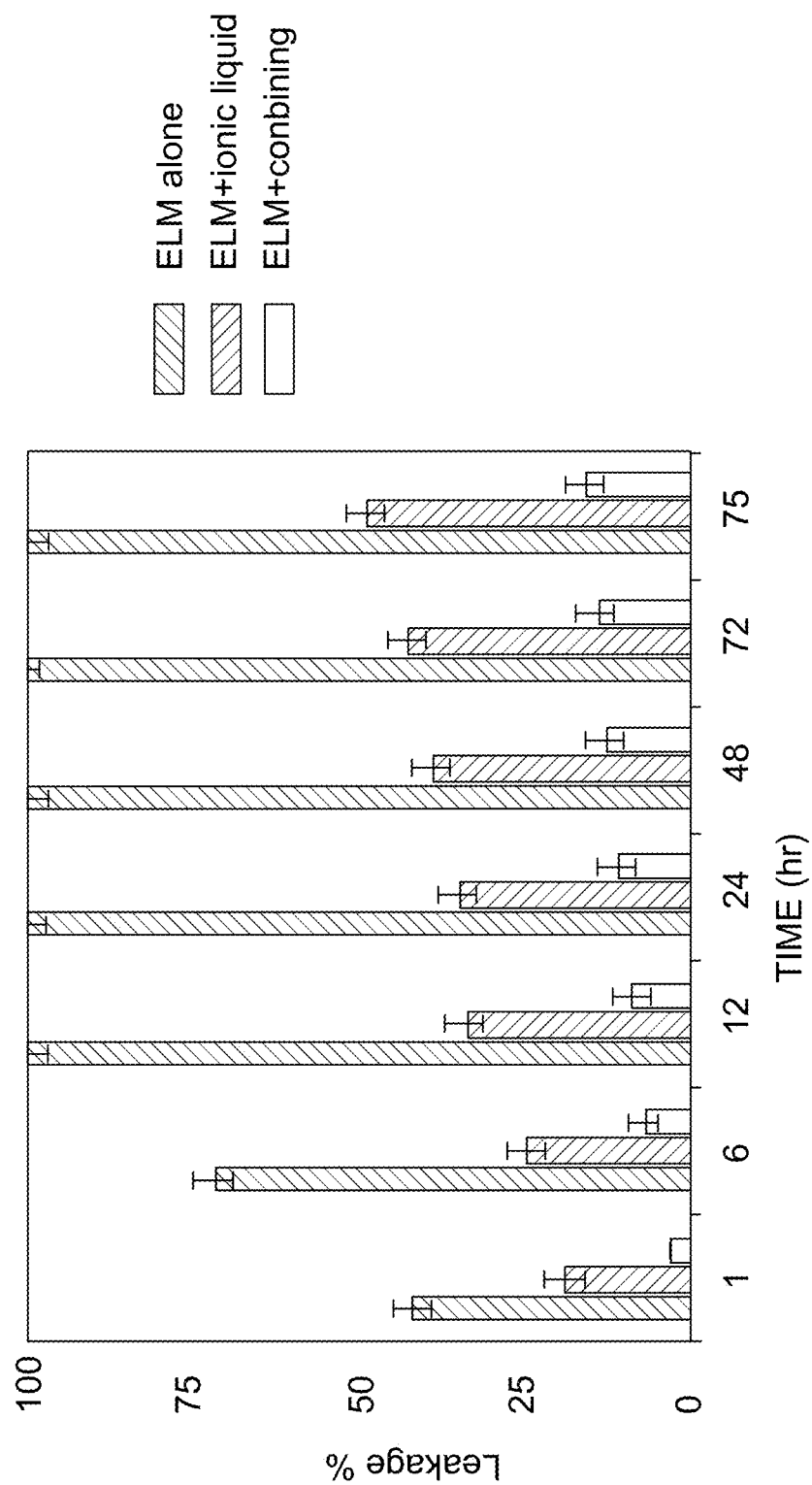
FIG. 17 is a graphical depiction of an exemplary embodiment of ELM performance in accordance with the present disclosure.

The exemplary embodiment of FIG. 17 demonstrates the effect of the combination 0.01% (W/W) magnetic $Fe_2O_3$ nanoparticles in W1 phase and 5% (V/V) ionic liquid ([OMIM]PF6) in O phase on the ELM emulsion stability under the following conditions: W1:O volume ratio of 1/3 (V/V), surfactant concentration of 2%, emulsification speed of 8000 rpm, ELM (W1/O)/W2 volume ratio of 1/2 (V/V), treatment agitation mixing speed of W2 of 300 rpm, and pH of W2 of 1.5.

The exemplary embodiments of FIGS. 18A-18G demonstrate the effect of the ELM extraction for vanadium under the following conditions: Span 80 concentration of 3% (W/V), D2EHPA carrier concentration of 2% (V/V), W1/O volume ratio of 1/1 (V/V), emulsification agitation speed to create emulsion of 6000 rpm, ELM (W1/O)/W2 volume ratio of 1/10, treatment agitation mixing speed of W2 of 300 rpm, and pH of W2 of 5.

Figure 19:
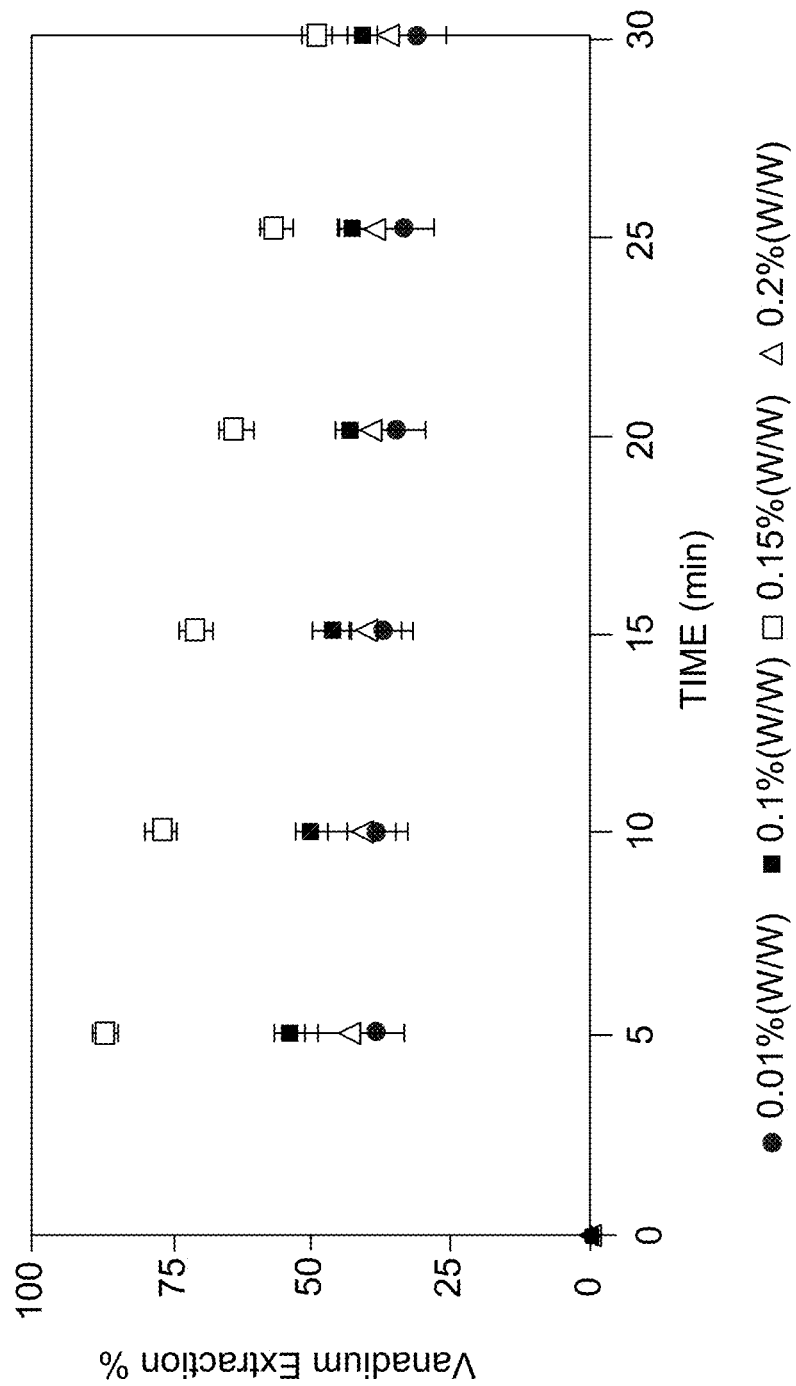
FIG. 19 is a graphical depiction of an exemplary embodiment of ELM performance in accordance with the present disclosure.

The exemplary embodiment of FIG. 19 demonstrates the effect of nanoparticles in W1 phase on the ELM extraction for vanadium under the following conditions: Span 80 concentration of 3% (W/V), D2EHPA carrier concentration of 2% (V/V), W1/O volume ratio of 1/1 (V/V), emulsification agitation speed to create emulsion of 6000 rpm, ELM (W1/O)/W2 volume ratio of 1/10, treatment agitation mixing speed of W2 of 300 rpm, and pH of W2 of 5.

Figure 20:
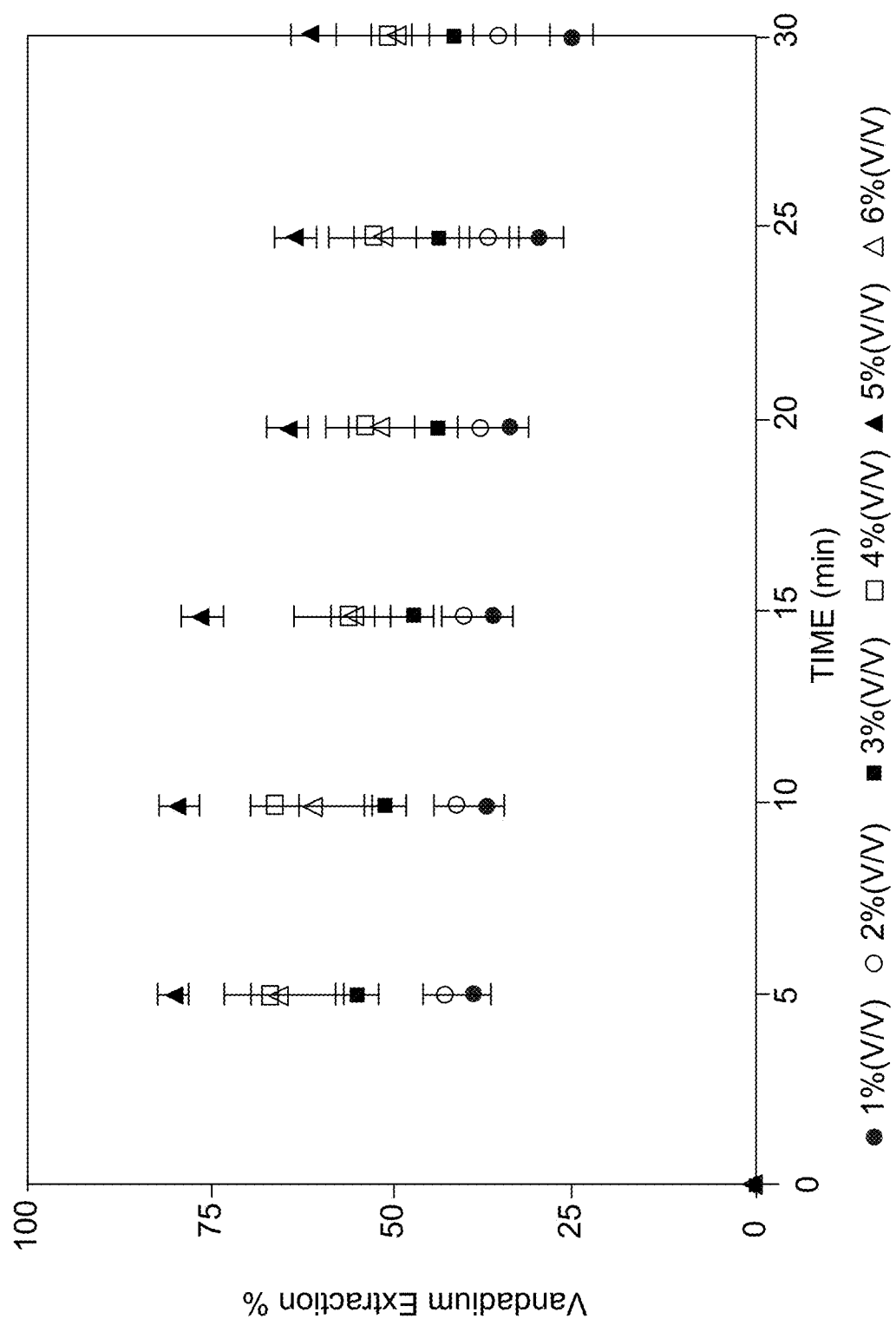
FIG. 20 is a graphical depiction of an exemplary embodiment of ELM performance in accordance with the present disclosure.

The exemplary embodiment of FIG. 20 demonstrates the effect of ionic liquid ([OMIM]PF6) in organic phase on the ELM extraction for vanadium under the following conditions: Span 80 concentration of 3% (W/V), D2EHPA carrier concentration of 2% (V/V), W1/O volume ratio of 1/1 (V/V), emulsification agitation speed to create emulsion of 6000 rpm, ELM (W1/O)/W2 volume ratio of 1/10, treatment agitation mixing speed of W2 of 300 rpm, and pH of W2 of 5.

Figure 21:
FIG. 21 is a graphical depiction of an exemplary embodiment of an ELM droplet in accordance with the present disclosure.

The exemplary embodiment of FIG. 21 depicts a microscope image of an emulsion droplet stabilized at the best conditions of the ELM process for vanadium removal: Span 80 concentration is 3% (W/V), D2HAPA concentration is 2% (V/V), W1/O volume ratio is 1/1 (V/V), emulsification speed is 6000 rpm, ELM:W2 volume ratio is 1:10 (V/V), mixing speed is 300 rpm, and pH is 1.5.

Figure 22:
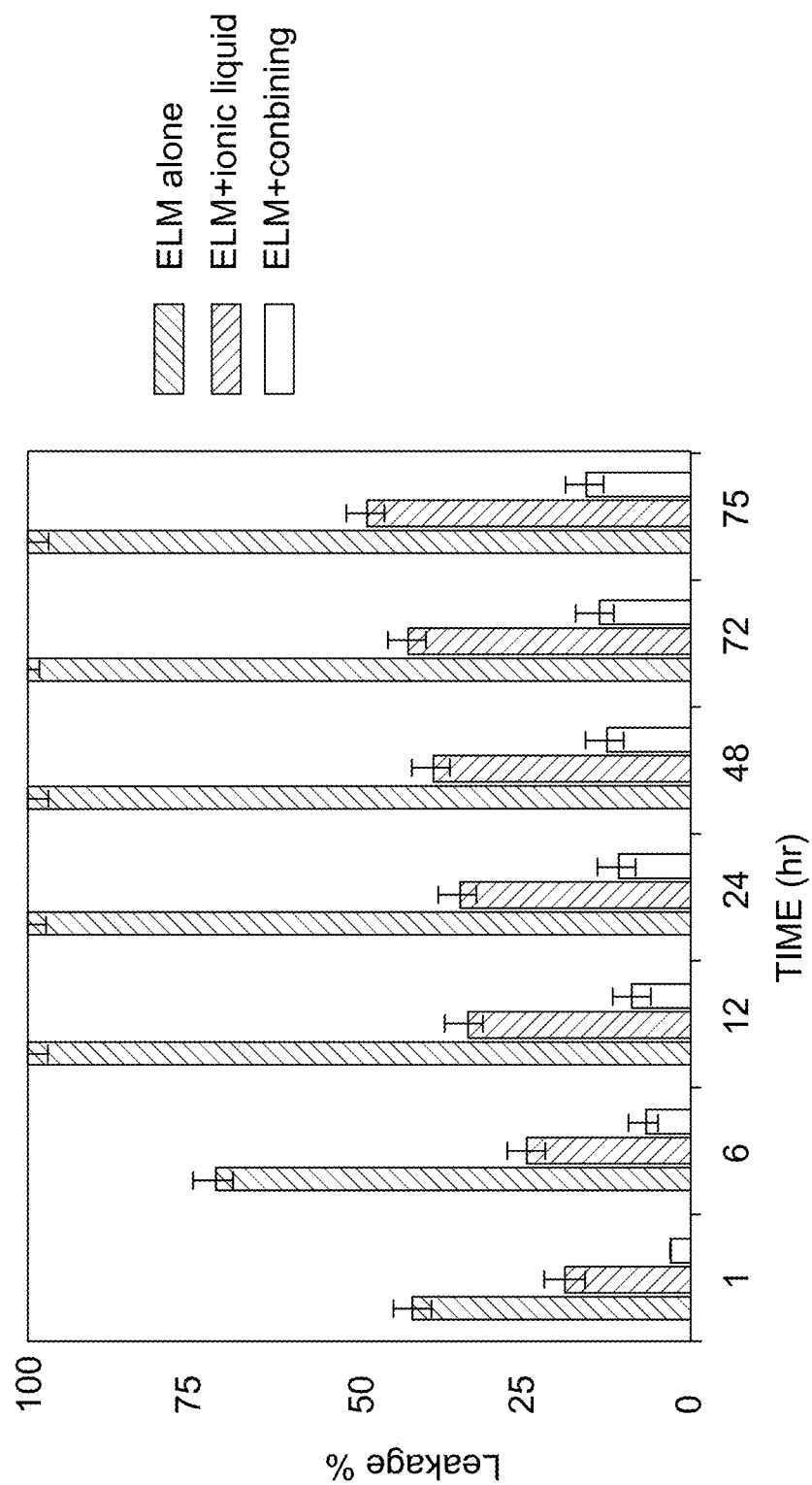
FIG. 22 is a graphical depiction of an exemplary embodiment of ELM performance in accordance with the present disclosure.

The exemplary embodiment of FIG. 22 demonstrates the effect of the combination of 0.01% (W/W) magnetic $Fe_2O_3$ nanoparticles in W1 phase and 5% (V/V) ionic liquid ([OMIM]PF6) in O phase on the ELM emulsion stability under the following conditions: W1:O volume ratio of 1/3 (V/V), surfactant concentration of 2%, emulsification speed of 8000 rpm, ELM (W1/O)/W2 volume ratio of 1/2 (V/V), treatment agitation mixing speed of W2 of 300 rpm, and pH of W2 of 1.5.

Figure 23:
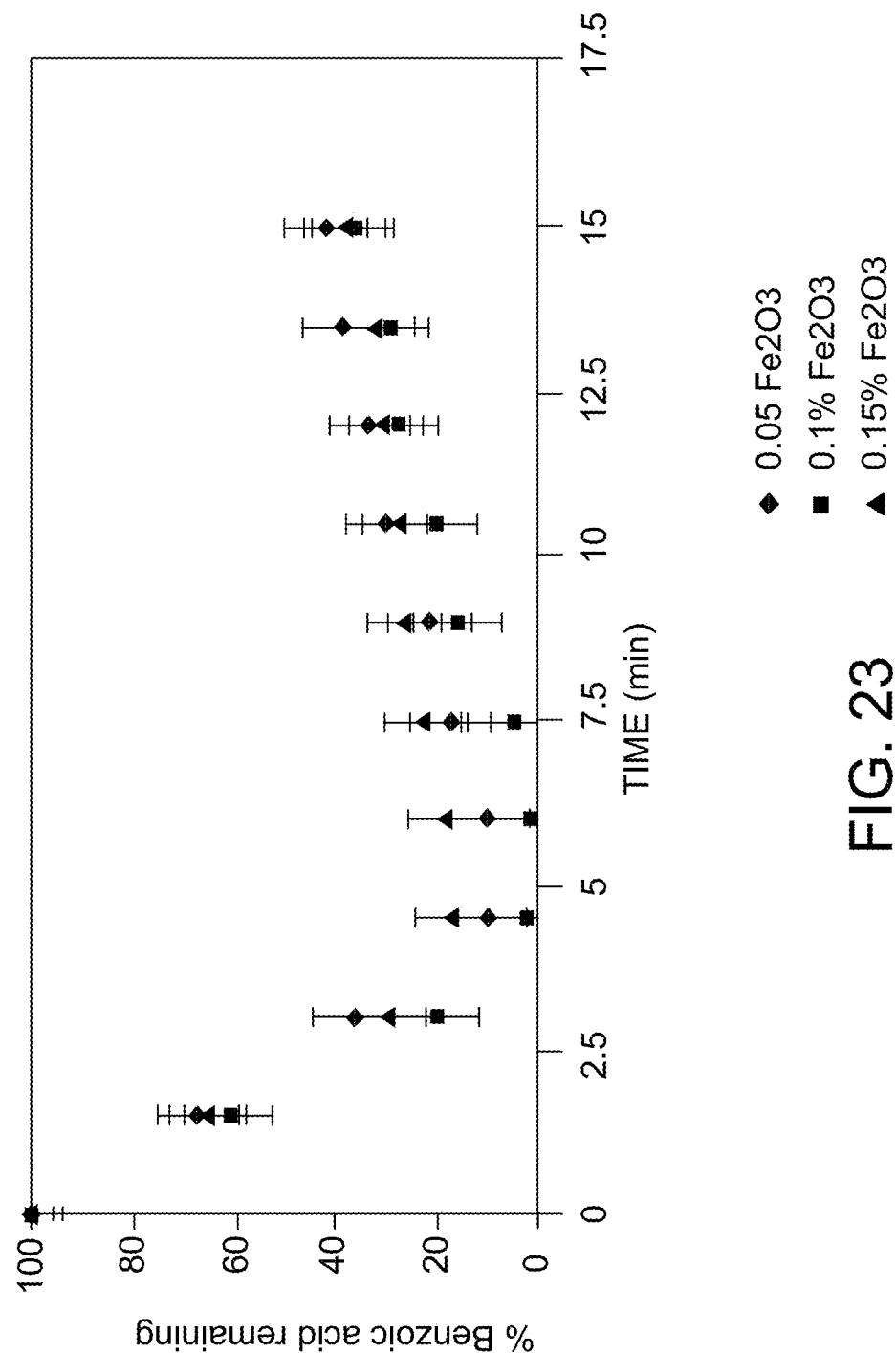
FIG. 23 is a graphical depiction of an exemplary embodiment of ELM performance in accordance with the present disclosure.

The exemplary embodiment of FIG. 23 demonstrates the effect of magnetic $Fe_2O_3$ nanoparticles in organic phase (O) on the ELM removal for benzoic acid under the following conditions: W1/O volume ratio is 1/3 (V/V), surfactant concentration is 2% (W/V), emulsification speed is 7000 rpm, ELM/W2 volume ratio is 1/12 (V/V), mixing speed is 300 rpm, and pH is 3.5.

Figure 24:
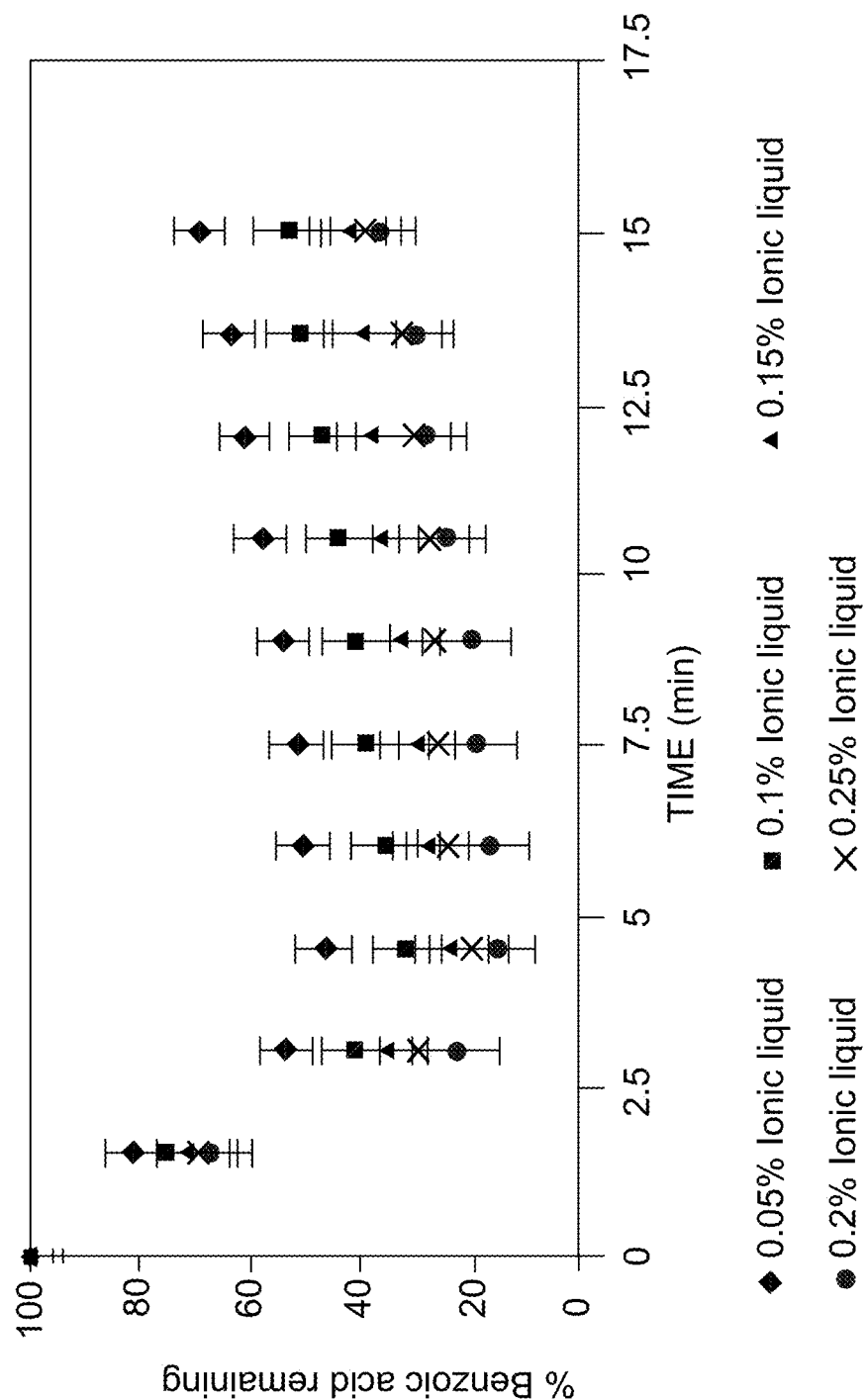
FIG. 24 is a graphical depiction of an exemplary embodiment of ELM performance in accordance with the present disclosure.

The exemplary embodiment of FIG. 24 demonstrates the effect of ionic liquid $[BMIM]^+[NTf_2]^-$ in organic phase (O) on the ELM removal for benzoic acid under the following conditions: W1/O volume ratio is 1/3 (V/V), surfactant concentration is 2% (W/V), emulsification speed is 7000 rpm, treatment volume ratio ELM/W2 is 1/12 (V/V), mixing speed is 300 rpm, and pH is 3.5.

Figure 25:
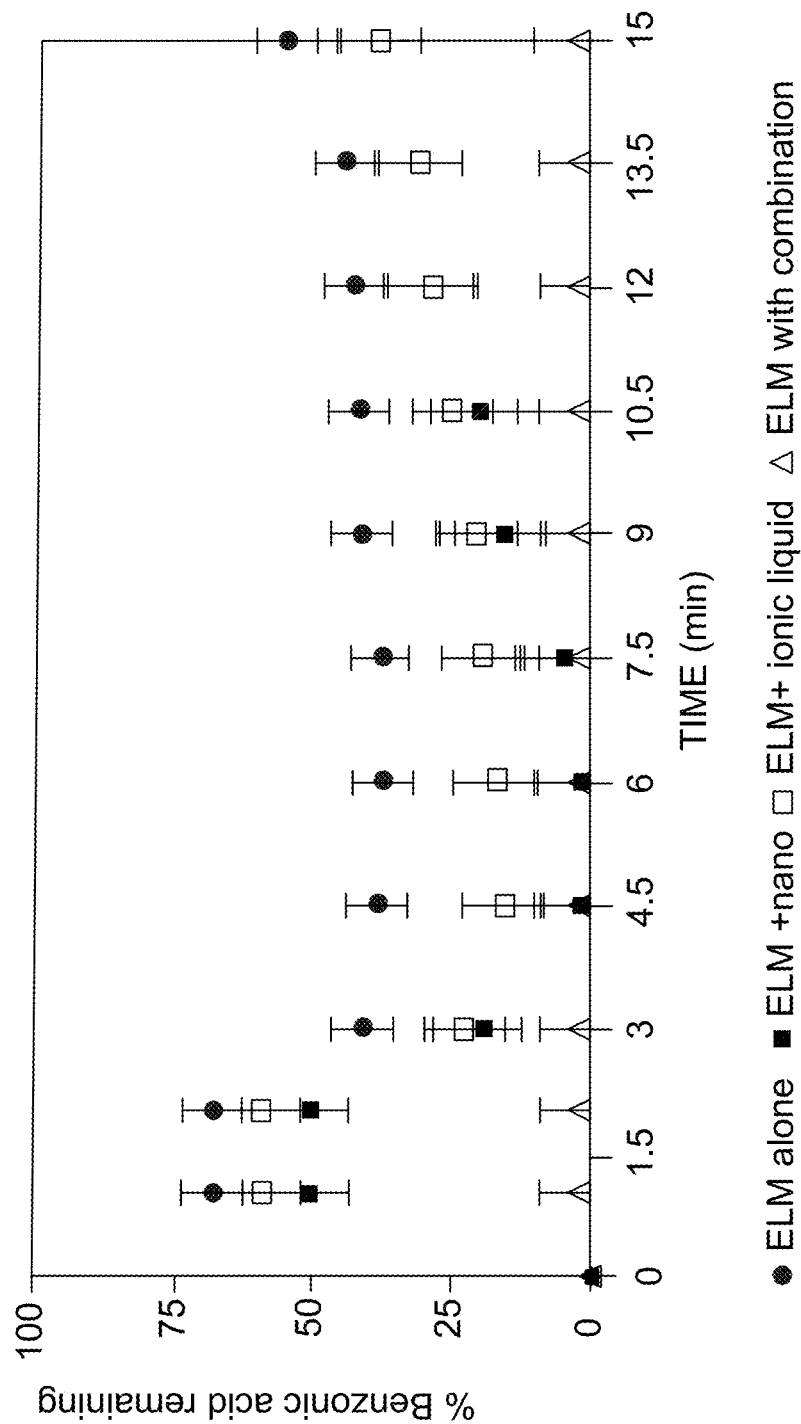
FIG. 25 is a graphical depiction of an exemplary embodiment of ELM performance in accordance with the present disclosure.

The exemplary embodiment of FIG. 25 demonstrates the effect of the combination 0.05% (W/W) magnetic $Fe_2O_3$ nanoparticles and 0.05% (V/V) ionic liquid $[BMIM]^+[NTf_2]^-$ in organic phase on the ELM removal for benzoic acid under the following conditions: W1/O volume ratio is 1/3 (V/V), surfactant concentration is 2% (W/V), emulsification speed is 7000 rpm, ELM/W2 volume ratio is 1/12 (V/V), mixing speed is 300 rpm, and pH is 3.5.

Figure 26:
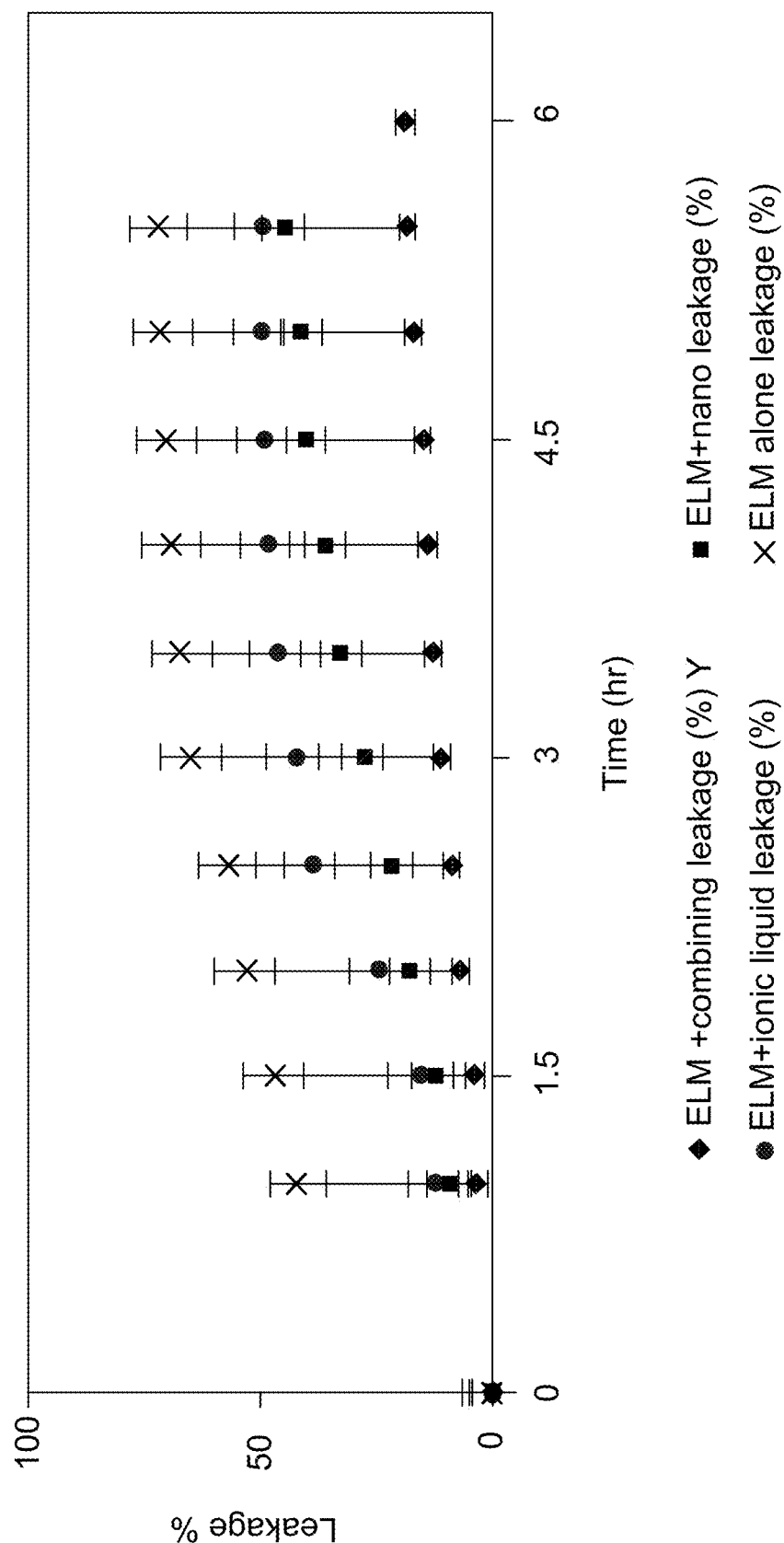
FIG. 26 is a graphical depiction of an exemplary embodiment of ELM performance in accordance with the present disclosure.

The exemplary embodiment of FIG. 26 demonstrates the effect of the combination 0.05% (W/W) magnetic $Fe_2O_3$ nanoparticles and 0.05% (V/V) ionic liquid $[BMIM]^+[NTf2]^-$ in organic phase on the ELM emulsion stability under the following conditions: W1/O volume ratio is 1/3 (V/V), surfactant concentration is 2% (W/V), emulsification speed is 7000 rpm, ELM/W2 volume ratio is 1/12 (V/V), mixing speed is 300 rpm, and pH is 3.5.

DETAILED DESCRIPTION OF THE DISCLOSURE

The present disclosure is directed to novel emulsion liquid membranes useful for extracting pollutants from industrial wastewater and water. The emulsion liquid membranes include, in various phases, at least one of nanoparticles, an ionic liquid, and combinations of nanoparticles and ionic liquids. Use of the present emulsion liquid membranes enhances the separation and the stability of the ELM method for pollutant extraction and recovery from wastewater and water.

In some embodiments, the present disclosure is directed to an emulsion liquid membrane (ELM). The ELM comprises an emulsion phase comprising a stripping aqueous phase dispersed in an organic membrane phase, wherein the stripping aqueous phase comprises nanoparticles and the organic phase optionally comprises an ionic liquid.

In some embodiments, the present disclosure is directed to an emulsion liquid membrane (ELM). The ELM comprises an emulsion phase comprising a stripping aqueous phase dispersed in an organic membrane phase, wherein the organic membrane phase comprises an ionic liquid and the stripping aqueous phase optionally comprises nanoparticles.

In some embodiments, the present disclosure is directed to a method for removing and/or extracting at least one metal. The method comprises dispersing an emulsion phase of an emulsion liquid membrane in an external aqueous phase (W2), wherein the emulsion phase of the emulsion liquid membrane comprises a stripping aqueous phase (W1) dispersed in an organic membrane phase, wherein the stripping aqueous phase comprises nanoparticles and a stripping agent and the organic phase optionally comprises an ionic liquid and wherein the external aqueous phase (W2) comprises at least one metal; and, removing and/or extracting the at least one metal, wherein the at least one metal is transferred from the external aqueous phase (W2) through the organic membrane phase to the stripping aqueous phase (W1) and the at least one metal reacts with the stripping agent in the stripping aqueous phase (W1) and is removed from the external aqueous phase (W2).

In some embodiments, the present disclosure is directed to a method for removing and/or extracting at least one hydrocarbon. The method comprises dispersing an emulsion phase of an emulsion liquid membrane in an external aqueous phase (W2), wherein the emulsion phase of the emulsion liquid membrane comprises a stripping aqueous phase (W1) dispersed in an organic membrane phase, wherein the organic membrane phase comprises an ionic liquid and the stripping aqueous phase comprises nanoparticles and a stripping agent and wherein the external aqueous phase (W2) comprises at least one hydrocarbon; and, removing and/or extracting the at least one hydrocarbon, wherein the at least one hydrocarbon is transferred from the external aqueous phase (W2) through the organic membrane phase to the stripping aqueous phase (W1) and the at least one hydrocarbon reacts with the stripping agent in the stripping aqueous phase (W1) and is removed from the external aqueous phase (W2).

Described herein, the extraction of pollutants, such as hydrocarbons and/or heavy metals, from industrial wastewater and water has been enhanced by combining an emulsion liquid membrane (ELM) with nanoparticles and an ionic liquid. An ELM comprises an organic membrane phase (O) that contains tiny drops of the stripping aqueous phase (W1), also known as the internal phase, dispersed in the water (W2), also known as the external phase, wherein the pollutants transfer through phase (O) from phase (W2) to phase (W1) to react with the stripping agent.

At least for hydrocarbons, the use of nanoparticles and an ionic liquid in the organic phase (O), as well as the use of the nanoparticles in the stripping aqueous phase (W1), either alone or with an ionic liquid in the membrane organic phase (O), significantly enhances the removal at a shorter time and enhances the emulsion stability.

At least for heavy metals, the use of nanoparticles in the stripping aqueous phase (W1) significantly enhances the removal at a shorter time and enhances the emulsion stability. If an ionic liquid is used in the organic membrane phase (O), the stability of the emulsion is further enhanced.

In some embodiments, extraction time represents ELM effectiveness. Extraction time represents the time for the concentration of a pollutant to reach approximately zero.

In some embodiments, ELM stability is determined by the following equation:

$$\text{Breaking rate \%} = \frac{V_r}{V_{int}} \times 100. \quad \text{(Equation 1)}$$

In Equation 1, $V_{int}$ is the remaining volume of the emulsion, and $V_r$ is defined as below:

$$V_r = V_{ext} * \frac{[(10^{-pH^0}) - (10^{-pH})]}{[(10^{-pH}) - (H^+)i]}. \quad \text{(Equation 2)}$$

$V_{ext}$ is the initial emulsion volume, $pH^0$ is the initial pH of the emulsion, pH is the pH of the emulsion after a certain time, and $(H^+)i$ is the initial concentration of protons in the internal phase.

In some embodiments, ELM stability is studied using a dye (e.g. a red dye) in (W1) as a breakage indicator at room temperature. The dye has no interaction with both organic and aqueous molecules. In some embodiments, the concentration of the dye that leaks from (W1) to (W2) is measured using a UV spectrophotometer (e.g. 96 well micro plates UV). In some embodiments, the percentage of leakage is determined by the following equation:

$$\% \text{ Leakage} = \frac{\text{dye Concentration in } (W2)}{\text{dye Concentration (with max. time allowed) in } W2} \times 100. \quad \text{(Equation 3)}$$

The dye concentration in W2 is the concentration of the dye in the external phase (W2) received from W1, and the concentration with maximum time allowed in W2 is the maximum concentration of the dye that is reached in the external aqueous phase (W2) when all the red dye leaked from the internal aqueous phase (W1) to the external aqueous phase (W2).

The percentage of contaminant extraction/recovery is calculated by the following equation:

$$\text{Extraction \%} = \frac{\text{initial concentration} - \text{final concentration}}{\text{initial concentration}} \times 100. \quad \text{(Equation 4)}$$

In many embodiments, ELM stability is studied with any suitable technique known in the art. In some embodiments, ELM stability is studied using a technique selected from the group consisting of UV spectrophotometry, atomic absorption, inductively coupled plasma (ICP), and combinations thereof. In some embodiments, when reagents are not used (e.g. in analyses of lead or vanadium), ELM stability is studied using a technique selected from the group consisting of atomic absorption, inductively coupled plasma (ICP), and combinations thereof.

Several variables affect the extraction of pollutants using ELM. These variables include, but are not limited to, pollutants, stripping agent, solvent, the volume ratio of the aqueous phase (W1) to organic phase (O) (W1/O ratio V/V), agitation intensity to form an emulsion (rpm) (emulsion agitation), surfactant concentration (% W/V), carrier concentration (% V/V), volume treatment ratio of (W1/O) to the aqueous wastewater (W2) (ELM/W2 ratio (V/V)), agitation intensity of the treatment and globules formation (rpm) (treatment agitation), magnetic nanoparticle and ionic liquid identities and concentrations, and pH of the external feed phase (W2). Given this wide array of variables, a given ELM process is optimized by determining the best combined values of these variables to extract a pollutant of interest in a system of interest. One main goal is to determine the lowest possible amount of nanoparticles and ionic liquid with the best performance of ELM in terms of the stability of the emulsion, high percentage extracting, and shorter duration time of the batch operation for extracting. In some embodiments, each variable is independently varied to determine the best extraction parameters. The importance of the noted variables, and non-limiting descriptions, follow.

Pollutant

In some embodiments, the pollutant is selected from the group consisting of hydrocarbons, heavy metals, radioactive metals, and combinations thereof.

In some embodiments, the hydrocarbon is selected from the group consisting of 4-nitrophenol, benzoic acid, and combinations thereof. In some embodiments, the hydrocarbon is selected from the group consisting of alkanes, alkenes, alkynes, and combinations thereof.

In some embodiments, the heavy metal is selected from the group consisting of lead (II), vanadium (V), and combinations thereof. In some embodiments, the heavy metal is a radio metal.

The reaction time depends on properties of the pollutants, such as size of the elements and the number of electrons in the outer orbital. In some embodiments, the extraction time is in the range of from about 10 seconds to about 3 minutes. In some embodiments, the extraction time is in the range of from about 10 seconds to about 30 seconds. In some embodiments, the extraction time is in the range of from about 1 minute to about 3 minutes.

Stripping Agent

In some embodiments, the stripping agent is selected from the group consisting of sodium hydroxide (NaOH), sulfuric acid ($H_2SO_4$), and combinations thereof.

Solvent

In some embodiments, the solvent is kerosene.

Surfactant

In some embodiments, a surfactant (e.g. Span 80) is used as an emulsifier in the organic phase (O). A surfactant has an important effect on the stability of the emulsion and the decrease of the emulsion leakage because it works as a protective barrier between the stripping agent (W1) and the external feed phase (W2). In some embodiments, decreasing the concentration of surfactant affects the extraction/recovery of contaminants negatively because the reduced surface tension of the emulsion causes the formation of small globules containing a small number of droplets of W1. However, in some embodiments, increasing the concentration of surfactant leads to an increase in leakage, a decrease in emulsion stability, and a decrease in extraction/recovery efficiency due to the formation of thicker emulsion globules.

In some embodiments, the surfactant concentration is at least 1% (W/V), at least 2% (W/V), at least 3% (W/V), at least 4% (W/V), or at least 5% (W/V). In some embodiments, the surfactant concentration is less than 1% (W/V), less than 2% (W/V), less than 3% (W/V), less than 4% (W/V), or less than 5% (W/V). In some embodiments, the surfactant concentration is about 3% (W/V).

In some embodiments, the surfactant is sorbitan monooleate.

Carrier

In some embodiments, a carrier (e.g. D2EHPA) is used as a carrier in the organic phase (O). The carrier has a significant effect on the pollutant extraction when the pollutant is insoluble in organic phase (O), because the insoluble pollutant needs a carrier to transport the pollutant from the external feed phase (W2) to the stripping agent (W1) through the organic phase (O).

In some embodiments, the carrier concentration is at least 1% (V/V), at least 2% (V/V), at least 3% (V/V), at least 4% (V/V), or at least 5% (V/V). In some embodiments, the carrier concentration is less than 1% (V/V), less than 2% (V/V), less than 3% (V/V), less than 4% (V/V), or less than 5% (V/V). In some embodiments, the carrier concentration is about 2% (V/V).

In some embodiments, the carrier is di-(2-ethylhexyl) phosphoric acid (D2EHPA).

Volume Ratio of the W1/O Phase

The W1/O volume ratio is vital in the stability of the emulsion because of its role in trapping the droplets of W1 in the organic phase (O) and reaction of the pollutant with the stripping agent (e.g. $H_2SO_4$) in W1. In some embodiments, high volume ratios lead to emulsion instability and reduced extraction/recovery efficiency. This is due to the increased resistance to diffusion through the membranes by the increased thickness of organic phase between droplets.

In some embodiments, the W1/O volume ratio is at least 1/1, at least 1/2, at least 1/3, at least 1/4, at least 1/5, or at least 1/6 (V/V). In some embodiments, the W1/O volume ratio is less than 1/1, less than 1/2, less than 1/3, less than 1/4, less than 1/5, or less than 1/6 (V/V). In some embodiments, the W1/O volume ratio is about 1/1 (V/V).

Agitation Intensity to Create Emulsification (Emulsion Agitation)

The agitation intensity to produce accurate emulsion is as important as forming a tunable emulsion that increases extraction/recovery efficiency. Increasing agitation improves emulsion stability through increased droplet formation and reduced interfacial tension between the aqueous and organic phases. Generally, increasing the droplet formation results in a highly viscous emulsion, and droplets merge with each other due to rapid mixing. However, in some embodiments, further increases beyond optimal values yields pollutant-carrier complexes with lower diffusion capability.

In some embodiments, the emulsion agitation intensity is at least 4000 rpm, at least 5000 rpm, at least 6000 rpm, at least 7000 rpm, or at least 8000 rpm. In some embodiments, the emulsion agitation intensity is less than 4000 rpm, less than 5000 rpm, less than 6000 rpm, less than 7000 rpm, or less than 8000 rpm. In some embodiments, the emulsion agitation intensity is about 6000 rpm.

The Volume Ratio of (W1/O) Globules to W2 Phase

The ratio of the ELM (W1/O) globules to the W2 volume plays an essential role in ELM performance. Suitable ratios provide an increase in the overall surface area for mass transfer and extraction/recovery capacity. In some embodiments, the emulsion stability is increased by reducing the volume fraction of the internal phase. Unsuitable ratios lead to an increase in the membrane (O) thickness around the droplets and consequently decrease the extraction/recovery efficiency. Also, the mechanical resistance of the membrane increases at a higher organic fraction, thereby preventing coalescence of the dispersed droplets and maintaining the size of the droplets to be within the range of the size of the standard droplets of 0.1-2 mm. In general, larger droplet sizes increase the emulsion instability because the droplets easily coalesce.

In some embodiments, the volume ratio of (W1/O) globules to W2 phase is at least 1/8 (V/V), at least 1/10 (V/V), at least 1/12 (V/V), or at least 1/15 (V/V). In some embodiments, the volume ratio of (W1/O) globules to W2 phase is less than 1/8 (V/V), less than 1/10 (V/V), less than 1/12 (V/V), or less than 1/15 (V/V). In some embodiments, the volume ratio of (W1/O) globules to W2 phase is about 1/10 (V/V).

The Agitation Intensity of the Mixing of (W1/O) Globules and W2 Phase (Treatment Agitation)

In some embodiments, agitation intensity affects stability by impacting emulsion leakage. At a low agitation intensity, the size of the emulsion globules increases, which causes a decrease in the mass transfer rate of pollutants. In some embodiments, increasing the agitation intensity decreases emulsion stability because of high-intensity products globules rupture, producing leakage of the W1 into the W2 phases. On the other hand, increasing the agitation intensity increases the contact area for mass transfer because of a decrease in the size of the globules. In some embodiments, this leads to emulsion breaking. The most desirable agitation intensities produce smaller globules and consequently, higher surface areas exposure, thereby resulting in a higher extraction/recovery rate.

In some embodiments, the treatment agitation intensity is at least 250 rpm, at least 300 rpm, or at least 400 rpm. In some embodiments, the treatment agitation intensity is less than 250 rpm, less than 300 rpm, or less than 400 rpm. In some embodiments, the treatment agitation intensity is about 300 rpm.

pH of the W2 Phase

The pH of phase W2 (e.g. wastewater) plays a significant role in the surface charges, states of functional groups on the surface of the adsorbent, and the contaminants and/or pollutants in the W2 phase. In some embodiments, at relatively high pH (e.g. pH 5 for wastewater), the extraction/recovery rate is increased due to an increase in the hydrogen ion ($H^+$) concentration of the external feed phase (W2), which reacts with a stripping agent when present in the W1 phase (e.g. $H_2SO_4$) to form a precipitate of acid-base complex. In some embodiments, decreasing the pH of the external feed phase W2 decreases the hydrogen ions ($H^+$) and thus reduces the extraction/recovery efficiency. In some embodiments, at relatively high pH, the surface is surrounded by $H^+$, thereby increasing the adsorption efficiency accounted for by the lower competition of $H^+$ with pollutants (e.g. vanadium) for the active sites. In some embodiments, this adsorption process is due to the interaction of positively charged pollutants (e.g. vanadium) with the positively charged surface.

In some embodiments, the pH of phase W2 is at least 1, at least 2, at least 3, at least 4, at least 5, or at least 6. In some embodiments, the pH of phase W2 is less than 1, less than 2, less than 3, less than 4, less than 5, or less than 6. In some embodiments, the pH of phase W2 is about 1.5. In some embodiments, the pH of phase W2 is about 3.5. In some embodiments, the pH of phase W2 is about 5.

Nanoparticles

Nanoparticles enhance the stability of the ELM method and solute removal by forming a protective film from the particles at (0/W) mediator and increasing the binding sites on surface of the solute.

In some embodiments, the nanoparticles have a diameter in the range of from about 1 nm to about 60 nm. In some embodiments, the nanoparticles have a diameter in the range of from about 1 nm to about 20 nm. In some embodiments, the nanoparticles have a diameter in the range of from about 30 nm to about 60 nm. In some embodiments, the nanoparticles have a diameter in the range of from about 20 nm to about 50 nm.

The use of larger nanoparticles in the range of from about 30 nm to about 60 nm decreases the required concentration of ionic liquid and nanoparticles. A decreased concentration of ionic liquid and nanoparticles is economically desirable for industrial processes.

In some embodiments, the nanoparticles are magnetic. In some embodiments, magnetic nanoparticles are recovered and recycled by applying a magnetic field upon completion of the separation. Recovery and recycling of nanoparticles is economically desirable for industrial processes. In some embodiments, collecting nanoparticles upon completion of the separation enhances the step of demulsifying.

In some embodiments, the nanoparticles comprise a compound selected from the group consisting of FeO, $Fe_2O_3$, $Fe_3O_4$, $Y_3Fe_5O_{12}$, $SrFe_{12}O_{19}$, $SmCo_5$, $Al_2O_3$, MgO, SiC, CuO, and combinations thereof.

Nanoparticles in the W1 Phase

The presence of the nanoparticles in the W1 phase enhances the emulsion stability and the mass transfer of the pollutant from W2 to W1 through the O phase. This improves the pollutant extraction/recovery due to its ability to form a protective film at the W1/O interface and increase the binding sites on the surface of internal phase droplets. But further increasing of the concentration of nanoparticles beyond the full coverage of the internal phase droplets, other nanoparticles will become dispersed in the external feed phase (W2), and some of the particles might form aggregates on the W1/O interface. In some embodiments, the slowed the transfer process and effected stability of emulsion decreases the efficiency.

In some embodiments, the nanoparticles are present in the internal phase (W1) in a concentration of up to about 0.01% (w/w). In some embodiments, the nanoparticles are present in the internal phase (W1) in a concentration of 0.01% (w/w). In some embodiments, the nanoparticles are present in the internal phase (W1) in a concentration of up to about 0.05% (w/w). In some embodiments, the nanoparticles are present in the internal phase (W1) in a concentration of 0.05% (w/w). The emulsion becomes more stable with this concentration of the nanoparticles by covering more of the emulsion droplet interface, thereby resulting in an increase in the separation efficiency. In some embodiments, beyond about 0.05% (w/w/), extra nanoparticles disperse in the aqueous feed phase and some of the particles form aggregates at the W1/O interface, which affects stability of emulsion and slows the transfer process, thereby decreasing the removal efficiency.

Nanoparticles in the O Phase

In some embodiments, the presence of nanoparticles in the O phase enhances the emulsion stability and the mass transfer of the pollutant from W2 to W1 through the O phase. This improves the pollutant removal due to its ability to form a protective film at the W1/O interface and increase the binding sites on the surface of internal phase droplets. But further increasing the concentration of nanoparticles beyond the full coverage of the internal phase droplets could result in nanoparticles being dispersed in the external feed phase (W2), and some of the particles aggregating on the W1/O interface. This slows the transfer process and affects the stability of the emulsion, thereby decreasing the efficiency.

In some embodiments, the nanoparticles are present in the organic phase in a concentration of from about 0.01% (w/w) to about 0.15% (w/w). In some embodiments, the nanoparticles are present in the organic phase in a concentration of from about 0.05% (w/w) to about 0.15% (w/w). In some embodiments, the nanoparticles are present in the organic phase in a concentration of from about 0.05% (w/w) to about 0.10% (w/w). In some embodiments, a concentration above 0.15% (w/w) causes the particles to aggregate on the (W1/O) interface, thereby affecting the emulsion stability and slowing the transfer process. Without being bound to any particular theory, the detrimental effect of high concentrations is thought to occur because the emulsion droplets tend to have non-spherical or non-uniform shapes at high concentrations.

Nanofluid

A nanofluid is defined as the suspension of nanometer-sized particles (typically <100 nm) in base fluids such as aqueous phase, ethylene glycol (EG), or engine oil. Nanofluids have emerged as new fluids during the last decade and have attracted much attention from researchers and scientists because of their unique chemical, physical, and mechanical properties. Because of the smaller sizes of nanoparticles (1-100 nm), they are a solution for minimizing erosion, sedimentation, and clogging that plagued the previously used or existing solid-liquid mixtures of larger particles. In some embodiments as examples and are not to be construed as limiting, the nanofluids enhance mass transfer rates.

Ionic Liquid in the O Phase

The use of an ionic liquid in the organic phase (O) with nanoparticles enhances the emulsion stability and improves the quality of extraction.

Increasing the concentration of ionic liquid generally increases the stability time. In some embodiments, at higher ionic liquid concentrations, the stability time decreases due to increased emulsion sedimentation from the high density of the ionic liquid. In some embodiments, the increase in ionic liquid concentration reduces interfacial tension by adsorbing in the W1-O interface, thereby minimizing the repulsion of the hydrophilic head-groups of the surfactant, which contributes to a more efficient packing of the surfactant at the interface and reduces the droplet size of W1.

Further, in some embodiments, Coulombic interactions occur between the charges on the stripping agent and ions of the ionic liquid. These strong interactions improve the stability of emulsions by lowering the coalescence of the internal droplets. In some embodiments, hydrogen bonding occurs between the ionic liquid and an [OH] group of the carrier. This hydrogen bonding creates a strong protection surrounding the internal droplets to avoid coalescence.

In some embodiments, the ionic liquid is selected from the group consisting of 1-butyl-3-methylimidazolium bis(trifluoromethylsulfonyl)imide ([BMIM][NTf$_2$]), 1-Methyl-3-octylimidazolium hexafluorophosphate ([OMIM]PF$_6$), and combinations thereof.

In some embodiments, the ionic liquid is present in the organic phase in a concentration of up to about 0.05% (v/v). In some embodiments, the ionic liquid is present in the organic phase in a concentration of 0.05% (v/v). The addition of ionic liquid reduces the interfacial tension through adsorption at the W/O interface and thereby minimizes the repulsion of the hydrophilic head groups of the surfactants. This results in a more efficient packing of the surfactants at the interface and reduces the internal phase droplet size.

Ionic Liquid in the O Phase and Nanoparticles in the W1 Phase

In some embodiments, ionic liquid in the organic phase and nanoparticles in the W1 phase each independently improve extraction. The stabilization of ELMs with nanoparticles enhances the strength between emulsion droplets and prevents collision or coalescence of the droplets. In addition, the nanoparticles form a protective film from the particles at W1 mediator and increase the binding sites on the surface of the solute. The emulsion becomes more stable with this concentration of the nanoparticles by covering more of the emulsion droplet interface, thereby resulting in an increase in the extraction efficiency. Hence, the combination enhances the stability and forms droplets that are particularly stable in the emulsion. Thus, in some embodiments, the combination of ionic liquid and nanoparticles effects further improves extraction, and in some cases, synergistically improves extraction.

In some embodiments, the combination of an ionic liquid and nanoparticles synergistically improves extraction. In some embodiments, the combination of an ionic liquid and nanoparticles synergistically increases emulsion stability, increases extraction efficiency, decreases leakage, and/or decreases extraction time.

Ionic Liquid in the O Phase and Nanoparticles in the O Phase

In some embodiments, ionic liquid in the organic phase and nanoparticles in the organic phase each independently improve extraction. The removal efficiency is further increased with the combination of ionic liquid and nanoparticles. In some embodiments, the removal efficiency is increased at a shorter duration time by the combination of ionic liquid and nanoparticles due to the coverage of more internal phase droplet interfaces. In some embodiments, the leakage is decreased with higher emulsion stability times. Hence, the combination enhances the stability and forms droplets that are particularly stable in the emulsion. Thus, in some embodiments, the combination of ionic liquid and nanoparticles effects further improves extraction, and in some cases, synergistically improves extraction.

In some embodiments, the combination of an ionic liquid and nanoparticles synergistically improves extraction. In some embodiments, the combination of an ionic liquid and nanoparticles synergistically increases emulsion stability, increases extraction efficiency, decreases leakage, and/or decreases extraction time.

EXAMPLES

Without further elaboration, it is believed that one skilled in the art using the preceding description can utilize the present invention to its fullest extent. The following Examples are, therefore, to be construed as merely illustrative, and not limiting of the disclosure in any way whatsoever.

Example 1. Typical Synthesis Procedure

An ELM (W/O) extraction method as a batch reactor is prepared by first forming an emulsion from two immiscible liquid phases (aqueous and organic). The emulsion is characterized by aqueous droplets distributed in the organic phase. An internal aqueous phase (W1) (e.g. NaOH (0.5 N) solution) containing a stripping agent is mixed with an organic membrane phase (O) (e.g. surfactant Span-80 and oil phase kerosene and optionally D2EHP) to create an emulsion. Volumetric ratios of W1 to organic phase (W1/O) are mixed using an ultra-high-speed homogenizer (e.g. Turrax IKA-T25), which operates at high rotational speeds (e.g. 8000 rpm) for 10 minutes to produce a liquid membrane. In some embodiments, the liquid membrane has a distinct appearance (milky white color).

Next, this emulsion is dispersed as globules in the external phase (W2) (e.g. wastewater) having a contaminant (e.g. hydrocarbons 300 ppm) and stirred with low speed agitation (e.g. 300 rpm) for 15 minutes via an overhead stirrer. Then samples from the agitated solution are taken at different periods of time using a micropipette, and subsequently separated from the emulsion phase (e.g. with a 0.2 µm nylon syringe filter). In some embodiments, the amount of hydrocarbons is analyzed with a UV spectrophotometer in a 96 well UV-microplate. In some embodiments, at the end of the extraction, the mixture is placed in a separation funnel to separate the upper emulsion phase (e.g. W1/O) and the lower aqueous feed phase (e.g. W2).

In some embodiments, when magnetic particles are present, a magnetic field (e.g. from a 1 T magnet) is applied to pull the nanoparticles from their phase by the magnetic field and drive demulsification. In some embodiments, when there is no change in the chemistry of the organic phase (O), the kerosene and/or other organic phase components are reused. In some embodiments, the aqueous phase is separated from the organic phase by heating (e.g. at 80° C. for 1 hour in a closed vessel) for final recovery of the phase containing the contaminant. In some embodiments, oil from the broken emulsion is separately collected after the nanoparticles are collected. In some embodiments, the accumulated $Fe_2O_3$ nanoparticles are washed (e.g. with acetone and distilled water) and then dried (e.g. under vacuum at 50° C. for 10 hours) for reuse. In some embodiments, the recycled nanoparticles and the organic phase are used to prepare a new ELM experiment. FIGS. 5 and 6 depict representative examples of a typical experimental procedure and a resultant ELM.

Example 2. Parameter Optimization

A given ELM process is optimized by determining the best combined values of variables to extract a pollutant of interest in a system of interest. Each variable is independently varied to determine the best extraction parameters.

The following optimization is an example and not to be construed as limiting.

For extraction of some heavy metals, in some embodiments, the optimal, or near-optimal, values of certain parameters are as follows: volume ratio of W1 to 0 (1/1 V/V), surfactant concentration (3% W/V), carrier concentration (2% V/V), emulsion agitation (6000 rpm), volume ratio of emulsion (W1/O) to W2 (1/10 V/V), treatment agitation (300 rpm), and pH of W2 of 5.

For extraction of some hydrocarbons, in some embodiments, the optimal, or near-optimal, values of certain parameters are as follows: volume ratio of W1 to 0 (1/3 V/V), surfactant concentration of 2% (W/V), emulsion agitation (8000 rpm), volume ratio of ELM to W2 (1/2 V/V), treatment agitation (300 rpm), and pH of W2 of 1.5.

For extraction of other hydrocarbons, in some embodiments, the optimal, or near-optimal, values of certain parameters are as follows: volume ratio of W1 to 0 (1/3 V/V), surfactant concentration of 2% (W/V), emulsion agitation (7000 rpm), volume ratio of ELM to W2 (1/12 V/V), treatment agitation (300 rpm), and pH of W2 of 3.5.

For extraction of still other hydrocarbons, in some embodiments, the optimal, or near-optimal, values of certain parameters are as follows: volume ratio of W1 to 0 (1/3 V/V), surfactant concentration of 2% (W/V), emulsion agitation (8000 rpm), volume ratio of ELM to W2 (1/12 V/V), treatment agitation (300 rpm), pH of W2 of 1.5, and nanoparticles in the organic phase.

Example 3. Compositions for Extracting/Recovering 4-Nitrophenol from Water and Wastewater The materials that used in this example were Kerosene (Boiling Point 175-325° C.) as the organic phase, Span-80 (sorbitan monoolate) as the surfactant, sodium hydroxide pellets (NaOH) as the stripping agent, hydrochloric acid (HCl), 4-Nitrophenol, ionic liquid 1-butyl-3-methylimidazolium bis(trifluoromethylsulfonyl)imide ([BMIM]$^+$ [NTf2]$^-$), and magnetic $Fe_2O_3$ nanoparticles with a size range (30-60 nm). These sizes of nanoparticles are economically advantageous over similar nanoparticles of smaller particle sizes, which is an important factor for large-scale applications. The magnetic property of nanoparticles has been chosen for easy removal and recycling by a magnetic field. Additionally, this will improve the step of demulsification and separation of the formed solids and the recycling of the nanoparticles and the organic phase as well since the chemistry of the organic phase (O) will not be altered.

In this example, the ELM (W1/O/W2) has been applied since the pollutants are in the aqueous phase. The emulsion is created by mixing the organic phase (O) with the aqueous internal phase (W1) that contains the stripping agent as the reactant of 0.5 NaOH solution at a high agitation speed of rotation per minutes (rpm) of the mixer to produce an emulsion of small aqueous droplets in the organic phase. The organic phase (O) contains surfactant Span 80 and kerosene. The emulsion (W1/O) is then dispersed in the external feed (wastewater) phase (W2), where the presence of hydrocarbon contaminants (e.g. 4-Nitrophenol) forms globules of the organic phase (O) containing tiny droplets of the aqueous internal phase (W1). The contaminant transfers from the W2 by cooperating with the carrier through the organic (O) phase to the W1 phase, where it reacts with the stripping agent (NaOH) to form a solute precipitate.

Preparation of the nanofluids with suspension characteristics during the utilization is essential for the successful use of nanofluids. Nanoparticles $Fe_2O_3$, MgO, and $Al_2O_3$ with a size range of 20 nm to 50 nm were suspended with a stripping agent (W1) to prepare the nanofluids. Weight fractions ranging in 0.01% (W/W) of nanoparticles were mixed with the W1 using an IKA ULTRA-TURRAXR T-25 Digital Homogenizer at 5000 rpm for 45 minutes to ensure complete dispersion of the nanoparticles in the base fluid. An ultrasonic bath was used to break down the finer nanoparticle aggregates for 60 min.

In some embodiments, the values of the reaction variables to give the best combination for the removal of hydrocarbons are: surfactant (Span 80) concentration of 2% (W/V), W1/O ratio (V/V) of 1/3, emulsion agitation of 8000 rpm, ELM/W2 V/V of 1/2, treatment agitation of 300 rpm, and pH of W2 of 1.5. 0.05% (W/W) magnetic $Fe_2O_3$ nanoparticles and 0.05% (V/V) of the ionic liquid [BMIM]$^+$[NTf2]$^-$ in the organic phase (O) were also used.

The emulsion (W1/O) was dispersed and mixed (IKA overhead stirrer Model: RW20 digital) with the external feed wastewater phase (W2) that contains 4-Nitrophenol. Samples from the agitated solution at 300 ppm were taken at different periods of time using a micropipette, and then separated from the emulsion phase using a nylon syringe filter of 0.2 µm. 4-Nitrophenol was analyzed using a 96 well UV-microplate at a wavelength band range of 200 to 900 nm. The concentrations of 4-Nitrophenol, and Sodium 4-Nitrophenolate were found from the absorbance-calibration curves.

In some embodiments, at the end of the 4-Nitrophenol removal, the mixtures are placed in a separating funnel to separate the upper emulsion phase (W1/O) and the lower aqueous feed phase (W2). Then a magnetic field (1 T magnet) is applied on the upper phase which pulls the nanoparticles from the emulsion phase (W1/O) by the magnetic field, and demulsification occurs. In some embodiments, since this will not change the chemistry of the organic phase (O), the organic phase is reused. In some embodiments, the aqueous phase and solid precipitate are separated and filtered. In some embodiments, the accumulated $Fe_2O_3$ nanoparticles are washed with acetone and distilled water and then dried under vacuum at 50° C. for 10 hours for reuse. In some embodiments, the recycled nanoparticles and the organic phase are used to prepare a new ELM experiment.

In the method of ELM, the contaminants are removed by mass transfer with chemical reaction of the contaminant compounds reached to the aqueous droplets (W1) in the organic globules with the stripping agent (reaction agent) to form precipitate solid in W1, as per the reaction below for 4-Nitrophenol with NaOH. This means that the driving force of the concentration gradient of the contaminants transports from W2 to W1 through O membrane remains at its maximum and hence the transport of the contaminants continues until about the completion of the removal.

$C_6H_4NO_2OH+NaOH \rightarrow C_6H_4NO_2O^-Na^++H_2O$ (Reaction Scheme 1).

The stability of the emulsion is the key factor to enhance the removal efficiency. Because the 4-Nitrophenol transports from the feed phase (W2) to NaOH in W1 phase, it follows the facilitated transport mechanism as given in Reaction Scheme 1. The 4-Nitrophenol released from wastewater diffuses across the organic membrane to encapsulate-receiving phase (NaOH). The formed Sodium 4-Nitrophenolate is not soluble in the membrane phase and then it is trapped in NaOH. Zero concentration of 4-Nitrophenol in the stripping phase results in a high concentration gradient, and a high driving force through membrane phase, and hence the removal process continues until it is completely extracted.

Experiments were performed to confirm the best values of the variables to be used to inspect the effects of magnetic $Fe_2O_3$ nanoparticles and ionic liquid [BMIM]$^+$[NTf$_2$]$^-$ on the removal of 4-Nitrophenol and its duration and the emulsion stability. For all these experiments, the stability of emulsion was examined using the dye method. The 4-Nitrophenol removal of 63% during 15 min of batch operation was obtained with the earlier defined best values.

The effects of the magnetic nanoparticles $Fe_2O_3$ and ionic liquid [BMIM]$^+$[NTf2]$^-$ in the organic phase (O) on the removal of 4-Nitrophenol using the best values of the variables have been investigated. The removal efficiency of 4-Nitrophenol was enhanced to 94% after 15 minutes in one batch of operation by adding magnetic $Fe_2O_3$ nanoparticles alone in organic (O) phase in the first 5 min with increasing the concentration of magnetic $Fe_2O_3$ nanoparticles to 0.1% (W/W). The removal efficiency of 4-Nitrophenol was enhanced to 84% after 15 minutes in one batch of operation by adding ionic liquid [BMIM]⁺[NTf₂]⁻ alone in organic (O) phase in the first 5 min with increasing the concentration of ionic liquid [BMIM]⁺[NTf₂]⁻ to 0.2% (V/V). The combining of 0.05% (W/W) magnetic Fe₂O₃ nanoparticles and 0.05% (V/V) ionic liquid [BMIM]⁺[NTf₂]⁻ in the O phase yields removal of 4-Nitrophenol of 99% at 1 minute which continues till the end of the reaction after 15 minutes. For all the experiments performed here the stability of emulsion was examined using dye method and each experiment was repeated three times. The results from this study indicated that the ratio % (W/W) of magnetic Fe₂O₃ nanoparticles and (V/V) of ionic liquid [BMIM]⁺[NTf2]⁻ elevates the 4-Nitrophenol removal as present in Tables 1 and 2. The higher removal efficiency of 4-Nitrophenol was enhanced to 99.5% at 1 minute in one batch of operation by adding magnetic Fe₂O₃ nanoparticles alone in the W1 phase. The results are shown in FIGS. 7 and 8.

The lowest leakage and higher stability time were obtained by doing this combination starting after 1 hour and remain during the testing period. This means that this combination of 0.05% (W/W) magnetic Fe₂O₃ nanoparticles and 0.05% (V/V) ionic liquid [BMIM]⁺[NTf₂]⁻ in O phase improves the stability of ELM. So the above combination enhanced the stability and stability of droplets in the emulsion. The degree of stability in emulsion is depends on the emulsification process and the composition of the membrane.

A composition comprising about 0.05% (w/w) of Fe₂O₃ nanoparticles and about 0.05% (v/v) of an [BMIM][NTf₂] ionic liquid in organic phase (O) yields enhanced removal of 99.70% hydrocarbons in about 1 minute.

TABLE 1

0.05% (W/W) Fe₂O₃ nanoparticles with diameters in the range of about 30 nm to about 60 nm combined with a 0.05% (V/V) [BMIM][NTf₂] ionic liquid used to extract 4-nitrophenol from water.

| Time (min) | (W1 + nano) + (O + ionic liquid) + W2 | W1 + (O + ionic liquid) + (W2 + nano) | (W1 + nano) + (O + ionic liquid) + (W2 + nano) |
|---|---|---|---|
| 1 | 50.00 | 40.00 | 61.67 |
| 2 | 94.53 | 92.73 | 98.83 |
| 3 | 98.33 | 98.33 | 99.33 |

A composition comprising about 0.05% (w/w) of Fe₂O₃ nanoparticles and about 0.05% (v/v) of an [BMIM][NTf₂] ionic liquid in organic phase (O) yields enhanced removal of 99.33% hydrocarbons in about 3 minutes.

TABLE 2

0.05% (W/W) Fe₂O₃ nanoparticles with diameters in the range of about 30 nm to about 60 nm used to extract 4-nitrophenol from water.

| Time (min) | (W1 + nano) + O + W2 | (W1 + nano) + O + (W2 + nano) | W1 + O + (W2 + nano) |
|---|---|---|---|
| 1 | 99.50 | 58.37 | 45.83 |
| 2 | 99.33 | 98.83 | 78.93 |
| 3 | 99.00 | 99.33 | 89.24 |

In summary, at the best conditions, the removal of 4-Nitrophenol was achieved with an efficiency of 63% from synthetic wastewater within 15 minutes and 27% of emulsion stability during 6 hours.

Magnetic Fe₂O₃ nanoparticles enhance the stability of the ELM and removal activity due to the ability of forming protective film by the particles at (0/W) mediator and increased the binding sites on surface of the solute.

The results indicate that the ratio 0.1% (W/W) of magnetic Fe₂O₃ nanoparticles in O phase elevates the 4-Nitrophenol removal to 93% at 15 minutes and 54% of the emulsion stability during 6 hours.

0.05% (W/W) of magnetic Fe₂O₃ nanoparticles in W1 phase elevates the 4-Nitrophenol removal to 99.5% at 1 minute and 54% of the emulsion stability during 6 hours.

0.05% (W/W) of magnetic Fe₂O₃ nanoparticles in W2 phase elevates the 4-Nitrophenol removal to 89.2% at 3 minutes and 54% of the emulsion stability during 6 hours.

0.05% (W/W) of magnetic Fe₂O₃ nanoparticles in W1 and W2 phase elevates the 4-Nitrophenol removal to 99% at 3 minutes and 54% of the emulsion stability during 6 hours.

Ionic liquid [BMIM]⁺[NTf2]⁻ 0.2% (V/V) results in an increase in stability from 27% to 49% of emulsion stability during 6 hours. Ionic liquid concentration lead to a decrease in stability time because of increased emulsion sedimentation and the high density of [BMIM]⁺[NTf2]⁻. Coulombic interactions of the ion charges in [BMIM]⁺[NTf2]⁻ and NaOH cause the increased in stability by reducing the droplets tendency to coalesce and reduce the interfacial tension. The removal efficiency with the concentration of 0.2% (V/V) of ionic liquid [BMIM]⁺[NTf2]⁻.

Combining both magnetic Fe₂O₃ nanoparticles and ionic liquid [BMIM]⁺[NTf2]⁻ gives the lowest leakage and higher stability time starting after 1 hour and the emulsion stability was improved significantly to 81% for 6 hours and throughout the testing period.

The best concentration obtained was 0.05% (W/W) Fe₂O₃ in W1 phase, which gives higher removal efficiency for 4-Nitrophenol of 99.5% in 1 minute.

Example 4. Compositions for Extracting/Recovering 4-Nitrophenol from Water and Wastewater The materials that are used in this example were Kerosene (Boiling Point 175-325° C.) as the organic phase (O), Span-80 (sorbitan monoolate) as the surfactant, sodium hydroxide (NaOH) as the stripping agent to react with the hydrocarbon pollutants to form solid precipitate, hydrochloric acid (HCl) to adjust for the pH of W2,4-Nitrophenol, ionic liquid of 1-butyl-3-methylimidazolium bis(trifluoromethylsulfonyl)imide ([BMIM]⁺[NTf2]⁻), and magnetic Fe₂O₃ nanoparticles with a size range of 30-60 nm. The magnetic property of nanoparticles allows for easy removal and recycling by a magnetic field. Furthermore, magnetic properties enhance the step of demulsification and separation of the formed solids and the recycling of the nanoparticles and the organic phase as well because the chemistry of the organic phase (O) is not altered.

In this example, ELM of W1/O/W2 phases has been implemented since the pollutants are in the aqueous phase. The organic phase (O) represents the membrane that is part of the emulsion formed by mixing the organic phase (O) with the aqueous phase (W1) (internal phase) that contains the stripping agent as the reactant of 0.5 N NaOH solution at high agitation speed of rotation per minutes (rpm) of the mixer to form emulsion of small aqueous droplets in the organic phase. The organic phase (O) consists of surfactant Span-80 and kerosene. The emulsion (W1/O) is then dispersed in the external feed (wastewater) phase (W2) where the hydrocarbon of 4-Nitrophenol contaminants presence to form globules of organic phase (O) containing tiny droplets of the aqueous internal phase (W1). The pollutant transfers from W2 phase through the O phase to the W1 phase where it reacts with the stripping agent (NaOH) to form solute precipitate.

In some embodiments, the values of reaction variables giving the best combination for the removal of hydrocarbons are: W1/O ratio V/V of 1/3, surfactant (Span 80) concentration of 2% (W/V), emulsion agitation of 8000 rpm, ELM/W2 V/V of 1/2, treatment agitation of 300 rpm, and pH of W2 of 1.5.

The following evaluation of the variation of the values has been performed: the volume ratios of the NaOH solution to the organic phase (W1/O) of 1/1, 1/3, and 1/5 (V/V); Span 80 surfactant concentrations of 2%, 3%, and 4% (W/V); emulsion agitation using ultra-high-speed (Turrax IKA-T25) of 5000 rpm, 7000 rpm, and 8000 rpm for 10 minutes (a milky white color liquid membrane is produced); volume ratio (W1/O) to W2 of 1/1, 1/2, 1/3, 1/5, and 1/8 (V/V); treatment agitation of W2 with (W1/O) of 250, 300 and 400 rpm for 15 min using IKA overhead stirrer (Model: RW20 digital); pH of W2 of 1.5, 2.5, 3.5, 4.5, and 6.5 measured by a pH meter (Okton Acron). The emulsion (W1/O) was dispersed and mixed with the external feed wastewater phase (W2) that contains 4-Nitropheno. Samples from the agitated solution at 300 ppm were taken at different periods of time using a micropipette, and then separated from the emulsion phase using a nylon syringe filter of 0.2 μm. The 4-Nitrophenol was analyzed using a 96 well UV-microplate at a wavelength band range of 200 to 500 nm.

The effects of the addition of the magnetic $Fe_2O_3$ nanoparticles in the organic phase (O) of weight percentages of 0.05%, 0.1, and 0.15% (W/W), and separately the ionic liquid $[BMIM]^+[NTf2]^-$ in the organic phase (O) of volume percentages of 0.05%, 0.1%, 0.15% and 0.2% (V/V), are also investigated on the stability of the ELM, percentage removal of the 4-Nitrophenol and the time duration of the batch removal, which represent the parameters for the ELM performance.

At the end of the removal of 4-Nitrophenol, the mixture is placed in a funnel to separate the upper emulsion phase (W1/O) and the lower aqueous feed phase (W2). Then a magnetic field (1 T magnet) is applied on the upper phase, which pulls the nanoparticles from the emulsion phase (W1/O) by magnetic field. In some embodiments, the magnetic nanoparticles are reused.

In the process of ELM, the pollutants are removed by mass transfer with chemical reaction of the pollutant compounds reached to the aqueous droplets (W1) in the organic globules with the stripping agent (reaction agent) to for precipitate solid in W1, as per the reaction below for 4-Nitrophenol with NaOH. This means that the driving force of the concentration gradient of the pollutant transport from W2 to W1 through O membrane remains at its maximum, and hence the transport of the pollutants continue until about the completion of the removal.

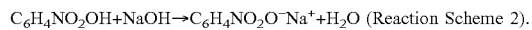

$C_6H_4NO_2OH + NaOH \rightarrow C_6H_4NO_2O^-Na^+ + H_2O$ (Reaction Scheme 2).

Figure 9A:
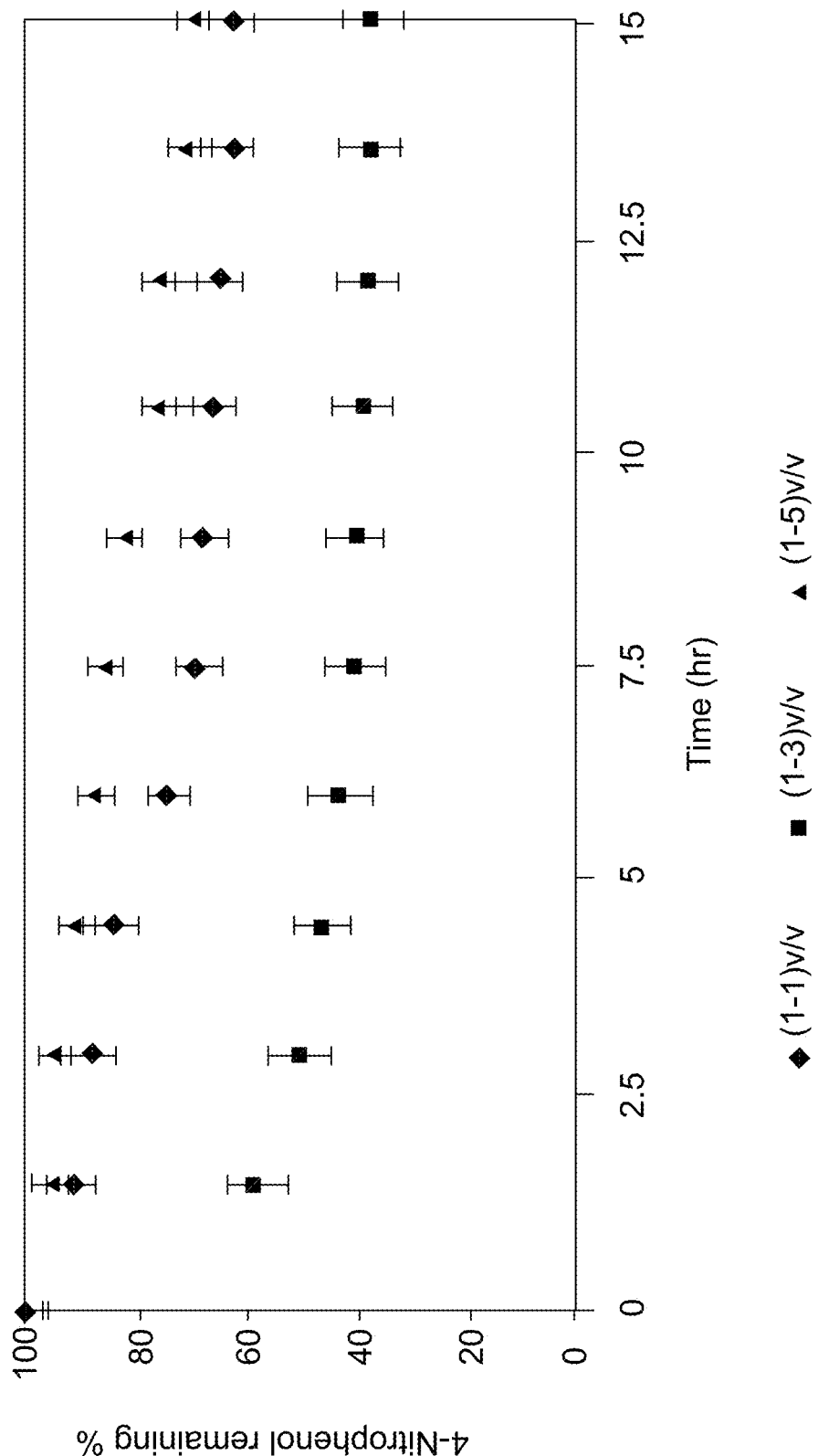
FIGS. 9A-9F are graphical depictions of exemplary embodiments of ELM performances in accordance with the present disclosure.

W1/O Volume ratios of 1/1, 1/3, and 1/5 (V/V) were used to assess its effects on emulsion stability and on the removal of the 4-Nitrophenol. The results are shown in FIGS. 9A-9F. FIG. 9A shows the results of the removal of 4-Nitrophenol. The volume ratio of 1/1 (V/V) forms large emulsion globules with a thin thickness of organic phase (O) between W1 droplets of the globules which causes an increase in the leakage and lowers the removal efficiency. In contrast, the volume ratio of 1/3 (V/V) forms tiny droplets with an increase in thickness (organic membrane) that causes a reduction in the leakage with high removal efficiency. Increasing the volume ratio to more than 1/3 (V/V) leads to a reduction in the stability of the emulsion with poor removal efficiency because of the promotion of the resistance for diffusion through the membrane large thickness of organic between droplets.

Figure 9B:
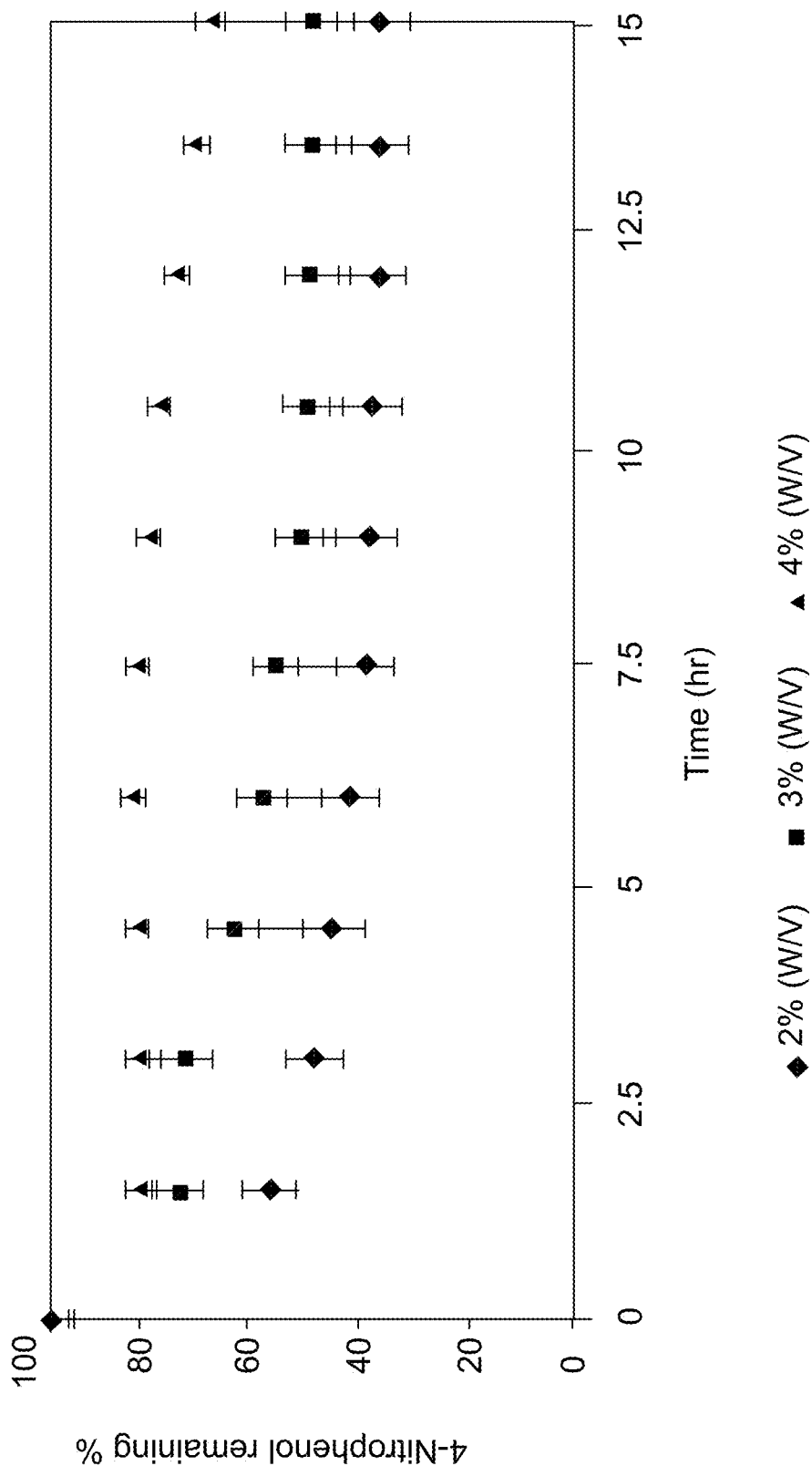

The surfactant concentrations (Span 80) of 2% (W/V), 3% (W/V), and 4% (W/V) were used. It was distinguished that a surfactant concentration of 2% (w/v) caused the highest percentage removal of 4-Nitrophenol and the lowest emulsion leakage, as shown in FIG. 9B.

Figure 9C:
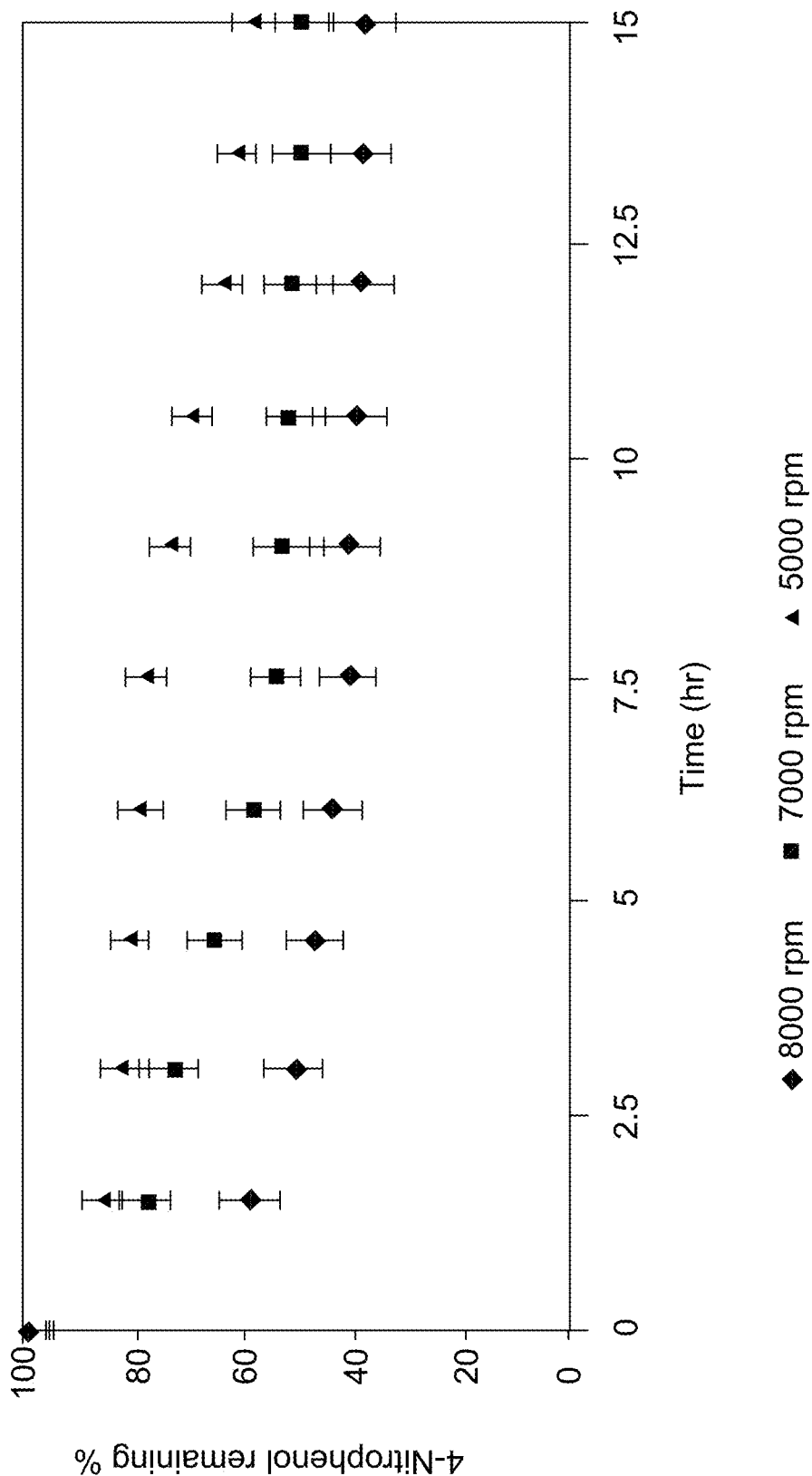

The agitation of 5000, 7000, and 8000 rpm have been used to form the emulsion and to study the removal of the 4-Nitrophenol. Emulsion stability increases by increasing the agitation. The emulsion agitation of 8000 rpm was found suitable by forming a "mayonnaise-like" emulsion due to the generation of more droplets. Increasing the droplet formation results in a highly viscous emulsion, and droplets merge with each there due to rapid mixing. Emulsification agitation of 8000 rpm gives the better removal of the pollutants as shown in FIG. 9C.

Figure 9D:
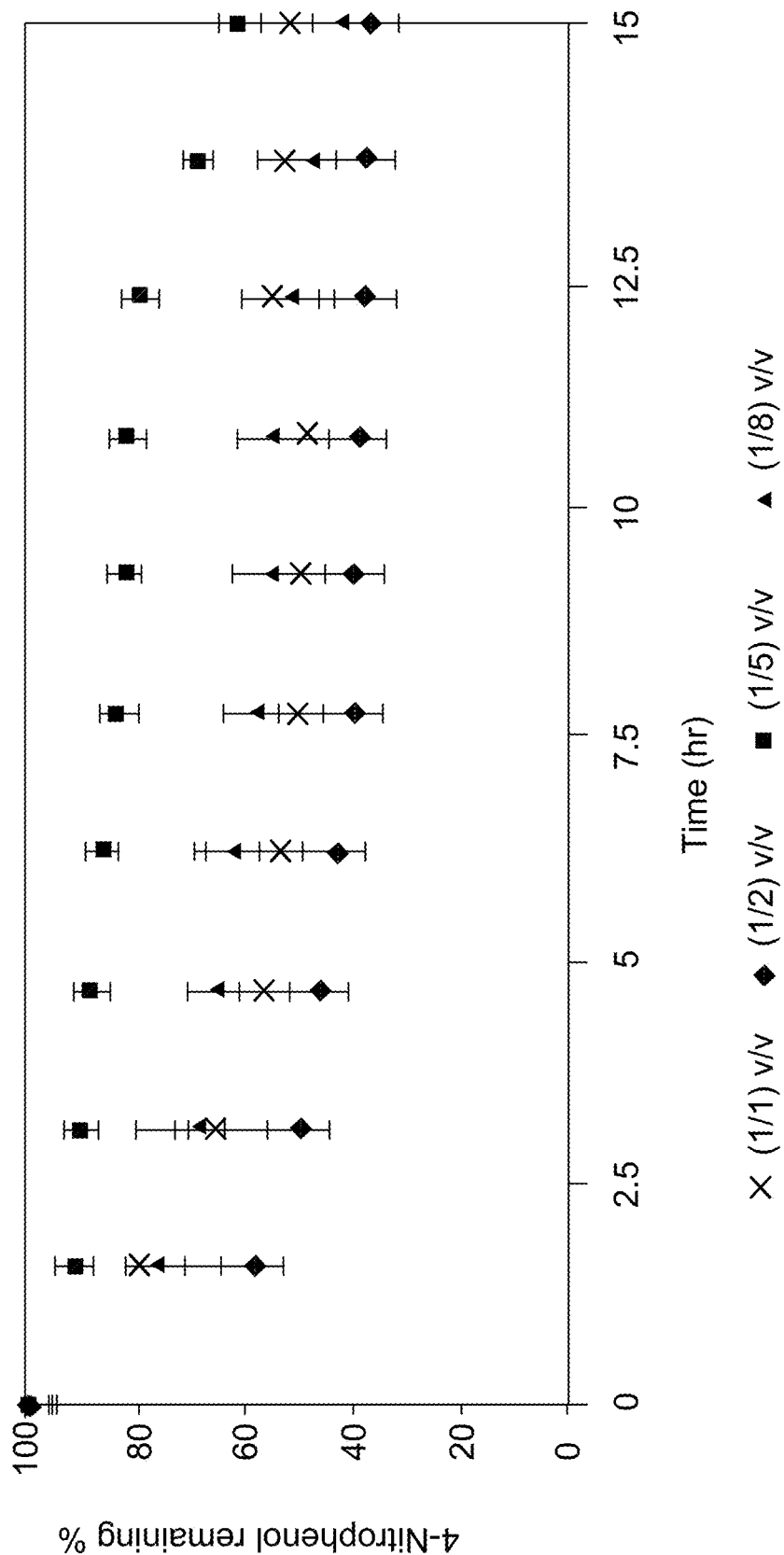

The ELM (W1/O) globules to W2 volume ratio plays a very important role on the performance of the ELM. The volume ratios of 1/1, 1/2, 1/3, 1/5, and 1/8 (V/V) were selected to examine the removal efficiency of 4-Nitrophenol. The volume ratio of 1/2 was found to be the desirable as shown in FIG. 9D. This ratio provides an increase in the overall surface area for mass transfer and removal capacity. The stability of emulsion increases by reducing the volume fraction of the internal phase. Other volume ratios decreased the removal efficiency. In some embodiments, this is attributed at least in part to the increase in the membrane (O) thickness around the droplets.

Figure 9E:
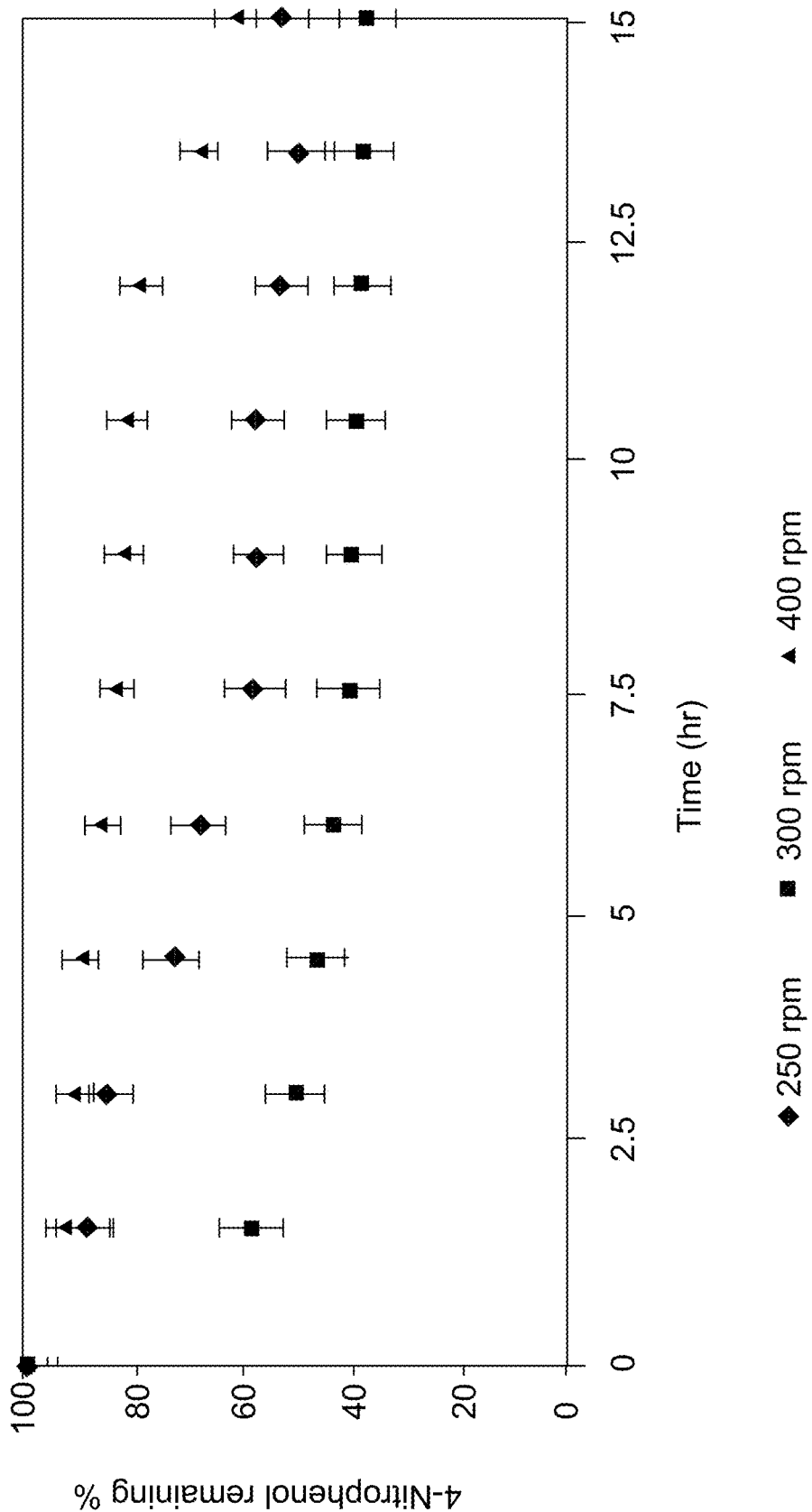

The effect of the agitation intensity (rpm) of 250, 300, and 400 rpm was studied on the removal of the pollutants as shown in FIG. 9E. The 300 rpm was found to be the desirable for increasing the emulsion stability as it displays the lowest amount of emulsion leakage. Producing a greater shear force on the droplets greatly reduces the emulsion globules size, and increases the contact area for mass transfer. At a low mixing intensity, the emulsion globules size increases which causes a decrease in the mass transfer rate of 4-Nitrophenol. In some embodiments, increasing the agitation intensity of rpm leads to reducing the emulsion stability because high intensity produces globules rupture, causing leakage of the W1 into the W2 phases.

Figure 9F:
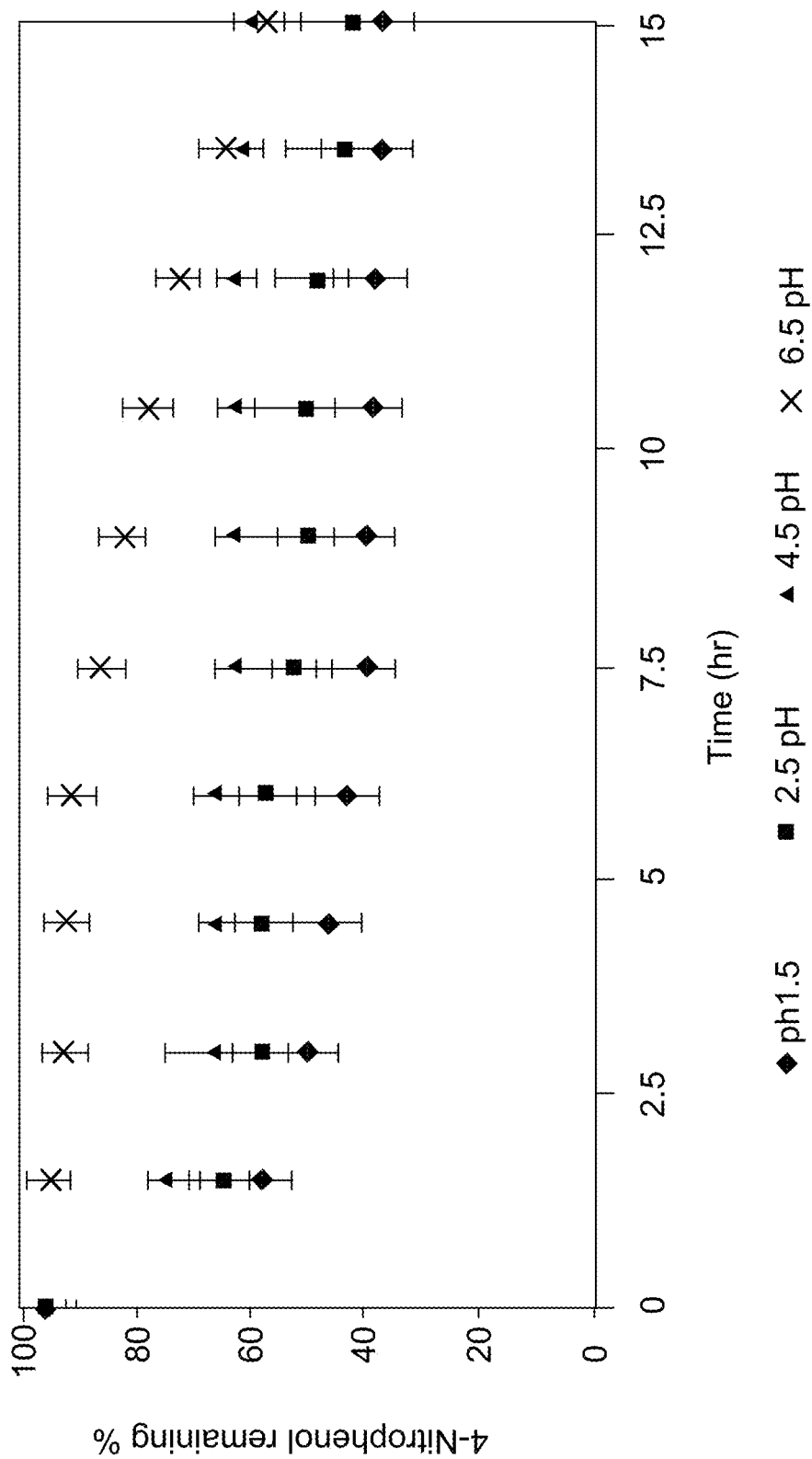

The pH results are presented in FIG. 9F for pH values from 1.5 to 6.5. It is observed that ELM processes have more stability and removal efficiency when the value of pH of the external feed phase is 1.5. 4-Nitrophenol removal from wastewater (W2) results in precipitation in alkaline solutions. At low pH, the separation rate was increased due to an increase in the hydrogen ion ($H^+$) concentration of the external feed phase (W2), which reacts with a stripping agent NaOH (W1) to form a precipitate of acid-base complex. Increasing the pH of the external feed phase (W2) will decrease the hydrogen ion and thus decrease the removal efficiency.

FIG. 10 shows the results of the removal of 4-Nitrophenol using 0.05% (W/W), 0.1% (W/W), 0.15% (W/W) of magnetic nanoparticles of $Fe_2O_3$ in the O phase. The results illustrate that the ratio of 0.1% (W/W) of magnetic $Fe_2O_3$ nanoparticles alone in the 0 phase elevates the 4-Nitrophenol removal to higher levels as compared to the ratios of 0.05% (W/W) and 0.15% (W/W). The presence of the magnetic $Fe_2O_3$ nanoparticles in the organic phase (O) enhances the stability of the ELM and the mass transfer of 4-Nitrophenol from W2 to W1 through the O phase. This improves the solute removal due to the ability to form films of the particles at the (W1/O) interface and increase the binding sites on the surface of the solute.

The relation between the concentration (0.05% (V/V) to 0.25% (V/V)) of ionic liquid [BMIM]$^+$[NTf2]$^-$ and emulsion stability time is shown in FIG. 11. Increasing the concentration of ionic liquid [BMIM]$^+$[NTf2]$^-$ up to 0.2% (V/V) of [BMIM]$^+$[NTf2]$^-$ increases the stability time. At a higher ionic liquid concentration, the stability time decreased due to increased emulsion sedimentation by considering the high density of the ionic liquid [BMIM]$^+$[NTf2]$^-$.

The effects of the combination of the magnetic nanoparticles $Fe_2O_3$ and ionic liquid [BMIM]$^+$[NTf2]$^-$ added in organic phase (O) were examined on the removal of 4-Nitrophenol. The effects of the variation of ionic liquid concentration (0.05% V/V to 0.25% V/V), while maintaining the concentration of nanoparticles at 0.05% (W/W), 0.1% (W/W), and 0.15% (W/W), have been investigated, as per FIG. 12, and Tables 4-6. The results of the leakage test were used as indicator for assessing stability as shown in FIG. 13. The stability of the prepared ELM was assessed before performing the 4-Nitrophenol removal experiments. The breakage of the emulsion globules when the ELM is instable causes decreasing in the removal efficiency. The ELM stability highly affects the removal rate in the receiving phase (W1). The stability of ELM process was detected via trace of the loaded dye in the receiving phase (W1) in a period of the ELM preparation and detected in the external feed phase (W2).

The lowest leakage and higher stability time were obtained with the combination of the magnetic nanoparticles $Fe_2O_3$ and ionic liquid [BMIM]$^+$[NTf2]$^-$ after 1 hour which sustained during the experiments. This confirms that the combination improves the stability of ELM as compared with ELM alone, ELM+ nanoparticles, and ELM+ ionic liquid. The ratio of 0.05% (V/V) of ionic liquid [BMIM]$^+$[NTf2]$^-$ and 0.05% (W/W) of $Fe_2O_3$, gives higher removal efficiency for the 4-Nitrophenol 99% in 1 minute. In addition it yields the lowest necessary amount of nanoparticles and ionic liquid to be used. The results illustrate that the combination of magnetic nanoparticles $Fe_2O_3$ and ionic liquid [BMIM]$^+$[NTf2]$^-$ increases the emulsion stability and the removal efficiency with less duration of time.

TABLE 4

The effect of the combination (W/W) ionic liquid [BMIM]$^+$[NTf2]$^-$ and 0.05% (V/V) magnetic $Fe_2O_3$ nanoparticles in organic phase on the ELM removal for 4-Nitrophenol under the following conditions: W1:O volume ratio is 1/3 (V/V), surfactant concentration is 2%, emulsification speed is 8000 rpm, ELM/W2 volume ratio is 1:2 (V/V), mixing speed is 300 rpm, and pH is 1.5.

| Time (min) | 0.05% ionic liquid | 0.1% ionic liquid | 0.15% ionic liquid | 0.2% ionic liquid | 0.25% ionic liquid |
| --- | --- | --- | --- | --- | --- |
| 0 | 100 | 100 | 100 | 100 | 100 |
| 1 | 0.925 | 41.28 | 35.106 | 56.61 | 57.32 |
| 2 | 0.925 | 41.28 | 35.106 | 56.61 | 57.32 |
| 3 | 0.8 | 26.087 | 25.283 | 34.190 | 38.179 |
| 4.5 | 0.85 | 18.016 | 23.566 | 33.60 | 34.929 |
| 6 | 0.825 | 15.536 | 21.982 | 30.54 | 31.978 |
| 7.5 | 0.725 | 14.524 | 14.322 | 27.57 | 28.799 |
| 9 | 0.725 | 11.887 | 12.854 | 25.255 | 28.56 |
| 10.5 | 0.775 | 12.303 | 11.325 | 22.88 | 23.96 |
| 12 | 0.675 | 10.870 | 10.424 | 19.04 | 20.487 |
| 13.5 | 0.6 | 9.286 | 9.36 | 17.24 | 18.67 |
| 15 | 0.6 | 8.543 | 8.186 | 13.438 | 14.65 |

TABLE 5

The effect of the combination (W/W) ionic liquid [BMIM]$^+$[NTf2]$^-$ and 0.1% (V/V) magnetic $Fe_2O_3$ nanoparticles in organic phase on the ELM removal for 4-Nitrophenol under the following conditions: W1:O volume ratio is 1/3 (V/V), surfactant concentration is 2%, emulsification speed is 8000 rpm, ELM/W2 volume ratio is 1:2 (V/V), mixing speed is 300 rpm, and pH is 1.5.

| Time (min) | 0.05% ionic liquid | 0.1% ionic liquid | 0.15% ionic liquid | 0.2% ionic liquid | 0.25% ionic liquid |
| --- | --- | --- | --- | --- | --- |
| 0 | 100 | 100 | 100 | 100 | 100 |
| 1 | 60.44 | 38.179 | 41.949 | 43.356 | 45.98 |
| 2 | 60.44 | 38.179 | 41.949 | 39.412 | 49.515 |
| 3 | 38.412 | 36.86 | 37.259 | 38.356 | 38.329 |
| 4.5 | 36.95 | 33.47 | 33.116 | 35.649 | 36.148 |
| 6 | 35.714 | 28.543 | 28.799 | 31.978 | 35.98 |
| 7.5 | 33.649 | 25.283 | 27.73 | 29.944 | 32.03 |
| 9 | 31.978 | 21.946 | 25.76 | 28.543 | 31.30 |
| 10.5 | 30.919 | 17.704 | 21.508 | 24.61 | 30.919 |
| 12 | 30.223 | 14.706 | 18.016 | 22.17 | 28.12 |
| 13.5 | 29.944 | 10.520 | 14.170 | 18.78 | 24.410 |
| 15 | 27.409 | 9.363 | 12.854 | 17.40 | 20.279 |

TABLE 6

The effect of the combination (W/W) ionic liquid [BMIM]$^+$[NTf2]$^-$ and 0.15% (V/V) magnetic $Fe_2O_3$ nanoparticles in organic phase on the ELM removal for 4-Nitrophenol under the following conditions: W1:O volume ratio is 1/3 (V/V), surfactant concentration is 2%, emulsification speed is 8000 rpm, ELM/W2 volume ratio is 1:2 (V/V), mixing speed is 300 rpm, and pH is 1.5.

| Time (min) | 0.05% ionic liquid | 0.1% ionic liquid | 0.15% ionic liquid | 0.2% ionic liquid | 0.25% ionic liquid |
| --- | --- | --- | --- | --- | --- |
| 0 | 100 | 100 | 100 | 100 | 100 |
| 1 | 60.44 | 56.61 | 46.66 | 61.286 | 63.186 |
| 2 | 60.44 | 56.61 | 46.66 | 60.870 | 61.424 |
| 3 | 47.223 | 49.24 | 43.86 | 53.887 | 58.36 |
| 4.5 | 38.412 | 41.04 | 39.47 | 44.28 | 51.325 |
| 6 | 36.95 | 38.255 | 33.03 | 41.28 | 46.854 |
| 7.5 | 35.714 | 36.190 | 31.54 | 39.303 | 41.982 |
| 9 | 33.649 | 34.88 | 28.04 | 34.524 | 39.106 |
| 10.5 | 31.978 | 33.60 | 21.10 | 31.536 | 35.982 |
| 12 | 30.919 | 31.438 | 20.95 | 29.016 | 31.322 |
| 13.5 | 29.944 | 30.54 | 18.10 | 28.543 | 30.566 |
| 15 | 27.409 | 28.57 | 15.24 | 26.087 | 28.283 |

In summary, for the first time, W1/O/W2 emulsion liquid membrane combining magnetic nanoparticles $Fe_2O_3$ and ionic liquid [BMIM]$^+$[NTf2]$^-$ in the organic phase (O) was used for removing 4-Nitrophenol from synthesis wastewater.

Under optimum conditions, the removal of 4-Nitrophenol was achieved with an efficiency of 63% from aqueous solutions within 15 minutes.

Emulsion liquid membrane (ELM) stability was improved by the magnetic $Fe_2O_3$ nanoparticles with surfactant Span 80 resulting in the stability of emulsion droplets due to the ability of forming protective film by the particles at (W1/O) and increasing the binding sites on the surface of the solute. The removal efficiency increased with the concentration of 0.1% (W/W) magnetic $Fe_2O_3$ nanoparticles, and the highest value was 93.375% at 15 minutes.

The removal efficiency with the concentration of 0.2% (V/V) of ionic liquid [BMIM]$^+$[NTf2]$^-$ was 83.86% at 15 minutes.

Long term emulsion stability was greatly improved by the combination of the magnetic $Fe_2O_3$ nanoparticles and ionic liquid [BMIM]$^+$[NTf2]$^-$ in organic phase (O), from the formation of a three-dimensional network among the droplets and particles that give the higher removal efficiency at a shorter time at 1 minute with the lowest leakage and higher stability of the ELM process time starting after 1 hour and continuing throughout the experiment. The highest performing ratio of the combination in organic phase (O) was 0.05% (W/W) $Fe_2O_3$ to 0.05% (V/V) ionic liquid, which gives higher removal efficiency for 4-Nitrophenol of 99.01% in 1 min. This clarifies the ability of combination to increase the emulsion stability and removal.

The emulsion was easily broken under external magnetic force. In some embodiments, this magnetically controlled system easily recovers emulsifier, oil phase and finds application in a wide range of industrial wastewater treatment process. Comparing the extraction efficiency of this new stabilization method with the magnetic $Fe_2O_3$ nanoparticles and ionic liquid stabilization methods shows that combined stabilization method gives the lowest remaining concentrations, which indicates higher extraction efficiency with shortest extraction time as compared with other methods.

A composition comprising about 0.05% (w/w) of $Fe_2O_3$ nanoparticles in the stripping aqueous phase (W1) and no ionic liquid in the organic phase (O) yields enhanced removal of about 99.50% hydrocarbons in about 1 minute.

Example 5. Compositions for Extracting/Recovering Lead from Water and Industrial Wastewater The chemicals that are used in this example are carrier di-2-ethylhexyl phosphoric acid (D2EHPA), surfactant (Span 80), and solvent (O) kerosene (with boiling points ranging from 175-325° C.), 1-Methyl-3-octylimidazolium hexafluorophosphate ([OMIM]PF6), lead (II) nitrate $Pb(NO_3)_2$, sodium hydroxide pellets (NaOH), and hydrochloric acid (HCl). The other chemicals used in this example include 0.5 N sulfuric acid ($H_2SO_4$) as internal aqueous phase stripping agent to react with the $Pb(NO_3)_2$ to form precipitate. Magnetic $Fe_2O_3$ nanoparticles with the size range of 1-20 nm were used. The magnetic property of nanoparticles allows for easy removal and recycling by a magnetic field. Furthermore, magnetic properties enhance the step of demulsification and separation of the formed solids and the recycling of the nanoparticles and the organic phase as well because the chemistry of the organic phase (O) is not altered.

In this example, ELM method (W1/O/W2) is tested since the pollutants are in the aqueous phase. The emulsion is created by mixing the internal receiving phase (aqueous phase W1) that contains of the stripping agent as the reactant of 0.5 N $H_2SO_4$ solution with the organic phase (O) at a high agitation speed of rotation per minutes (rpm) of the mixer to form an emulsion of small aqueous droplets in the organic phase. The organic phase (O) contains surfactant Span-80, carrier di-2-ethylhexyl phosphoric acid (D2EHPA) and solvent kerosene. The emulsion (W1/O) is disperse in the external feed (wastewater) phase (W2), whereas the presence of heavy metals of Pb(II) contaminants forms globules of the organic phase (O) containing small droplets of the aqueous internal phase (W1). The contaminant is transferred from the W2 phase through the O phase to the W1 phase where it reacts with the stripping agent ($H_2SO_4$) to form a solute precipitate.

Preparation of nanofluids with suspension characteristics during utilization is essential for the successful use of nanofluids. $Fe_2O_3$ nanoparticles with a size range of 1 nm to 20 nm were suspended with a stripping agent (W1) to prepare the nanofluids. Weight fractions of 0.01% (W/W) of nanoparticles were mixed with the W1 using a IKA ULTRA-TURRAXR T-25 Digital Homogenizer at 5000 rpm for 45 min to ensure complete dispersion of the nanoparticles in the base fluid. An ultrasonic bath was used to break down the finer nanoparticle aggregates for 60 min.

Typical experimental values to extract heavy metals are surfactant (Span 80) concentration of 3% (W/V), carrier D2EHPA concentration 2% (V/V), W1/O ratio (V/V) of 1/1, emulsion agitation of 6000 rpm, ELM/W2 V/V of 1/10, treatment agitation of 300 rpm, and pH of W2 of 5. These values are used here.

The emulsion (W1/O) was dispersed and mixed (with a IKA overhead digital stirrer) with the external feed wastewater phase (W2) that contains Pb(II). Samples from the agitated solution at 300 ppm were taken at different periods of time using a micropipette, and then separated from the emulsion phase using a nylon syringe filter of 0.2 μm. The Pb(II) was analyzed using a 96 well UV-microplate at a wavelength band range of 200 to 900 nm. The concentrations of Pb(II) and lead(II) sulfate were found from the absorbance-calibration curves. Using the best values of the variables from the specified above, the effects of the addition of magnetic $Fe_2O_3$ nanoparticles alone in W1 phase of percentages of 0.01% (W/W), 0.05% (W/W), 0.1% (W/W), 0.15% (W/W), and 0.2% (W/W), and the effects of the addition of the ionic liquid ([OMIM]PF6), alone in the organic phase (O) of volume percentages of 1%, 2%, 3%, 4%, 5% and 6% (V/V) on the emulsion stability and extraction were investigated. The extracting rate of Pb(II) and the time duration of the batch extracting as these represent the parameters for the ELM performance.

This approach allows classifying the best starting values of magnetic nanoparticles (% W/W) and ionic liquid (% V/V) to be used, and then experimentation around these values when combining nanoparticles and ionic liquid to examine the effect of this combination on the parameters of ELM method. One main goal is to determine the lowest possible amount of nanoparticles and ionic liquid with the best performance of ELM in terms of the stability of the emulsion, high percentage extracting, and shorter duration time of the batch operation for extracting. Thus, these examples study the effects of altering the percent of nanoparticles and ionic liquid around the identified best values when nanoparticles and ionic liquid were used alone on the ELM performance parameters.

At the end of the lead extraction, the mixture is placed in a separation funnel to separate the upper emulsion phase (W1/O) and the lower aqueous feed phase (W2). Then a magnetic field (1 T magnet) is applied on the upper phase which pulls the nanoparticles from the emulsion layer (W1/O) by the magnetic field and demulsification occurs. In some embodiments, since there is no change in the chemistry of the organic phase (O), the kerosene is reused. The aqueous phase is separated from the organic phase by heating 80° C. for 1 hour in a closed vessel for final recovery of the internal receiving phase with Pb(II), and oil from the broken emulsion is separately collected after the nanoparticles are collected. The accumulated $Fe_2O_3$ nanoparticles are washed with acetone and distilled water and then dried under vacuum at 50° C. for 10 hours for reuse. The recycled nanoparticles and the organic phase are used to prepare a new ELM experiment.

In the ELM method, the pollutants are extracted by mass transfer with chemical reaction of the pollutant compounds achieved by the aqueous droplets (W1) in the organic globules with the stripping agent (reaction agent) to form precipitate solid in W1 as per the reaction below for Pb(II) with $H_2SO_4$. This means that the driving force of the concentration gradient of the contaminant transport from W2 to W1 through O membrane remains at its maximum and hence the transport of the pollutants continues until about the completion of the removal. The relevant chemical equations for this experimental system are depicted below.

2Pb(NO$_3$)$_2$+H$_2$O→Pb(OH)$_2$+2HNO$_3$ (Reaction Scheme 3)

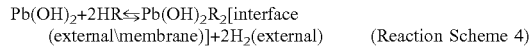
Pb(OH)$_2$+2HR⇌Pb(OH)$_2$R$_2$[interface (external\membrane)]+2H$_2$(external) (Reaction Scheme 4)

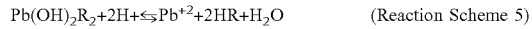
Pb(OH)$_2$R$_2$+2H+⇌Pb$^{+2}$+2HR+H$_2$O (Reaction Scheme 5)

Pb$^{+2}$ H$_2$SO$_4$→PbSO$_4$+H$_2$ (Reaction Scheme 6)

When the feed and membrane phase meet, external interface reaction (4) occurs. The metal-ligand complex, PbR$_2$, carries Pb(II) ions to the stripping phase. Here, HR represents D2EHPA in kerosene.

Internal interface reaction (5) occurs at the meeting of the membrane and stripping phase, the metal complex and the hydronium ions combine at the beginning of the membrane-stripping phase. Then the extractant ligand, D2EHPA, returns to the interface of the feed and membrane phase. The D2EHPA dissolved in kerosene is applied successfully for the transportation of Pb(II) from the donor phase to the acceptor phase forming precipitate of lead(II) sulfate.

Experiments were performed to determine the best values of the variables to be used by examining the effects of magnetic nanoparticles Fe$_2$O$_3$ and ionic liquid ([OMIM]PF6) on the extracting of Pb(II) and its duration and the stability of the emulsion. For all these experiments the emulsion of the stability was studied as outlined previously. Pb(II) extracting of 42% during 30 min of batch operation was obtained with the earlier defined best values and confirmed by these experiments as follows: the volume ratios of the H$_2$SO$_4$ solution to the organic phase (W1/O) of 1/1 (V/V); surfactant Span 80 concentration of 3% (W/V); carrier D2EHPA concentration 2% (V/V), emulsion agitation speed of 6000 rpm; volume ratio of ELM (W1/O) to W2 (ELM/W2) of 1/10; treatment agitation of W2 with (W1/O) of 300 rpm; and pH of W2 of 5.

FIG. 14 shows the results of the extracting of lead using 0.01%, 0.05%, 0.1%, 0.15%, and 0.02% (W/W) of magnetic nanoparticles of Fe$_2$O$_3$ in the W1 phase. For all the conditions studied, each experiment was repeated three times, as reflected in the error bars. The results illustrate that the ratio of 0.15% (W/W) of magnetic Fe$_2$O$_3$ nanoparticles alone in the W1 phase promotes of 79% lead extracting at the first 5 minutes in one batch of operation. The presence of the magnetic Fe$_2$O$_3$ nanoparticles in the W1 phase enhances the emulsion stability and the mass transfer of lead from W2 to W1 through the O phase. This increases the contaminant extracting due to its ability to form a protective film at the W1/O interface and increase the binding sites on the surface of internal phase droplets. But with further increasing the concentration of nanoparticles further than the full coverage of the internal phase droplets, other magnetic Fe$_2$O$_3$ nanoparticles will be dispersed in the external feed phase (W2), and some of the particles might form aggregates on the W1/O interface. The slowed the transfer process and affected the stability of emulsion so decrease the efficiency.

Concerning the use of ionic liquid in the organic phase (O) as an alternative method to enhance the stability of the emulsion, the ionic liquid ([OMIM]PF6) was chosen to be used in these experiments because, in some embodiments, it is known to enhance the efficient extraction of Pb(II). The ionic liquid ([OMIM]PF6) concentrations of 1% (V/V) to 6% (V/V) were tested as shown in FIG. 15. The ratio of 5% (V/V) gives higher extracting of Pb(II) of 70% of 30 minutes in one batch of operation. At a higher ionic liquid concentration 6% (V/V), the stability time decreased due to increased emulsion sedimentation by considering the high density of the ionic liquid ([OMIM]PF6).

A composition comprising about 0.01% (w/w) of Fe$_2$O$_3$ nanoparticles with diameters in the range of about 1 nm to about 20 nm in the stripping aqueous phase (W1) and about 5% (v/v) of an [OMIM][PF$_6$] ionic liquid in the organic phase (O) yields enhanced removal of 99.89% heavy metals in about 3 minutes. This composition was found to be the best ELM performance desirable from an economic point of view for large scale applications. A stabilized droplet is shown in FIG. 16.

TABLE 7

Fe$_2$O$_3$ nanoparticles with diameters in the range of about 1 nm to about 20 nm combined with a [OMIM][PF$_6$] ionic liquid used to extract lead (II) from water under the following conditions: Span 80 concentration of 3% (W/V), D2EHPA carrier concentration of 2% (V/V), W1/O volume ratio of 1/1 (V/V), emulsification agitation speed to create emulsion of 6000 rpm, ELM (W1/O)/W2 volume ratio of 1/10, treatment agitation mixing speed of W2 of 300 rpm, and pH of W2 of 5.

| Time (min) | (W1 + nano) + (O + ionic liquid) + W2 |
| --- | --- |
| 1 | 77.20 |
| 2 | 86.23 |
| 3 | 99.89 |

The lowest leakage and higher stability time were obtained with the combination of the nanoparticles Fe$_2$O$_3$ and ionic liquid ([OMIM]PF6) after 1 hour which sustain during the experiments. The lowest leakage to 84% was for more than 3 days.

Furthermore, the stabilization of ELMs with nanoparticles enhances the strength between emulsion droplets and prevents collision or coalescence of the droplets. In addition, the nanoparticles form a protective film from the particles at W1 mediator and increase the binding sites on the surface of the solute. The emulsion becomes more stable with this concentration of the nanoparticles by covering more of the emulsion droplet interface, thereby resulting in an increase in the extraction efficiency. This confirms that the combination enhanced the emulsion stability as compared with ELM alone, and ELM+ ionic liquid as shown in FIG. 17.

In summary, the best operation conditions obtained for the removal of Pb(II) were as follows: volume ratio of internal receiving phase to organic phase (W1/O) was 1/1 (V/V), carrier D2HEPA percentage was 2% (V/V), Span-80 percentage was 3% of the weight of the ELM the homogenizer speed was 6000 rpm, treatment ratio was 1/10 (V/V), mixing speed was 300 rpm, and pH of W2 was 5. At the best conditions, the extraction of Pb(II) acid was achieved with the efficiency of 42% within 30 min and emulsion stability 28% for 6 hours.

The extracting efficiency of Pb(II) was enhanced to 79% at first 5 minutes in one batch of operation by adding magnetic Fe$_2$O$_3$ nanoparticles alone in W1 phase with increasing the concentration of magnetic Fe$_2$O$_3$ nanoparticles to 0.15% (W/W). After 5 minutes, the percentage extracting drops due to the leakage of the emulsion.

The ionic liquid [OMIM][PF$_6$] enhances the stability of the ELM and extraction activity due to the interfacial attraction of ionic liquid with the membrane phase components either by electrostatic attraction (van der Waals interaction) or by hydrogen bonding, which results into the prevention of coalescence of the emulsion globules. The results indicated that the ratio of 5% (V/V) of [OMIM][PF6] to internal receiving phase elevates the Pb(II) extraction to 70% in 30 min and emulsion stability 51% for 3 days.

The nanoparticles $Fe_2O_3$ were added in the organic phase (O) phase or in the external feed wastewater (W2) phase. However, no improvement was observed for the extracting rate and/or reaction blocking.

The extracting rate and emulsion stability were greatly enhanced by the combination of nanoparticles in the internal receiving phase (W1) and ionic liquid in the organic phase (O). A three-dimensional network was formed among the droplets sustained during the experiment time by the interfacial film surrounding emulsion globules, which increased significantly in the presence of nanoparticles and ionic liquid.

The ratio of combination obtained was 5% (V/V) ionic liquid ([OMIM]PF6) in the O phase and 0.01% (W/W) of $Fe_2O_3$ nanoparticles in the W1 phase, which give higher extracting efficiency of Pb(II) of 99.9%, in about 3 minutes and emulsion stability 84% for more than three days. This clarifies the ability of the composition to increase the emulsion stability and extraction.

Example 6. Compositions for Extracting/Recovering Vanadium from Water and Wastewater The chemicals used in this example include kerosene (boiling point 175-325° C.) as the organic phase (O), Span-80 (sorbitan monooleate) as the surfactant, di-2-Ethylhexyl phosphoric acid (D2EHPA) as the carrier help the pollutant transport from organic phase (O) to stripping agent, sulfuric acid (0.5 N $H_2SO_4$) as the stripping agent to react with the heavy metals (vanadium) contaminants to form a solid precipitate, hydrochloric acid (HCl) to adjust for the pH of W2, ionic liquid of 1-Methyl-3-octylimidazolium hexafluorophosphate ([OMIM]PF6), aluminum oxide nanoparticles ($Al_2O_3$), and magnesium oxide nanoparticles (MgO) size range between 20 nm to less than about 50 nm. Magnetic $Fe_2O_3$ nanoparticles with a size range of 20 to 50 nm were used. This size of nanoparticles is less expensive than smaller sizes, and cost is a significant factor for large-scale applications.

In this example, the ELM (W1/O/W2) has been applied since the contaminants are in the aqueous phase. The emulsion is formed by mixing the organic phase (O) with the aqueous internal phase (W1) that contains the stripping agent as the reactant of 0.5 N $H_2SO_4$ solution at a high agitation speed of rotation per minutes (rpm) of the mixer to produce an emulsion of small aqueous droplets in the organic phase. The organic phase (O) contains surfactant Span 80, carrier di-2-Ethylhexyl phosphoric acid (D2EHPA), and kerosene. The emulsion (W1/O) is then dispersed in the external feed (wastewater) phase (W2), where the heavy metal of vanadium pollutants presence to form globules of the organic phase (O) containing tiny droplets of the aqueous internal phase (W1). The contaminant transfers from the W2 by cooperating with the carrier through the organic (O) phase to the W1 phase, where it reacts with the stripping agent ($H_2SO_4$) to form a solute precipitate.

Preparation of nanofluids with suspension characteristics during utilization is essential for the successful use of nanofluids. Nanoparticles $Fe_2O_3$, MgO, and $Al_2O_3$ with a size range of 20 nm to 50 nm were suspended with a stripping agent (W1) to prepare the nanofluids. Weight fractions ranging 0.01% (W/W) of nanoparticles were mixed with the W1 using a IKA ULTRA-TURRAXR T-25 Digital Homogenizer at 5000 rpm for 45 min to ensure complete dispersion of the nanoparticles in the base fluid. An ultrasonic bath was used to break down the finer nanoparticle aggregates for 60 min.

In this example, the values of several variables have been tested: the volume ratios W1 of the $H_2SO4$ solution to the organic phase (W1/O) of 1/1, 1/2, 1/3, 1/4, 1/5, and 1/6 (V/V); Span 80 surfactant concentrations of 1%, 2%, 3%, 4%, and 5% (W/V); D2HAPA carrier concentrations used were 1%, 2%, 3%, 4% and 5% (V/V); emulsion agitation using ultra-high-speeds of 4000, 5000, 6000, 7000, and 8000 rpm for 10 minutes (a milky white color liquid membrane is produced); volume ratio (W1/O) to W2 (ELM/W2) of 1/8, 1/10, 1/12, and 1/15 (V/V); treatment agitation of W2 with (W1/O) of 250, 300 and 400 rpm for 30 min using a digital IKA overhead stirrer; pH of W2 of 1, 2, 3, 4, 5, and 6 measured by a pH meter. The emulsion (W1/O) was dispersed and mixed with the external feed wastewater (W2) phase that contains vanadium. Samples from the agitated solution at 300 ppm were taken at different periods using a micropipette and then separated from the emulsion phase using a nylon syringe filter of 0.2 μm (Simsii Inc. USA). The vanadium was analyzed using a 96 well UV-microplate at a wavelength band range of 200 to 900 nm. The concentration of V(V), and V(V) sulfate were found from the absorbance-calibration curves.

The best values for the variables are as follows: W1/O volume ratio 1/1 (V/V), the concentration of 80 Span at 3% (W/V), D2HEPA carrier concentration 2% (V/V), emulsification speed 6000 rpm, ELM (W1/O)/W2 volume ratio of 1:10 (V/V), therapeutic induction of W2 of 300 rpm, pH of W2 of 5. For these conditions, the extraction of vanadium of 69.93% for 30 min was achieved.

Using the best values of the variables mentioned above, the effects of the addition of the nanoparticles alone in W1 phase of percentages of 0.01% (W/W), 0.05% (W/W), 0.1% (W/W), 0.15 (W/W), and 0.2% (W/W) and the effects of the addition of the ionic liquid ([OMIM]PF6), alone in the organic phase (O) of volume percentages of 1%, 2%, 3%, 4%, 5% and 6% (V/V) were investigated on the stability of the ELM for $Fe_2O_3$, MgO, and $Al_2O_3$. The extraction/recovery rate of vanadium and the time duration of the batch extraction were also determined as these represent the parameters for the ELM performance.

At the end of the vanadium extraction/recovery, the mixture is placed in a separation funnel to separate the upper emulsion phase (W1/O) and the lower aqueous feed phase (W2). The demulsification occurs where the aqueous phase will be separated from the organic phase using heating 80° C. for 1 hour in a closed vessel for final extraction/recovery of the internal receiving phase with V(V) and kerosene from the broken emulsion was separately collected after the nanoparticles are collected. The magnetic $Fe_2O_3$ nanoparticles are washed with acetone and distilled water and then dried under vacuum at 50° c. for 10 hours for reuse. The recycled nanoparticles and organic phase are used to prepare new ELM extractant.

The effects of the nanoparticles alone in W1 phase, and ([OMIM]$PF_6$) ionic liquid alone in O phase, on the ELM performance were determined. The value of nanoparticle and ionic liquid concentrations that provide the best ELM performance were also determined. Various combinations of nanoparticles and ionic liquids were tested.

In the method of ELM, the contaminants are removed by mass transfer with the chemical reaction of the contaminant compounds (reached to the aqueous droplets (W1) in the organic globules) with the stripping agent (reaction agent) to form precipitate solid in W1 as per the reaction below for vanadium with $H_2SO_4$. This indicates that the driving force of the concentration gradient of the contaminants transport from W2 to W1 through O membrane remains at its maximum, and hence the transport of the contaminants continues until about the completion of the extraction during a particular duration of time. The relevant chemical equations for this experimental system are depicted below.

$$V_2O_5 + 2H_2O \leftrightharpoons H_4V_2O_7 \quad \text{(Reaction Scheme 7)}$$

$$H_4V_2O_7(\text{external}) + 4HR(\text{carrier}) \leftrightharpoons H_4V_2O_7 2R_2[\text{interface(external\textbackslash membrane)}] + 2H_2(\text{external}) \quad \text{(Reaction Scheme 8)}$$

$$H_4V_2O_7 2R_2 + 14H^+ \leftrightharpoons 2V^{2+} + 4HR + 7H_2O \quad \text{(Reaction Scheme 9)}$$

$$V^{2+} + 3H_2SO_4 \rightarrow VOSO_4 + 3H_2O + 2SO_2 \quad \text{(Reaction Scheme 10)}$$

When the feed and membrane phase meet, external interface reaction (8) occurs. Here, HR represents D2EHPA in kerosene.

Internal interface reaction (9) occurs at the meeting of the membrane and stripping phase, the metal complex and the hydronium ions combine at the beginning of the membrane-stripping phase. Then the extractant ligand, D2EHPA, returns to the interface of the feed and membrane phase. The D2EHPA dissolved in kerosene is applied successfully for the transportation of vanadium from the donor phase to the acceptor phase forming precipitate of vanadium sulfate.

The following experiments were performed to describe the best possible values for the variables that will be used to study the effects of nanoparticles ($Fe_2O_3$, MgO, and $Al_2O_3$) and ionic liquid on vanadium extraction/recover and emulsion stability. For all these experiments, the stability of emulsion was studied as outlined previously.

Figure 18A:
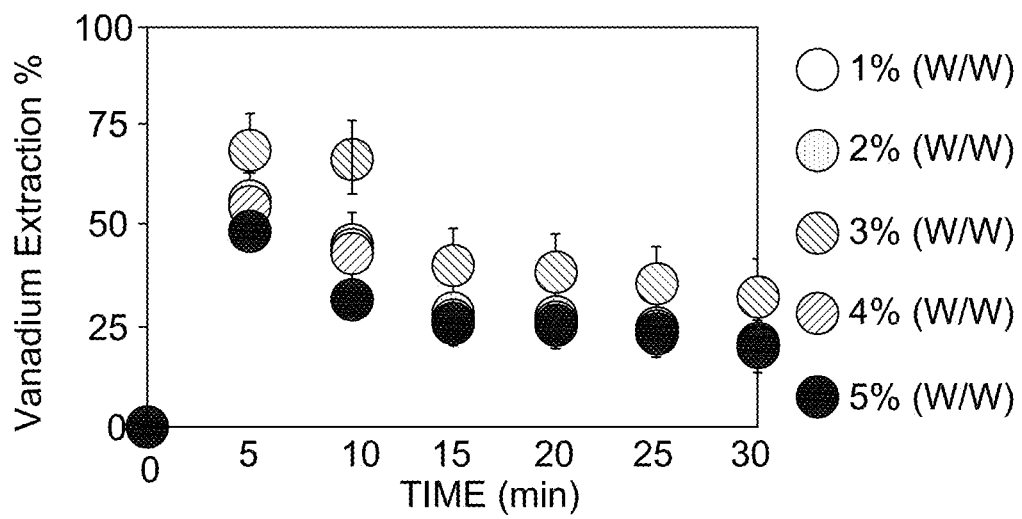
FIGS. 18A-18G are graphical depictions of exemplary embodiments of ELM performances in accordance with the present disclosure.

Span 80 has been used as the emulsifier added to the organic phase (O). Surfactant has an important effect on the stability of the emulsion and the decrease of the emulsion leakage because it works as a protective barrier between the stripping agent (W1) and the external feed phase (W2). Surfactant concentrations (Span 80) of 1% (W/V), 2% (W/V), 3% (W/V), 4% (W/V), and 5% (W/V) were used. The surfactant concentration was distinguished of 3% (W/V) caused the highest percentage extraction/recovery of vanadium and the lowest emulsion leakage, as shown in FIG. 18A.

Figure 18B:
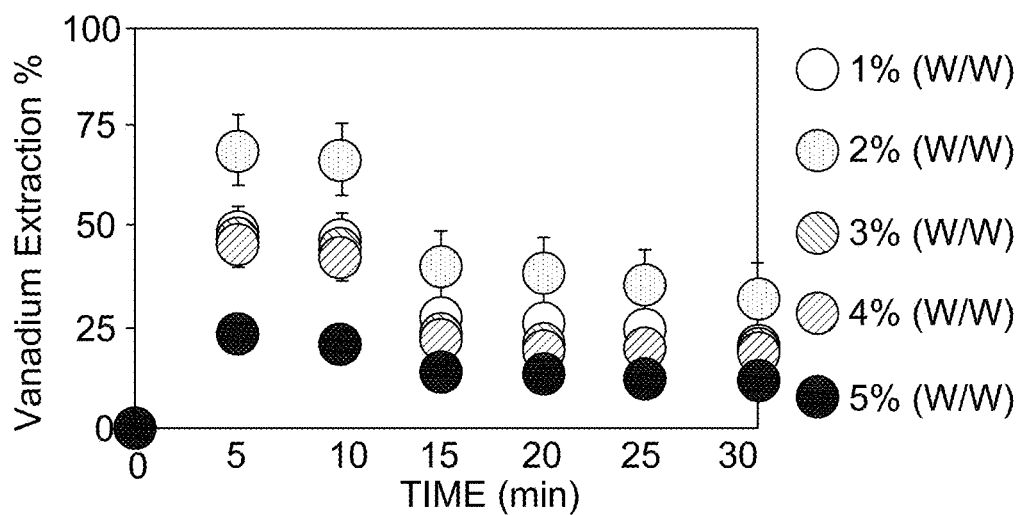

D2EHPA has been used as the carrier added to the organic phase (O). Carrier D2EHPA has a significant effect on the pollutant extraction because the pollutant insoluble in organic phase (O), so needs a carrier to transport the pollutant from the external feed phases (W2) to stripping agent (W1) through an organic phase (O). The carrier concentrations (D2EHPA) of 1% (V/V), 2% (V/V), 3% (V/V), 4% (V/V), and 5% (W/V) were used. The carrier concentration was distinguished by 2% (W/V) caused the highest percentage extraction/recovery of vanadium and the lowest emulsion leakage, as shown in FIG. 18B.

Figure 18C:
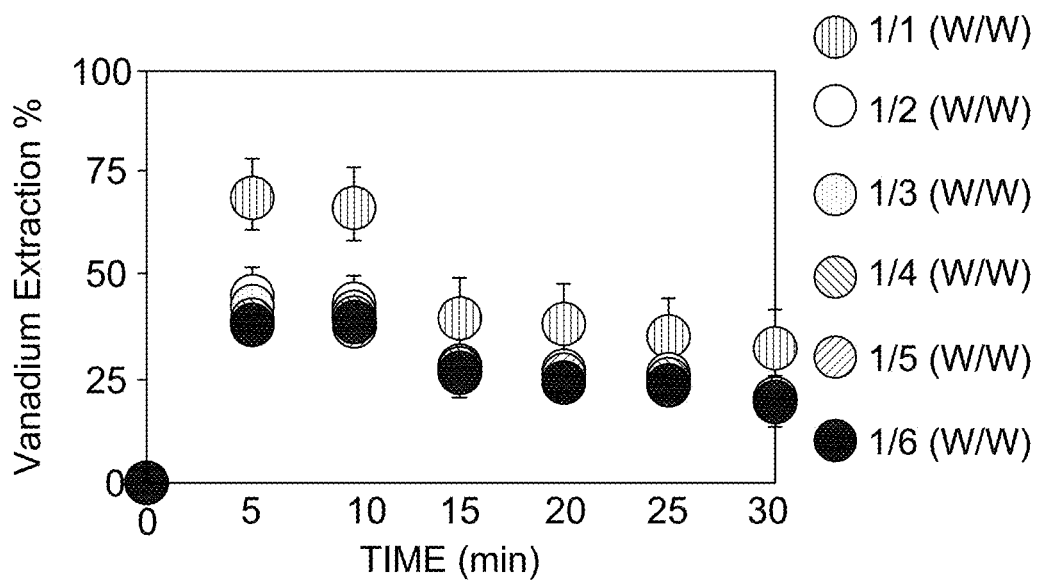

The W1/O volume ratio has a vital role in the stability of emulsion because of its practicality in trapping the droplets of W1 in the organic phase (O) in reacting to the vanadium to the stripping agent ($H_2SO_4$) in W1. The increase in the volume ratio will lead to emulsion instability. W1/O Volume ratios of 1/1, 1/2, 1/3, 1/4, 1/5, and 1/6 (V/V) were used to evaluate its effects on the stability of the emulsion and the extraction/recovery of the vanadium. FIG. 18C, shows the results of the extraction of vanadium. The volume ratio of 1/1 (V/V) forms small emulsion globules with an increase in the thickness of the organic phase (O) between W1 droplets of the globules, which causes a decrease in the leakage and higher the extraction/recovery efficiency. Increasing the volume ratio to more than 1/1 (V/V) leads to a reduction in the emulsion stability with reduced extraction/recovery efficiency. This is due to strengthening resistance for diffusion through the membranes large thickness of organic between droplets. Hence, the value of the 1/1 (V/V) volume ratio of the W1 phase to the O phase has been selected.

Figure 18D:
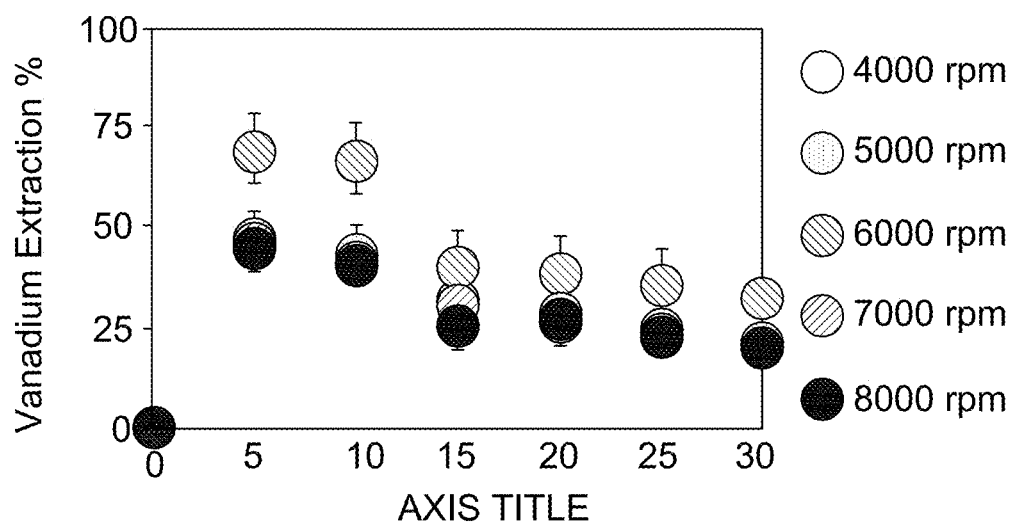

In some embodiments, the agitation intensity (rpm) to produce accurate emulsion is as important as forming a designable emulsion that increases extraction/recovery efficiency. The agitation of 4000, 5000, 6000, 7000, and 8000 rpm was used to form the emulsion and to study the extraction/recovery of the vanadium. Emulsion stability increases by increasing the agitation. The emulsion agitation of 6000 rpm was found suitable by forming a "mayonnaise-like" emulsion due to the generation of more droplets with a reduction of interfacial tension between the aqueous and organic phases. Increasing the droplet formation results in a highly viscous emulsion, and droplets merge with each there due to rapid mixing, while, an increase beyond that limit obtains a vanadium-D2EHPA complex with lower diffusion capability (diffusivity). Emulsification agitation of 6000 rpm gives the better extraction/recovery of the contaminants, as shown in FIG. 18D.

Figure 18E:
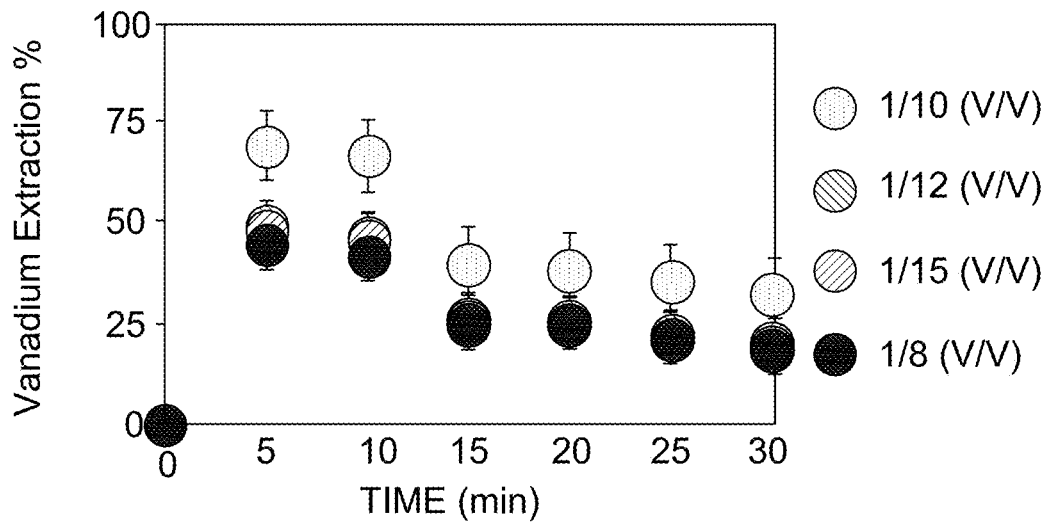

The ratio of ELM (W1/O) globules to the W2 volume plays an essential role in ELM performance. The volume ratios of 1/8, 1/10, 1/12, and 1/15 (V/V) were selected to study the extraction/recover efficiency of vanadium. The volume ratio of 1/10 was found to be desirable, as shown in FIG. 18E. This ratio provides an increase in the overall surface area for mass transfer and extraction/recovery capacity. The emulsion stability was increased by reducing the volume fraction of the internal phase.

The other volume ratios decrease the extraction/recovery efficiency. In some embodiments, this is attributed to the increase in the membrane (O) thickness around the droplets. Also, the mechanical resistance of the membrane increases at a higher organic fraction, thus preventing coalescence of the dispersed droplets and maintaining the size of the droplets to be within the range of the size of the standard droplets of 0.1-2 mm. In general, larger droplet sizes increase the emulsion instability because the droplets easily coalesce.

Figure 18F:
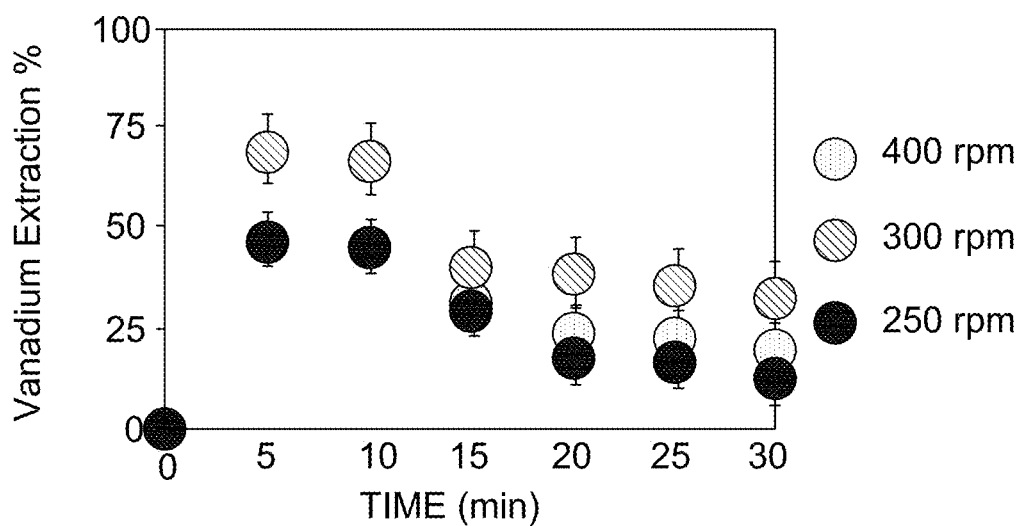
Figure 18G:
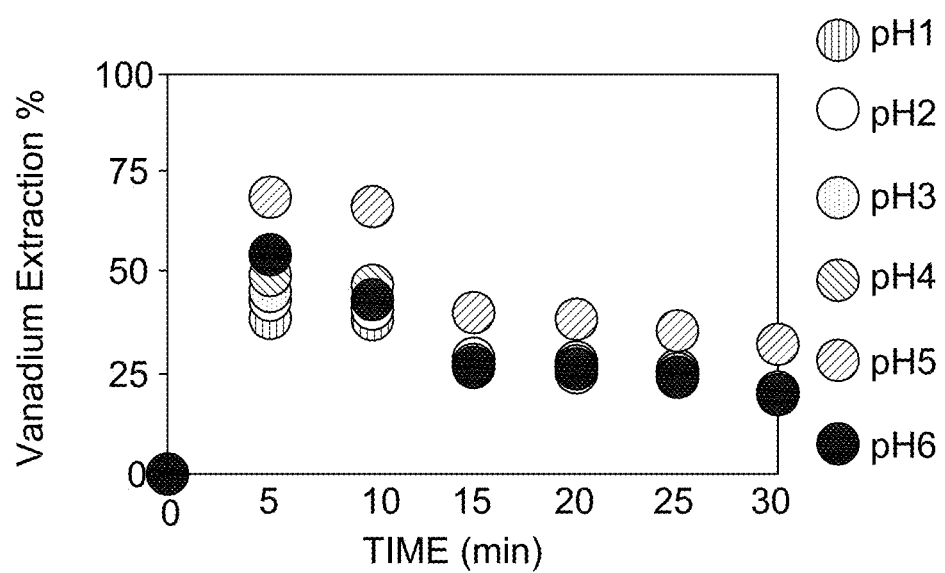

The effect of the agitation intensity (rpm) of 250, 300, and 400 rpm on the extraction/recovery of the contaminants was studied, as shown in FIG. 18F. 300 rpm was found to be desirable for increasing the stability of emulsion as it displays the lowest amount of emulsion leakage. The results agree with the fact that the best stirring speed produces smaller globules and consequently, with higher surface areas exposure resulting in a higher extraction/recovery rate.

The pH of the wastewater (W2) plays a significant role in the surface charges, states of functional groups on the surface of the adsorbent, and the contaminants in the W2 phase. The results are offered in FIG. 18G, of pH values from 1 to 6. It is detected that the ELM method had more stability and extraction/recovery efficiency when the value of the pH of the external feed phase was 5. At high pH, the extraction/recovery rate was increased due to an increase in the hydrogen ion ($H^+$) concentration of the external feed phase (W2), which reacted with a stripping agent $H_2SO_4$ (W1) to form a precipitate of acid-base complex. Decreasing the pH of the external feed phase (W2) will decrease the hydrogen ion (H+) and thus reduce the extraction/recovery efficiency. Considerably at high wastewater pH (as pH 5 in this study), the surface was surrounded by H+ increasing the adsorption efficiency that might be accounted for the lower competition of H+ with vanadium for the active sites and the adsorption process was due to the interaction of the positively charged of vanadium with the positively charged surface.

As outlined above, experiments were performed to confirm the best value of the variables to be used to examine the effects of the nanoparticles ($Fe_2O_3$, MgO, and $Al_2O_3$) in the internal receiving phase (W1) and ([OMIM]PF6) ionic liquid in the organic phase (O) on the extraction/recovery of vanadium and its duration and emulsion stability. For all these experiments the emulsion stability was examined as outlined earlier. The extraction/recovery vanadium of 69.9% during 30 minutes of batch operation was obtained with the earlier defined best value and confirmed by the experiments as follows: the W1/O volume ratio of 1/1 (V/V), Span 80 concentration of 3% (W/V), D2EHPA concentration of 2% (V/V), emulsion agitation of 6000 rpm, ELM (W1/O)/W2 volume ratio of W2 of 1/10 (V/V), treatment agitation of W2 of 300 rpm and pH of 5.

FIG. 19 shows the results of the extraction/recover of vanadium using 0.01%, 0.05%, 0.1%, 0.15%, and 0.02% (W/W) of magnetic nanoparticles of $Fe_2O_3$ in the W1 phase. The results illustrate that the ratio of 0.15% (W/W) of magnetic $Fe_2O_3$ nanoparticles alone in the W1 phase promotes of 87.7% vanadium extraction/recover at the first 5 minutes in one batch of operation. The presence of magnetic $Fe_2O_3$ nanoparticles in the W1 phase enhances the emulsion stability and the mass transfer of vanadium from W2 to W1 through the O phase. This improves the pollutant extraction/recover due to its ability to form a protective film at the W1/O interface and increase the binding sites on the surface of internal phase droplets. But upon further increasing of the concentration of nanoparticles beyond the full coverage of the internal phase droplets, other magnetic $Fe_2O_3$ nanoparticles will be dispersed in the external feed phase (W2), and some of the particles might form aggregates on the W1/O interface. This slowed the transfer process and affected the stability of emulsion so decrease the efficiency.

Regarding the use of ionic liquid in the organic phase (O) as another process to enhance the emulsion stability, the ionic liquid ([OMIM]PF6) was selected because, in some embodiments, it is extracted and stripped more efficiently. The relation between the concentration (1% (V/V) to 6% (V/V)) of ionic liquid ([OMIM]PF6) and stability of emulsion time is shown in FIG. 20. Increasing the concentration of ionic liquid ([OMIM]PF6) up to 5% (V/V) of ([OMIM]PF6) will increase the stability time. Therefore, at 5% (V/V) ionic liquid concentration, an extraction/recovery of 80.73% of 30 min of vanadium was achieved and emulsion stability 51% for 3 days. At a higher ionic liquid concentration 6% (V/V), the stability time decreased due to increased emulsion sedimentation by considering the high density of the ionic liquid ([OMIM]PF6). The stability of the emulsion was increased due to the ionic liquid ([OMIM]PF6), which could be caused by Coulombic interactions of the charges on the $H_2SO_4$ and ions of the ionic liquids ([OMIM]PF6). This strong interaction improves the stability of emulsion by lowering the coalescence of the internal droplets. There is a probability of hydrogen bonding between the [OH] group of $H_2SO_4$ and ionic liquid ([OMIM]PF6). In some embodiments, the hydrogen bonding causes strong protection surrounding the internal droplets to avoid coalescence. In some embodiments, increasing the amount of ionic liquid ([OMIM]PF6) further reduces the interfacial tension, also through adsorbing in the W1-O interface and thereby minimizing the repulsion of the hydrophilic head-groups of the Span 80, which contributes to a more efficient packing of the Span 80 at the interface and reduces the droplet size of W1.

As per the results above, the 5% (V/V) of ionic liquid ([OMIM]PF6) alone in the organic phase (O) improved the extraction/recovery of vanadium and emulsion stability. Both concentrations were combined and varied to study the effects of the combination of the nanoparticles ($Fe_2O_3$, MgO, and $Al_2O_3$) in the W1 phase and ionic liquid ([OMIM]PF6) in the organic phase (O) on the emulsion stability, extraction/recovery of vanadium and duration of the extraction/recovery. The results are illustrated in Table 8 and FIG. 21. The ionic liquid concentration of 5% (V/V) and the concentration of nanoparticles of 0.01% (W/W) of $Fe_2O_3$, MgO, and $Al_2O_3$ nanoparticles in the internal receiving phase (W1) have been found to provide best ELM performance of extraction/recovery of 99.9%, 98.84%, and 99.69% in about 30 seconds, respectively. They represent the least amounted used for nanoparticles and ionic liquid which is desirable from economic point of view for large scale applications.

The ratio of 5% (V/V) of ionic liquid ([OMIM]PF6) in organic phase (O) and 0.01% (W/W) of $Fe_2O_3$ in W1 phase yields higher extraction/recovery efficiencies of the vanadium. In addition it gives least amount of nanoparticles to be used. The results illustrate that the combination of nanoparticles and ionic liquid ([OMIM]PF6) increase the emulsion stability and the extraction efficiency with less duration of time as shown in FIG. 22.

The lowest leakage and higher stability time were obtained with the combination of the nanoparticles $Fe_2O_3$, MgO, and $Al_2O_3$ and ionic liquid ([OMIM]PF6) after 1 hour which sustain during the experiments. Furthermore, the stabilization of ELMs with nanoparticles enhances the strength between emulsion droplets and prevents collision or coalescence of the droplets. In addition, the nanoparticles forming a protective film from the particles at W1 mediator and increasing the binding sites on the surface of the solute. The emulsion becomes more stable with this concentration of the nanoparticles by covering more of the emulsion droplet interface, thereby resulting in an increase in the extraction efficiency. This confirms that the combination enhanced the emulsion stability as compared with ELM alone, and ELM+ ionic liquid. Hence, the combination enhances the stability and forms droplets that are particularly stable in the emulsion. Extraction time is considered as the target to determine the ELM effectiveness, which represents the time for the concentration of vanadium to real close to zero.

A composition comprising about 0.01% (w/w) of $Fe_2O_3$ or MgO nanoparticles with diameters in the range of from about 20 nm to less than about 50 nm yields enhanced removal of heavy metals in about 30 seconds.

TABLE 8

$Al_2O_3$ or MgO nanoparticles with diameters in the range of about 20 nm to less than about 50 nm combined with a [OMIM][$PF_6$] ionic liquid used to extract vanadium (V) from water.

| Time (sec) | ($Fe_2O_3$ nano in W1) + O + W2 | ($Al_2O_3$ nano in W1) + O + W2 | (MgO nano in W1) + O + W2 |
|---|---|---|---|
| 30 | 98.9% extraction | 98.84% extraction | 99.69% extraction |

In summary, for the first time, a W1/O/W2 emulsion liquid membrane was combined with nanoparticles ($Fe_2O_3$, MgO, and $Al_2O_3$) in the W1 phase and ionic liquid ([OMIM] PF6) in the organic phase (O) was studied for extracting/recovery vanadium from synthetic wastewater.

The best operational conditions for vanadium extraction/recovery using conventional ELM were: concentration of surfactant 3% (W/V), concentration of carrier D2HEPA 2% (V/V), the volume ratio of internal phase to organic phase 1/1 (V/V), agitation intensity 6000 rpm, volume ratio ELM/W2 1/10 (V/V), the agitation mixing speed 300 rpm, and pH of the W2 was 5. At the best conditions, the extraction of vanadium was achieved with an efficiency of 69.93% from aqueous solutions within 30 min and stability 28% for 6 hours.

The extraction/recover efficiency of vanadium was enhanced to 87.7% within the first 5 minutes in one batch of operation by adding magnetic $Fe_2O_3$ nanoparticles alone in W1 phase with increasing the concentration of magnetic $Fe_2O_3$ nanoparticles to 0.15% (W/W). After 5 minutes, the percentage extraction/recover decreases due to the leakage of the emulsion.

The emulsion stability containing 5% (V/V) of ionic liquid ([OMIM]PF6) has increased the stability of emulsion upon the addition of ([OMIM]PF6) might be clarified by the Coulombic interaction between the ionic liquid and $H_2SO_4$, hydrogen bonding present between ([OMIM]PF6) and $[OH]^-$ a group of $H_2SO_4$. The extraction/recovery efficiency with the concentration of 5% (V/V) of ionic liquid ([OMIM]PF6) was 80.73% at 30 min and emulsion stability 51% for 3 days.

The nanoparticles ($Fe_2O_3$, MgO, and $Al_2O_3$) were added in the organic phase (O) phase or in the external feed wastewater (W2) phase. However, no improvement was observed for the extraction/recovery rate and blocking the reaction, so the position of the nanoparticles in W1 phase was changed, and then the extraction rate was studied.

The extraction/recovery rate and emulsion stability were greatly enhanced by the combination of ionic liquid in the organic phase (O) and nanoparticles in the internal receiving phase (W1). W1 formed a three-dimensional network among the droplets sustained during the experiment time by the interfacial film surrounding emulsion globules increases significantly in the presence of nanoparticles and ionic liquid.

The ratio of combination obtained was 0.01% (W/W) of $Fe_2O_3$, MgO, and $Al_2O_3$ nanoparticles in the internal receiving phase (W1) and 5% (V/V) ionic liquid ([OMIM]PF6) in the organic phase (O), which give higher extraction/recovery efficiency of vanadium of 99.9%, 98.84%, and 99.69% in about 30 seconds respectively and emulsion stability 84% for more than three days. This clarifies the ability of composition comprising to increase the emulsion stability and extraction.

Example 7. Compositions for Extracting/Recovering Vanadium from Water and Wastewater Composition including SiC or CuO nanoparticles in the stripping phase and an [OMIM][$PF_6$] ionic liquid in the organic phase were prepared similar to Example 5.

A composition comprising about 0.01% (w/w) of SiC or CuO nanoparticles with diameters in the range of from about 1 nm to about 20 nm yields enhanced removal of heavy metals in about 30 seconds.

TABLE 9

SiC or CuO nanoparticles with diameters in the range of from about 1 nm to about 20 nm combined with a [OMIM][$PF_6$] ionic liquid used to extract vanadium (V) from water.

| Time (sec) | (W1 + silicon carbide nano) + O + W2 | (W1 + copper(II) oxide nano) + O + W2 |
|---|---|---|
| 30 | 99.6158% extraction | 99.4086629% extraction |

Example 8. Compositions for Extracting/Recovering Benzoic Acid from Water and Wastewater The chemicals that are used in this example were kerosene (boiling point 175-325° C.) as the organic (O) phase, span 80 as the surfactant, sodium hydroxide (NaOH) as stripping agent to react with the benzoic acid to form precipitate sodium benzoate, benzoic acid as synthetic pollutant, hydrochloric acid (HCl) to adjust the pH of W2, and ionic liquid of 1-butyl-3-methylimidazolium bis(trifluoromethylsulfonyl)imide, $[BMIM]^+[NTf2]^-$. Magnetic $Fe_2O_3$ nanoparticles with the size range of 30-60 nm were used. This size of nanoparticles is less expensive than smaller sizes, which is an important factor for large-scale applications. The magnetic property of nanoparticles has been chosen for easy removal and recycling by a magnetic field. Additionally, this improves the step(s) of demulsification and separation of the formed solids and the recycling of the nanoparticles and the organic phase as well since the chemistry of the organic phase (O) will not be altered.

In this example, an ELM method (W1/O/W2) has been applied since the contaminants are in the aqueous phase. The emulsion is created by mixing the aqueous phase (W1) (internal receiving phase) that contains of the stripping agent as the reactant of 0.5 N NaOH solution with the organic phase (O) at a high agitation speed of rotation per minutes (rpm) of the mixer to form an emulsion of small aqueous droplets in the organic phase. The organic phase (O) contains surfactant Span-80 and kerosene. The emulsion (W1/O) is then dispersed in the external feed (wastewater) phase (W2), where the hydrocarbon of benzoic acid pollutants present form globules of the organic phase (O) containing small droplets of the aqueous internal phase (W1). The pollutant is transferred from the W2 phase through the O phase to the W1 phase where it reacts with the stripping agent (NaOH) to form a solute precipitate.

The emulsion (W1/O) was dispersed and mixed (IKA overhead stirrer Model: RW20 digital) with the external feed wastewater phase (W2) that contains benzoic acid. Samples from the agitated solution at 300 ppm were taken at different periods of time using a micropipette, and then separated from the emulsion phase using a nylon syringe filter of 0.2 μm. The benzoic acid was analyzed using a 96 well UV-microplate at a wavelength band range of 200 to 500 nm. The concentrations of benzoic acid and sodium benzoate were found from the absorbance-calibration curves.

In some embodiments, typical parameters include: surfactant (Span 80) concentration of 2% (W/V), W1/O ratio (V/V) of 1/3, emulsion agitation of 7000 rpm, ELM/W2 V/V of 1/12, treatment agitation of 300 rpm, and pH of W2 of 3.5. These parameters affect the performance of ELM for removing benzoic acid.

Using the values of the variables mentioned above, the effects of adding the Magnetic $Fe_2O_3$ nanoparticle in the organic phase (O) of 0.05%, 0.1, and 0.15% (W/W) and the separately of the ionic liquid $[BMIM]^+[NTf2]^-$ in the organic phase (O) of 0.05%, 0.1%, 0.15%, 0.2% and 0.25% (V/V) have been investigated on the stability of the ELM, percentage removal of the benzoic acid and the time duration of the batch operation for its removal.

At the end of the benzoic acid removal, the mixtures are placed in a separating funnel to separate the upper emulsion layer (W1/O) and the lower aqueous feed phase (W2). Then a magnetic field (1 T magnet) is applied on the upper phase which pulls the nanoparticles from the emulsion layer (W1/O) by the magnetic field and demulsification occurs. In some embodiments, since this will not change the chemistry of the organic phase (O), the kerosene containing the surfactant is reused. In some embodiments, the aqueous phase is separated from the organic phase by heating after the nanoparticles are collected. In some embodiments, the accumulated $Fe_2O_3$ nanoparticles are washed with acetone and distilled water and then dried under vacuum at 50° C. for 10 hours for reuse. In some embodiments, the recycled nanoparticles and the organic phase are used to prepare a new ELM experiment.

In the method of ELM, the contaminants are removed by mass transfer with chemical reaction of the contaminant compounds reached to the aqueous droplets (W1) in the organic globules with the stripping agent (reaction agent) to form precipitate solid in W1 as per the reaction below for benzoic acid with NaOH. This means that the driving force of the concentration gradient of the contaminants transport from W2 to W1 through O membrane remains at its maximum and hence the transport of the contaminants continues until about the completion of the removal. The relevant reaction is shown below.

$CH_6COOH_5 + NaOH \rightarrow CH_6COO^-Na^+ + H_2O$   (Reaction Scheme 11)

Experiments were performed to confirm the best values of the variables to be used to inspect the effects of ionic liquid and magnetic nanoparticles ($Fe_2O_3$) on the removal of benzoic acid and its duration and the emulsion stability. For all these experiments the stability of emulsion was examined according to the dye method. The benzoic acid removal of 62.77% during 15 min of batch operation was obtained with the earlier defined best values and confirmed by the experiments as follows: the volume ratios of the NaOH solution to the organic phase (W1/O) of 1/3 (V/V); surfactant Span 80 concentration of 2% (W/V); emulsion agitation speed of 7000 rpm; volume ratio of ELM (W1/O) to W2 (ELM/W2) of 1/12; treatment agitation of W2 with (W1/O) of 300 rpm; and pH of W2 of 3.5.

FIG. 23 shows the results of the removal of benzoic acid using 0.05%, 0.1%, and 0.15% (W/W) of magnetic nanoparticles of $Fe_2O_3$ in the organic (O) phase. The results illustrate that the ratio of 0.1% (W/W) of magnetic $Fe_2O_3$ nanoparticles alone in the organic phase (O) promotes of 98.1% benzoic acid removal after 5 minutes in one batch of operation. The presence of the magnetic $Fe_2O_3$ nanoparticles in the organic phase (O) enhances the emulsion stability and the mass transfer of benzoic acid from W2 to W1 through the O phase.

Concerning the use of ionic liquid in the organic phase (O) as an alternative method to improve the emulsion stability, the ionic liquid $[BMIM]^+[NTf2]^-$ was chosen to be used in this study because, in some embodiments, it enhances the removal efficiency. The ionic liquid $[BMIM]^+$ $[NTf2]^-$ concentrations of 0.05% (V/V) to 0.25% (V/V) were tested as shown in FIG. 24.

The ratio of 0.2% (V/V) gives higher removal of benzoic acid of 84.5% after 4 minutes in one batch of operation. Two interpretations best explain the increase in the ELM efficiency by using ionic liquid $[BMIM]^+[NTf2]^-$. The first interpretation is that the addition of ionic liquid allowed formation of strong interactions between the charges on the ions of $[BMIM]^+[NTf2]^-$ and NaOH, which enhanced the emulsion stability by reducing the adhesion of internal droplets in emulsion. In some embodiments, the presence of hydrogen bonds between ions of $[BMIM]^+[NTf2]^-$ and $[OH]^-$ group of NaOH increases the protection around the internal droplets to prevent adhesion. The second interpretation is that the addition of ionic liquid $[BMIM]^+[NTf2]^-$ can further reduce the interfacial tension, also through adsorbing in the W1/O interface and thereby minimizing the repulsion of the hydrophilic head-groups of the surfactants, which contributes to a more efficient packing of the surfactants at the interface and reduces the water droplet size. In some embodiments, the addition of ionic liquid $[BMIM]^+$ $[NTf2]^-$ further reduces the interfacial tension.

It was observed that 0.1% (W/W) of magnetic nanoparticles $Fe_2O_3$ alone and 0.2% (V/V) of ionic liquid $[BMIM]^+$ $[NTf2]^-$ alone offer the best removal of benzoic acid for each respective variable. These parameters were combined to explore synergy. The results are illustrated in Tables 10-12 and FIG. 25. The combined ionic liquid concentration of 0.05% (V/V) and concentration of nanoparticles of 0.05% (W/W) have been found to provide best ELM performance of 99.1% removal in 1 minute, yet these low amounts are desirable from an economic point of view for large scale applications.

The removal efficiency increased and the duration decreased with the combination of ionic liquid $[BMIM]^+$ $[NTf_2]^-$ and magnetic nanoparticles $Fe_2O_3$. Shorter times would facilitate transformation of the process from batch to continuous, which is desirable from industrial application point of view. The combination ratios of 0.05% mentioned above removed 99.1% of benzoic acid in the removal time of 1 minute. This 99.1% in 1 minute was achieved with no reduction in the percentage removal during 15 minutes of the reaction time and the emulsion stability increase more than 6 hours, which is particularly essential for transformation of the batch ELM process of industrial scale to a continuous process.

Decreased leakage with higher emulsion stability time was achieved with the combination of the magnetic nanoparticles $Fe_2O_3$ and ionic liquid $[BMIM]^+[NTf_2]^-$. The emulsion was monitored for 1 hour after the experiment and the separation was completed. This proves that the combination enhances the emulsion stability as compared with ELM alone, ELM+ nanoparticles only, and ELM+ ionic liquid only. The ratio of 0.05% (V/V) of ionic liquid $[BMIM]^+[NTf_2]^-$ and 0.05% (W/W) of $Fe_2O_3$ gives the least amount of nanoparticles and ionic liquid to be used and give higher removal efficiency for 99.1% in 1 min. The results also illustrate that the combination of magnetic nanoparticles $Fe_2O_3$ and ionic liquid $[BMIM]^+[NTf_2]^-$ increases the emulsion stability as shown in FIG. 26.

TABLE 10

The effect of the combination (W/W) ionic liquid [BMIM]$^+$[NTf2]$^-$ and 0.05% (V/V) magnetic Fe$_2$O$_3$ nanoparticles in organic phase on the ELM removal for benzoic acid under the following conditions: W1:O volume ratio is 1/3 (V/V), surfactant concentration is 2%, emulsification speed is 7000 rpm, ELM/W2 volume ratio is 1:12 (V/V), mixing speed is 300 rpm, and pH is 3.5.

| Time (min) | 0.05% ionic liquid | 0.1% ionic liquid | 0.15% ionic liquid | 0.2% ionic liquid | 0.25% ionic liquid |
|---|---|---|---|---|---|
| 0 | 100 | 100 | 100 | 100 | 100 |
| 1 | 0.925 | 43.2 | 40.1 | 57.3 | 56.6 |
| 2 | 0.925 | 43.2 | 39.1 | 57.3 | 56.6 |
| 3 | 0.8 | 28.2 | 32.3 | 38.2 | 34.2 |
| 4.5 | 0.85 | 20.1 | 28.6 | 34.9 | 33.6 |
| 6 | 0.825 | 18.6 | 25.8 | 32.0 | 30.5 |
| 7.5 | 0.725 | 16.4 | 21.3 | 28.8 | 27.6 |
| 9 | 0.725 | 13.8 | 17.9 | 28.6 | 25.3 |
| 10.5 | 0.775 | 12.3 | 14.3 | 24.0 | 22.9 |
| 12 | 0.875 | 11.2 | 12.4 | 20.5 | 19.0 |
| 13.5 | 0.9 | 10.2 | 11.4 | 18.7 | 17.2 |
| 15 | 1.025 | 9.2 | 10.1 | 14.7 | 13.4 |

TABLE 11

The effect of the combination (W/W) ionic liquid [BMIM]$^+$[NTf2]$^-$ and 0.1% (V/V) magnetic Fe$_2$O$_3$ nanoparticles in organic phase on the ELM removal for benzoic acid under the following conditions: W1:O volume ratio is 1/3 (V/V), surfactant concentration is 2%, emulsification speed is 7000 rpm, ELM/W2 volume ratio is 1:12 (V/V), mixing speed is 300 rpm, and pH is 3.5.

| Time (min) | 0.05% ionic liquid | 0.1% ionic liquid | 0.15% ionic liquid | 0.2% ionic liquid | 0.25% ionic liquid |
|---|---|---|---|---|---|
| 0 | 100 | 100 | 100 | 100 | 100 |
| 1 | 60.4 | 37.9 | 44.3 | 42.4 | 46.0 |
| 2 | 60.4 | 38.9 | 39.5 | 42.0 | 39.5 |
| 3 | 47.2 | 36.0 | 39.3 | 38.1 | 38.3 |
| 4.5 | 38.4 | 33.5 | 35.5 | 34.2 | 36.1 |
| 6 | 37.0 | 27.3 | 32.0 | 29.3 | 36.0 |
| 7.5 | 35.7 | 25.8 | 29.4 | 28.2 | 32.0 |
| 9 | 33.6 | 20.5 | 28.3 | 26.1 | 31.3 |
| 10.5 | 32.0 | 17.4 | 24.1 | 22.6 | 30.9 |
| 12 | 30.9 | 14.1 | 22.1 | 19.2 | 28.1 |
| 13.5 | 29.9 | 10.2 | 18.3 | 15.1 | 24.4 |
| 15 | 27.4 | 9.3 | 17.5 | 13.4 | 20.3 |

TABLE 12

The effect of the combination (W/W) ionic liquid [BMIM]$^+$[NTf2]$^-$ and 0.15% (V/V) magnetic Fe$_2$O$_3$ nanoparticles in organic phase on the ELM removal for benzoic acid under the following conditions: W1:O volume ratio is 1/3 (V/V), surfactant concentration is 2%, emulsification speed is 7000 rpm, ELM/W2 volume ratio is 1:12 (V/V), mixing speed is 300 rpm, and pH is 3.5.

| Time (min) | 0.05% ionic liquid | 0.1% ionic liquid | 0.15% ionic liquid | 0.2% ionic liquid | 0.25% ionic liquid |
|---|---|---|---|---|---|
| 0 | 100 | 100 | 100 | 100 | 100 |
| 1 | 61.5 | 60.4 | 48.6 | 60.2 | 64.1 |
| 2 | 56.6 | 55.7 | 48.6 | 59.8 | 62.5 |
| 3 | 49.2 | 38.4 | 45.8 | 52.8 | 59.3 |
| 4.5 | 41.0 | 37.0 | 41.4 | 43.2 | 52.4 |
| 6 | 38.3 | 35.7 | 35.1 | 40.2 | 47.8 |
| 7.5 | 36.2 | 33.6 | 33.6 | 38.4 | 43.9 |
| 9 | 34.9 | 32.0 | 30.1 | 33.6 | 40.2 |
| 10.5 | 33.6 | 30.9 | 23.0 | 30.6 | 36.9 |
| 12 | 31.4 | 30.2 | 25.9 | 28.1 | 32.4 |
| 13.5 | 30.5 | 29.9 | 20.0 | 27.6 | 31.5 |
| 15 | 28.6 | 27.4 | 17.3 | 25.0 | 29.2 |

In summary, the best operating conditions achieved for benzoic acid removal using conventional ELM were: surfactant concentration 2% (W/V), volume ratio of W1/O of 1/3, emulsion agitation speed of 7000 rpm, W1/O/W2 volume ratio of 1/12 (V/V), treatment agitation of W2 of 300 rpm and pH of 3.5. At the best conditions, the removal of benzoic acid achieved with the efficiency of 62.77% within 15 min.

The removal efficiency of benzoic acid was enhanced to 98% after 5 minutes in one batch of operation by adding magnetic Fe$_2$O$_3$ nanoparticles alone in organic (O) phase in the first 5 min with increasing the concentration of magnetic Fe$_2$O$_3$ nanoparticles to 0.1% (W/W). After 5 minutes, the percentage removal drops due to the leakage of the emulsion.

The removal efficiency of benzoic acid was enhanced to 84.5% after 4 minutes in one batch of operation by adding ionic liquid [BMIM]$^+$[NTf$_2$]$^-$ alone in organic (O) phase in the first 5 min with increasing the concentration of ionic liquid [BMIM]$^+$[NTf$_2$]$^-$ to 0.2% (V/V). Also after 5 minutes, the percentage removal drops due to the leakage of the emulsion.

The combination of 0.05% (V/V) ionic liquid [BMIM]$^+$[NTf$_2$]$^-$ and 0.05% (W/W) magnetic Fe$_2$O$_3$ nanoparticles improves the emulsion stability and provides lowest leakage of emulsion up to 6 hours which was the time during which stability was monitored. This time is well within the time of reaction completion of 15 minutes.

The combining of 0.05% (W/W) magnetic Fe$_2$O$_3$ nanoparticles and 0.05% (V/V) ionic liquid [BMIM]$^+$[NTf$_2$]$^-$ gives higher removal efficiency of benzoic acid of 99.1% at shorter removal time of 1 minute which continues until the end of the reaction after 15 minutes. This means that the percentage removal which does not drop after 1 minute confirms that the leakage of the emulsion does not occur. This promotes the transformation of the process from batch to continuous ELM that facilitates its industrial applications.

This written description uses examples to illustrate the present disclosure, including the best mode, and also to enable any person skilled in the art to practice the disclosure, including making and using any compositions or systems and performing any incorporated methods. The patentable scope of the disclosure is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

As used herein, the terms "comprises," "comprising," "includes," "including," "has," "having," "contains", "containing," "characterized by" or any other variation thereof, are intended to cover a non-exclusive inclusion, subject to any limitation explicitly indicated. For example, a composition, mixture, process or method that comprises a list of elements is not necessarily limited to only those elements but may include other elements not expressly listed or inherent to such composition, mixture, process or method.

The transitional phrase "consisting of" excludes any element, step, or ingredient not specified. If in the claim, such would close the claim to the inclusion of materials other than those recited except for impurities ordinarily associated therewith. When the phrase "consisting of" appears in a clause of the body of a claim, rather than immediately following the preamble, it limits only the element set forth in that clause; other elements are not excluded from the claim as a whole.

The transitional phrase "consisting essentially of" is used to define a composition or method that includes materials, steps, features, components, or elements, in addition to those literally disclosed, provided that these additional materials, steps, features, components, or elements do not materially affect the basic and novel characteristic(s) of the claimed disclosure. The term "consisting essentially of" occupies a middle ground between "comprising" and "consisting of".

Where a disclosure or a portion thereof is defined with an open-ended term such as "comprising," it should be readily understood that (unless otherwise stated) the description should be interpreted to also describe such a disclosure using the terms "consisting essentially of" or "consisting of."

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the disclosure are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

What is claimed is:

1. An emulsion liquid membrane comprising:
    an emulsion phase comprising an aqueous phase dispersed in an organic membrane phase, wherein the aqueous phase comprises nanoparticles and the organic phase comprises an ionic liquid.

2. The emulsion liquid membrane of claim 1, wherein the nanoparticles are magnetic.

3. The emulsion liquid membrane of claim 1, wherein the nanoparticles comprise a compound selected from the group consisting of FeO, $Fe_2O_3$, $Fe_3O_4$, $Y_3Fe_5O_{12}$, $SrFe_{12}O_{19}$, $SmCo_5$, $Al_2O_3$, MgO, SiC, CuO, and combinations thereof.

4. The emulsion liquid membrane of claim 1, wherein the nanoparticles have a diameter in the range of from about 1 nm to about 60 nm.

5. The emulsion liquid membrane of claim 1, wherein the ionic liquid is selected from the group consisting of 1-butyl-3-methylimidazolium bis(trifluoromethylsulfonyl)imide ([BMIM][NTf$_2$]), 1-Methyl-3-octylimidazolium hexafluorophosphate ([OMIM]PF$_6$), and combinations thereof.

6. An emulsion liquid membrane comprising:
    an emulsion phase comprising a stripping aqueous phase dispersed in an organic membrane phase, wherein the organic membrane phase comprises an ionic liquid and the stripping aqueous phase comprises a stripping agent and nanoparticles.

7. The emulsion liquid membrane of claim 6, wherein the nanoparticles are magnetic.

8. The emulsion liquid membrane of claim 6, wherein the nanoparticles comprise a compound selected from the group consisting of FeO, $Fe_2O_3$, $Fe_3O_4$, $Y_3Fe_5O_{12}$, $SrFe_{12}O_{19}$, $SmCo_5$, $Al_2O_3$, MgO, SiC, CuO, and combinations thereof.

9. The emulsion liquid membrane of claim 6, wherein the nanoparticles have a diameter in the range of from about 1 nm to about 60 nm.

10. The emulsion liquid membrane of claim 6, wherein the ionic liquid is selected from the group consisting of 1-butyl-3-methylimidazolium bis(trifluoromethylsulfonyl)imide ([BMIM] [NTf$_2$]), 1-Methyl-3-octylimidazolium hexafluorophosphate ([OMIM]PF$_6$), and combinations thereof.

11. A method for removing and/or extracting at least one pollutant, the method comprising:
    dispersing an emulsion phase of an emulsion liquid membrane in an external aqueous phase (W2), wherein the emulsion phase of the emulsion liquid membrane comprises a stripping aqueous phase (W1) dispersed in an organic membrane phase, wherein the stripping aqueous phase comprises nanoparticles and a stripping agent, wherein the organic membrane phase comprises an ionic liquid, and
    removing and/or extracting the at least one pollutant wherein the at least one pollutant is transferred from the external aqueous phase (W2) through the organic membrane phase to the stripping aqueous phase (W1) and the at least one pollutant reacts with the stripping agent in the stripping aqueous phase (W1) and is removed from the external aqueous phase (W2).

12. The method of claim 11, wherein the external aqueous phase (W2) comprises at least one pollutant.

13. The method of claim 11, wherein the external aqueous phase (W2) comprises nanoparticles and at least one pollutant.

14. The method of claim 11, wherein the at least one pollutant is selected from the group consisting of at least one metal, at least one hydrocarbon, and combinations thereof.

15. The method of claim 14, wherein the at least one metal is selected from the group consisting of lead (II), vanadium (V), and combinations thereof.

16. The method of claim 14, wherein the at least one hydrocarbon is selected from the group consisting of 4-nitrophenol, benzoic acid, and combinations thereof.

17. The method of claim 11, wherein the nanoparticles are magnetic.

18. The method of claim 11 wherein the nanoparticles comprise a compound selected from the group consisting of FeO, $Fe_2O_3$, $Fe_3O_4$, $Y_3Fe_5O_{12}$, $SrFe_{12}O_{19}$, $SmCo_5$, $Al_2O_3$, MgO, SiC, CuO, and combinations thereof.

19. The method of claim 11, wherein the nanoparticles have a diameter in the range of from about 1 nm to about 60 nm.

20. The method of claim 12, wherein the ionic liquid is selected from the group consisting of 1-butyl-3-methylimidazolium bis(trifluoromethylsulfonyl)imide ([BMIM][NTf2]), 1-Methyl-3-octylimidazolium hexafluorophosphate ([OMIM]PF$_6$), and combinations thereof.

* * * * *